(12) United States Patent
Pliha

(10) Patent No.: US 7,954,698 B1
(45) Date of Patent: Jun. 7, 2011

(54) SYSTEM AND METHOD FOR MATCHING CUSTOMERS TO FINANCIAL PRODUCTS, SERVICES, AND INCENTIVES BASED ON BANK ACCOUNT TRANSACTION ACTIVITY

(76) Inventor: Robert K. Pliha, Nashville, TN (US)

( * ) Notice: Subject to any disclaimer, the term of this patent is extended or adjusted under 35 U.S.C. 154(b) by 768 days.

(21) Appl. No.: 11/862,977

(22) Filed: Sep. 27, 2007

Related U.S. Application Data

(63) Continuation-in-part of application No. 10/858,745, filed on Jun. 2, 2004, now Pat. No. 7,296,734.

(51) Int. Cl.
*G06K 5/00* (2006.01)
(52) U.S. Cl. ........................................ 235/379; 235/380
(58) Field of Classification Search .................. 235/379, 235/380, 383, 385, 492, 375
See application file for complete search history.

(56) References Cited

U.S. PATENT DOCUMENTS

| | | |
|---|---|---|
| 3,505,646 A | 4/1970 | Affel, Jr. et al. |
| 3,716,697 A | 2/1973 | Weir |
| 3,941,977 A | 3/1976 | Voss et al. |
| 3,959,624 A | 5/1976 | Kaslow |
| 4,114,027 A | 9/1978 | Slater et al. |
| 4,247,759 A | 1/1981 | Yuris et al. |
| 4,365,148 A | 12/1982 | Whitney |
| 4,415,065 A | 11/1983 | Sandstedt |
| 4,415,802 A | 11/1983 | Long |
| 4,419,573 A | 12/1983 | von Geldern |
| 4,554,446 A | 11/1985 | Murphy et al. |
| 4,670,853 A | 6/1987 | Stepien |
| 4,672,377 A | 6/1987 | Murphy et al. |
| 4,674,041 A | 6/1987 | Lemon et al. |
| 4,703,423 A | 10/1987 | Bado et al. |
| 4,722,054 A | 1/1988 | Yorozu et al. |
| 4,723,212 A | 2/1988 | Mindrum et al. |
| 4,750,119 A | 6/1988 | Cohen et al. |
| 4,791,281 A | 12/1988 | Johnsen et al. |
| 4,882,675 A | 11/1989 | Nichtberger et al. |
| 4,885,685 A | 12/1989 | Wolfberg et al. |

(Continued)

FOREIGN PATENT DOCUMENTS

WO WO9723838 7/1997

(Continued)

OTHER PUBLICATIONS

"UK: Innovative Experiment by American Express," Gale Group Globalbase (TM): Sunday Times (ST), Apr. 15, 1996 (1 page).

(Continued)

*Primary Examiner* — Thien M Le
(74) *Attorney, Agent, or Firm* — Kilpatrick Townsend & Stockton LLP

(57) ABSTRACT

A financial scoring system measures, classifies, rates, and forecasts the deposit and withdrawal patterns processed through a direct deposit account (DDA) residing in a bank's central database. The scoring metric generated by the financial scoring system is converted into a monthly mandatory, lifestyle, leisure, and luxury expenditure classifications for each DDA household. These expenditure classifications are converted by the financial scoring system to the rate of expenditure substitution each DDA household will support, the amount of the rate of expenditure substitution that the DDA household is willing to risk, and the rate of expenditure substitution that will require a preference spending decision. The DDA expenditure classifications generated by the financial scoring system are compared to the consumer expenditure survey and consumer price index tables published by U.S. Department of Labor Bureau of Labor Statistics to provide a scoring validation benchmark.

24 Claims, 27 Drawing Sheets

U.S. PATENT DOCUMENTS

| | | | |
|---|---|---|---|
| 4,908,761 | A | 3/1990 | Tai |
| 4,910,672 | A | 3/1990 | Off et al. |
| 4,941,090 | A | 7/1990 | McCarthy |
| 4,949,256 | A | 8/1990 | Humble |
| 5,056,019 | A | 10/1991 | Schultz et al. |
| 5,128,752 | A | 7/1992 | Von Kohorn |
| 5,305,195 | A | 4/1994 | Murphy |
| 5,305,197 | A | 4/1994 | Axler et al. |
| 5,353,218 | A | 10/1994 | De Lapa et al. |
| RE34,915 | E | 4/1995 | Nichtberger et al. |
| 5,502,636 | A | 3/1996 | Clarke |
| 5,612,868 | A | 3/1997 | Off et al. |
| 5,619,558 | A | 4/1997 | Jheeta |
| 5,649,114 | A | 7/1997 | Deaton et al. |
| 5,689,100 | A | 11/1997 | Carrithers et al. |
| 5,710,886 | A | 1/1998 | Christensen et al. |
| 5,734,838 | A | 3/1998 | Robinson et al. |
| 5,790,645 | A | 8/1998 | Fawcett et al. |
| 5,819,226 | A | 10/1998 | Gopinathan et al. |
| 5,857,175 | A | 1/1999 | Day et al. |
| 5,875,437 | A * | 2/1999 | Atkins ............................ 705/40 |
| 5,945,653 | A | 8/1999 | Walker et al. |
| 6,009,415 | A | 12/1999 | Shurling et al. |
| 6,208,720 | B1 | 3/2001 | Curtis et al. |
| 6,321,208 | B1 | 11/2001 | Barnett et al. |
| 6,434,534 | B1 | 8/2002 | Walker et al. |
| 6,601,048 | B1 | 7/2003 | Gavan et al. |
| 6,631,358 | B1 | 10/2003 | Ogilvie |
| 6,925,441 | B1 | 8/2005 | Jones |
| 7,191,150 | B1 | 3/2007 | Shao et al. |
| 7,279,048 | B2 | 10/2007 | Shinma et al. |
| 7,296,734 | B2 | 11/2007 | Pliha |
| 7,376,618 | B1 | 5/2008 | Anderson et al. |
| 7,389,211 | B2 | 6/2008 | Abu El Ata et al. |
| 7,401,731 | B1 * | 7/2008 | Pletz et al. ..................... 235/380 |
| 7,533,038 | B2 | 5/2009 | Blume et al. |
| 7,580,856 | B1 | 8/2009 | Pliha |
| 7,650,304 | B1 * | 1/2010 | Metsker et al. ................ 705/37 |
| 7,742,997 | B1 * | 6/2010 | Brenner et al. ............... 705/300 |
| 2002/0069150 | A1 * | 6/2002 | Ni ................................... 705/36 |
| 2002/0194122 | A1 | 12/2002 | Knox et al. |
| 2005/0055296 | A1 | 3/2005 | Hattersley et al. |
| 2006/0253309 | A1 * | 11/2006 | Ramsey et al. .................. 705/7 |
| 2007/0016500 | A1 | 1/2007 | Chatterji et al. |
| 2007/0143171 | A1 * | 6/2007 | Boyd et al. ...................... 705/10 |
| 2008/0120155 | A1 | 5/2008 | Pliha |
| 2008/0228611 | A1 * | 9/2008 | Lilly et al. ...................... 705/34 |
| 2008/0243587 | A1 * | 10/2008 | Chang et al. .................... 705/10 |
| 2008/0277465 | A1 * | 11/2008 | Pletz et al. ..................... 235/379 |

FOREIGN PATENT DOCUMENTS

WO      WO 9726061      7/1997

OTHER PUBLICATIONS

Non-Final Office Action, U.S. Appl. No. 09/880,430, dated Mar. 22, 2007 (18 pages).

Non-Final Office Action, U.S. Appl. No. 09/880,430, dated Aug. 23, 2007 (5 pages).

Final Office Action for U.S. Appl. No. 09/880,430 mailed Oct. 7, 2008 (27 pages).

Notice of Allowance for U.S. Appl. No. 09/880,430 mailed Apr. 3, 2009 (12 pages).

Non-Final Office Action, U.S. Appl. No. 11/934,623, dated Oct. 7, 2010 (12 pages).

* cited by examiner

Account Ownership

Household Consolidation

| Primary DDA Holder ID<br>Martial Status: Single or Married | | | Secondary DDA Holder ID<br>Relationship: Family Member, or Friend | | | Other DDA Holder ID<br>Relationship: Family Member, or Friend | | |
|---|---|---|---|---|---|---|---|---|
| DDA ID<br>Individual or Joint<br>Joint Holder ID | Time Deposit ID<br>Individual or Joint<br>Joint Holder ID | Loan ID<br>Individual or Joint<br>Joint Holder ID | DDA ID<br>Individual or Joint<br>Joint Holder ID | Time Deposit ID<br>Individual or Joint<br>Joint Holder ID | Loan ID<br>Individual or Joint<br>Joint Holder ID | DDA ID<br>Individual or Joint<br>Joint Holder ID | Time Deposit ID<br>Individual or Joint<br>Joint Holder ID | Loan ID<br>Individual or Joint<br>Joint Holder ID |
| DDA ID+1<br>Individual or Joint<br>Joint Holder ID | Time Deposit ID+1<br>Individual or Joint<br>Joint Holder ID | Loan ID+1<br>Individual or Joint<br>Joint Holder ID | DDA ID+1<br>Individual or Joint<br>Joint Holder ID | Time Deposit ID+1<br>Individual or Joint<br>Joint Holder ID | Loan ID+1<br>Individual or Joint<br>Joint Holder ID | DDA ID+1<br>Individual or Joint<br>Joint Holder ID | Time Deposit ID+1<br>Individual or Joint<br>Joint Holder ID | Loan ID+1<br>Individual or Joint<br>Joint Holder ID |
| ... | ... | ... | ... | ... | ... | ... | ... | ... |
| DDA ID+N<br>Individual or Joint<br>Joint Holder ID | Time Deposit ID+N<br>Individual or Joint<br>Joint Holder ID | Loan ID+N<br>Individual or Joint<br>Joint Holder ID | DDA ID+N<br>Individual or Joint<br>Joint Holder ID | Time Deposit ID+N<br>Individual or Joint<br>Joint Holder ID | Loan ID+N<br>Individual or Joint<br>Joint Holder ID | DDA ID+N<br>Individual or Joint<br>Joint Holder ID | Time Deposit ID+N<br>Individual or Joint<br>Joint Holder ID | Loan ID+N<br>Individual or Joint<br>Joint Holder ID |

DDA Accounts

Household Consolidation

| Day | Date | Deposit Amount | Interest Amount | Deposit Calendar ||||| Withdrawal Amount | Withdrawal Calendar ||||
|---|---|---|---|---|---|---|---|---|---|---|---|---|
| | | | | Deposit Type ||||| Withdrawal Type ||||
| | | | | Cash | Check | ACH | EFT | Transfer | | Cash | Check | ACH | EFT | Transfer |
| 1 | Date 1 | D | I | ⌂ | ⌂ | ⌂ | ⌂ | ⌂ | W | ⌂ | ⌂ | ⌂ | ⌂ | ⌂ |
| 2 | Date 2 | D+1 | I+1 | • | • | • | • | • | W+1 | • | • | • | • | • |
| 3 | Date 3 | D+2 | I+2 | • | • | • | • | • | W+2 | • | • | • | • | • |
| • | • | • | • | • | • | • | • | • | • | • | • | • | • | • |
| 30 | Date 30 | D+30 | I+30 | ⌂ | ⌂ | ⌂ | ⌂ | ⌂ | W+30 | ⌂ | ⌂ | ⌂ | ⌂ | ⌂ |

32 — Deposit Calendar
33 — Withdrawal Calendar

Figure 3

Time Deposit Accounts

Household Consolidation

| Day | Date | Deposit Calendar | | | | | | | Withdrawal Amount | Withdrawal Calendar | | | | |
|---|---|---|---|---|---|---|---|---|---|---|---|---|---|---|
| | | Deposit Amount | Maturity Date | Interest Amount | Deposit Type | | | | | Withdrawal Type | | | | |
| | | | | | Cash | Check | ACH | EFT | Transfer | | Cash | Check | ACH | EFT | Transfer |
| 1 | Date 1 | D | M | I | ⌂ | ⌂ | ⌂ | ⌂ | ⌂ | W | ⌂ | ⌂ | ⌂ | ⌂ | ⌂ |
| 2 | Date 2 | D+1 | M+1 | I+1 | • | • | • | • | • | W+1 | • | • | • | • | • |
| 3 | Date 3 | D+2 | M+2 | I+2 | • | • | • | • | • | W+2 | • | • | • | • | • |
| • | • | • | • | • | • | • | • | • | • | • | • | • | • | • | • |
| 30 | Date 30 | D+30 | M+30 | I+30 | ⌂ | ⌂ | ⌂ | ⌂ | ⌂ | W+30 | ⌂ | ⌂ | ⌂ | ⌂ | ⌂ |

34 — Deposit Calendar
35 — Withdrawal Calendar

Figure 4

Loan Accounts

Household Consolidation

| Day | Date | Loan Amount | Maturity Date | Loan Payment | Payment Calendar ||||| Withdrawal Amount | Withdrawal Calendar ||||
|---|---|---|---|---|---|---|---|---|---|---|---|---|---|
| | | | | | \multicolumn{4}{c}{Payment Type} | | \multicolumn{4}{c}{Withdrawal Type} |
| | | | | | Cash | Check | ACH | EFT | Transfer | | Cash | Check | ACH | EFT | Transfer |
| 1 | Date 1 | L | M | I | ☒ | | | | ☒ | W | ☒ | | | | ☒ |
| 2 | Date 2 | L+1 | M+1 | I+1 | | | | | | W+1 | | | | | |
| 3 | Date 3 | L+2 | M+2 | I+2 | | | | | | W+2 | | | | | |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |
| 30 | Date 30 | L+30 | M+30 | I+30 | ☒ | | | | ☒ | W+30 | ☒ | | | | ☒ |

36 — Payment Calendar
37 — Withdrawal Calendar

Figure 5

Consumer Expenditure Survey
Table 47
Expenditure Re-Classification

| Items | All Income Ranges | % Total Expenditure |
|---|---|---|
| Income before taxes | $ 58,712 | |
| Income after taxes | $ 56,304 | |
| Average Annual Expenditures | $ 46,409 | 100.0% |
| Mandatory Expenditures | $ 23,153 | 49.9% |
| Food at home | $ 3,297 | 7.1% |
| Shelter | $ 8,805 | 19.0% |
| Utilities, fuels, and public services | $ 3,183 | 6.9% |
| Healthcare | $ 2,664 | 5.7% |
| Personal insurance and pensions | $ 5,204 | 11.2% |
| Lifestyle Expenditures | $ 12,050 | 26.0% |
| Household operations | $ 801 | 1.7% |
| Housekeeping supplies | $ 611 | 1.3% |
| Apparel and services | $ 1,886 | 4.1% |
| Gasoline and motor oil | $ 2,013 | 4.3% |
| Other vehicle expenses | $ 2,339 | 5.0% |
| Public transportation | $ 448 | 1.0% |
| Personal care and services | $ 541 | 1.2% |
| Education | $ 940 | 2.0% |
| Miscellaneous | $ 2,471 | 5.3% |
| Leisure Expenditures | $ 5,893 | 12.7% |
| Food away from home | $ 2,634 | 5.7% |
| Alcoholic beverages | $ 426 | 0.9% |
| Entertainment | $ 2,388 | 5.1% |
| Reading | $ 126 | 0.3% |
| Tobacco products and smoking supplies | $ 319 | 0.7% |
| Luxury Expenditures | $ 5,311 | 11.4% |
| Housekeeping furnishings and equipment | $ 1,767 | 3.8% |
| Vehicle Transportation | $ 3,544 | 7.6% |
| Propensity to Save | $ 9,895 | 21.3% |

Figure 6

Personal ID Profile

| Primary Account Holder ID | Martial Status | Actual Income | Age | Homeowner with Mortgage | Homeowner without Mortgage | Renter | Occupation | Household Size | Estimated Income |
|---|---|---|---|---|---|---|---|---|---|
| NNNNNN | Single<br>Married | $NNN,NNN,NNN | NN | Yes<br>No | Yes<br>No | Yes<br>No | Professional<br>Clerical<br>Services<br>Construction<br>Laborer | NN | $NNN,NNN,NNN |
| Other Household Account ID | Household Relationship | Actual Income | Age | Homeowner with Mortgage | Homeowner without Mortgage | Renter | Occupation | Household Size | Estimated Income |
| NNNNNN | Wife<br>Child<br>Relative<br>Friend | $NNN,NNN,NNN | NN | | | | Professional<br>Clerical<br>Services<br>Construction<br>Laborer<br>Stay Home | | $NNN,NNN,NNN |

Household Income Modifier

40

| Expenditure Tables | | | Income Adjustment | |
|---|---|---|---|---|
| Table 47 | Head Household Age | 47 | % Income Adjustment | Personal ID Profile |
| | Martial Status | Married | | |
| | Estimated Household Income | $ 75,266 | | $ 75,266 |
| Table 51 | Homeowner with Mortgage | $ 82,432 | 9.5% | |
| | Homeowner without Mortgage | $ 50,580 | -32.8% | -32.8% |
| | Renter | $ 33,765 | -55.1% | |
| Table 53 | Professional | $ 94,060 | 25.0% | 25.0% |
| | Clerical | $ 59,200 | -21.3% | |
| | Services | $ 43,165 | -42.7% | |
| | Construction | $ 56,697 | -24.7% | |
| | Laborer | $ 46,104 | -38.7% | |
| Table 48 | Household Size = 3 | $ 74,069 | -1.6% | -1.6% |
| | Household Size = 4 | $ 78,183 | 3.9% | |
| | Household Size = 5+ | $ 81,275 | 8.0% | |
| Total | Weighted % Change | | | -9.4% |
| | Adjusted Household Income | | | $ 68,191 |

Figure 8

Consumer Price Index

Table 3

Monthly CPI-U Re-Classification

41

| Items | CPI Index | | Dec. 2006 % Change |
|---|---|---|---|
| | Dec. 2006 | Dec. 2005 | |
| Mandatory Expenditures | | | |
| Food at home | 194.3 | 191.7 | 1.4% |
| Shelter | 235.1 | 225.6 | 4.2% |
| Utilities, fuels, and public services | 192.6 | 191.6 | 0.5% |
| Healthcare | 340.1 | 328.4 | 3.6% |
| Lifestyle Expenditures | | | |
| Household operations | 139.1 | 133.3 | 4.4% |
| Housekeeping supplies | 168.3 | 161.8 | 4.0% |
| Apparel and services | 118.6 | 117.5 | 0.9% |
| Gasoline and motor oil | 199.3 | 187.3 | 6.4% |
| Other vehicle expenses | 218.8 | 210.7 | 3.8% |
| Public transportation | 217.8 | 217.6 | 0.1% |
| Personal care and services | 193.3 | 187.6 | 3.0% |
| Education | 167.6 | 157.6 | 6.3% |
| Miscellaneous | 318.7 | 306.6 | 3.9% |
| Leisure Expenditures | | | |
| Food away from home | 202.2 | 196.0 | 3.2% |
| Alcoholic beverages | 201.1 | 196.4 | 2.4% |
| Entertainment | 110.8 | 109.7 | 1.0% |
| Reading | 205.7 | 204.0 | 0.8% |
| Tobacco products and smoking supplies | 527.3 | 513.1 | 2.8% |
| Luxury Expenditures | | | |
| Housekeeping furnishings and equipment | 127.0 | 126.4 | 0.5% |
| Vehicle Purchase | 94.8 | 95.8 | -1.0% |

Figure 9

Consumer Expenditure Survey

Table 2

| Items | Under 25 Years | 25-34 Years | 35-44 Years | 45-54 Years | 55-64 Years | 65-74 Years | 75 Years & Older |
|---|---|---|---|---|---|---|---|
| Income before taxes | $ 27,494 | $ 55,066 | $ 72,699 | $ 75,266 | $ 64,156 | $ 45,202 | $ 28,552 |
| Income after taxes | $ 27,120 | $ 53,257 | $ 69,619 | $ 71,442 | $ 61,068 | $ 43,976 | $ 27,924 |
| Average annual expenditure | $ 27,776 | $ 45,068 | $ 55,190 | $ 55,854 | $ 49,592 | $ 38,573 | $ 23,016 |
| Propensity to save | $ (656) | $ 8,189 | $ 14,429 | $ 15,588 | $ 11,476 | $ 5,403 | $ 4,908 |

CPI Monthly Conversion

| Month | Jan | Feb | Mar | Apr | May | Jun | Jul | Aug | Sep | Oct | Nov | Dec |
|---|---|---|---|---|---|---|---|---|---|---|---|---|
| Income before taxes | $ 5,346 | $ 5,346 | $ 5,346 | $ 5,346 | $ 5,346 | $ 5,346 | $ 5,346 | $ 5,346 | $ 5,346 | $ 5,346 | $ 5,346 | $ 5,346 |
| Income after taxes | $ 5,089 | $ 5,089 | $ 5,089 | $ 5,089 | $ 5,089 | $ 5,089 | $ 5,089 | $ 5,089 | $ 5,089 | $ 5,089 | $ 5,089 | $ 5,089 |
| Average annual expenditure | $ 4,192 | $ 4,154 | $ 4,086 | $ 4,136 | $ 4,067 | $ 4,176 | $ 4,087 | $ 4,132 | $ 4,136 | $ 4,034 | $ 4,198 | $ 4,194 |
| Propensity to save | $ 897 | $ 935 | $ 1,003 | $ 953 | $ 1,022 | $ 913 | $ 1,002 | $ 957 | $ 953 | $ 1,055 | $ 891 | $ 895 |

Consumer Expenditure Survey

Table 47 Expenditure Percentage

| Items | All Income Ranges | % Total Expenditure | Under 25 Years | 25-34 Years | 35-44 Years | 45-54 Years | 55-64 Years | 65-74 Years | 75 Years & Older |
|---|---|---|---|---|---|---|---|---|---|
| | | | | | % Comparison | | | | |
| Income before taxes | $ 58,712 | | $ 27,494 | $ 55,066 | $ 72,699 | $ 75,266 | $ 64,156 | $ 45,202 | $ 28,552 |
| Income after taxes | $ 56,304 | | $ 27,120 | $ 53,257 | $ 69,619 | $ 71,442 | $ 61,068 | $ 43,976 | $ 27,924 |
| Average Annual Expenditures | $ 46,409 | 100.0% | $ 27,776 | $ 45,068 | $ 55,190 | $ 55,854 | $ 49,592 | $ 38,573 | $ 23,018 |
| Mandatory Expenditures | $ 23,153 | 49.9% | 43.3% | 48.9% | 50.3% | 49.8% | 50.2% | 49.9% | 56.1% |
| Food at home | $ 3,297 | 7.1% | 6.9% | 6.5% | 7.5% | 6.8% | 7.0% | 7.7% | 8.2% |
| Shelter | $ 8,805 | 19.0% | 19.9% | 21.1% | 19.6% | 18.4% | 17.5% | 16.7% | 19.4% |
| Utilities, fuels, and public services | $ 3,183 | 6.9% | 6.3% | 6.5% | 6.5% | 6.6% | 6.9% | 8.0% | 9.4% |
| Healthcare | $ 2,664 | 5.7% | 2.5% | 3.4% | 4.1% | 4.8% | 6.9% | 10.8% | 15.6% |
| Personal insurance and pensions | $ 5,204 | 11.2% | 7.7% | 11.4% | 12.6% | 13.2% | 11.9% | 6.7% | 3.5% |
| Lifestyle Expenditures | $ 12,050 | 26.0% | 28.2% | 25.3% | 25.1% | 26.7% | 25.4% | 26.6% | 26.1% |
| Household operations | $ 801 | 1.7% | 1.4% | 2.2% | 2.1% | 1.2% | 1.4% | 1.8% | 2.3% |
| Housekeeping supplies | $ 611 | 1.3% | 0.9% | 1.1% | 1.3% | 1.3% | 1.5% | 1.7% | 1.5% |
| Apparel and services | $ 1,886 | 4.1% | 5.7% | 4.6% | 4.3% | 4.2% | 3.6% | 3.4% | 2.2% |
| Gasoline and motor oil | $ 2,013 | 4.3% | 5.5% | 4.7% | 4.3% | 4.3% | 4.2% | 4.1% | 3.1% |
| Other vehicle expenses | $ 2,339 | 5.0% | 5.5% | 5.2% | 4.8% | 5.1% | 5.1% | 5.0% | 4.7% |
| Public transportation | $ 448 | 1.0% | 0.7% | 0.8% | 0.9% | 1.0% | 1.1% | 1.2% | 0.9% |
| Personal care and services | $ 541 | 1.2% | 1.2% | 1.1% | 1.1% | 1.1% | 1.1% | 1.3% | 1.6% |
| Education | $ 940 | 2.0% | 4.9% | 1.7% | 1.7% | 3.2% | 1.5% | 0.7% | 0.6% |
| Miscellaneous | $ 2,471 | 5.3% | 2.4% | 3.9% | 4.6% | 5.3% | 5.9% | 7.4% | 9.2% |
| Leisure Expenditures | $ 5,893 | 12.7% | 15.0% | 13.4% | 12.6% | 13.0% | 12.3% | 12.4% | 9.6% |
| Food away from home | $ 2,634 | 5.7% | 7.3% | 6.0% | 5.9% | 5.7% | 5.5% | 5.0% | 4.3% |
| Alcoholic beverages | $ 426 | 0.9% | 1.4% | 1.1% | 0.9% | 0.8% | 0.9% | 0.8% | 0.6% |
| Entertainment | $ 2,388 | 5.1% | 5.0% | 5.4% | 5.0% | 5.4% | 4.9% | 5.6% | 3.8% |
| Reading | $ 126 | 0.3% | 0.2% | 0.2% | 0.2% | 0.3% | 0.3% | 0.4% | 0.5% |
| Tobacco products and smoking supplies | $ 319 | 0.7% | 1.1% | 0.7% | 0.6% | 0.8% | 0.7% | 0.6% | 0.4% |
| Luxury Expenditures | $ 5,311 | 11.4% | 13.5% | 12.4% | 12.0% | 10.5% | 12.1% | 11.1% | 8.2% |
| Housekeeping furnishings and equipment | $ 1,767 | 3.8% | 3.7% | 3.6% | 4.0% | 3.4% | 4.5% | 4.3% | 3.0% |
| Vehicle Purchase | $ 3,544 | 7.6% | 9.8% | 8.8% | 8.0% | 7.1% | 7.6% | 6.8% | 5.2% |
| Propensity to Save | $ 9,895 | 21.3% | 0.0% | | | | | | 0.0% |

Variable Withdrawal Inter-temporal Rate Conversion

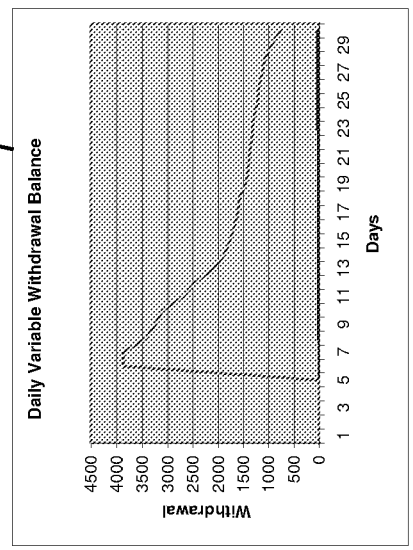

| Variable Withdrawal Rate Conversion |||||||
|---|---|---|---|---|---|---|
| f'(VW) Rate Range (minus) | Expenditure Classification | Substitution Rate | Risk Aversion | Expenditure Preference | Propensity Consume | Propensity Save |
| 1.0 - 0.9 | Mandatory | Low | High | Low | High | Low |
| 0.9 - 0.8 | | | | | | |
| 0.8 - 0.7 | | | | | | |
| 0.7 - 0.6 | Luxury | Low-Average | High-Average | Low-Average | High-Average | Low-Average |
| 0.6 - 0.5 | | | | | | |
| 0.5 - 0.4 | Lifestyle | Average | Average | Average | Average | Average |
| 0.4 - 0.3 | | | | | | |
| 0.3 - 0.2 | Liesure | Average-High | Average-Low | Average-High | Average-Low | Average-High |
| 0.2 - 0.1 | | | | | | |
| 0.1 - 0.0 | Savings | High | Low | High | Low | High |

Figure 15

Detail Variable Withdrawal Rate Conversion

Table 70:

| f*(VW) Rate Range (minus) | Expenditure Classification | Withdrawal Amount | Withdrawal Probability |
|---|---|---|---|
| 1.0 - 0.9 | Mandatory | ↔ | ↔ |
| 0.9 - 0.8 | | | |
| 0.8 - 0.7 | Luxury | | |
| 0.7 - 0.6 | | | |
| 0.6 - 0.5 | Lifestyle | | |
| 0.5 - 0.4 | | | |
| 0.4 - 0.3 | Leisure | | |
| 0.3 - 0.2 | | | |
| 0.2 - 0.1 | Saving | | |
| 0.1 - 0.0 | | | |

Table 71:

| f*(VW) Rate Range (minus) | Substitution Rate | Withdrawal Amount | Withdrawal Probability |
|---|---|---|---|
| 1.0 - 0.9 | Low | ↔ | ↔ |
| 0.9 - 0.8 | | | |
| 0.8 - 0.7 | | | |
| 0.7 - 0.6 | | | |
| 0.6 - 0.5 | Low-Average | | |
| 0.5 - 0.4 | | | |
| 0.4 - 0.3 | Average | | |
| 0.3 - 0.2 | | | |
| 0.2 - 0.1 | Average-High | | |
| 0.1 - 0.0 | High | | |

Table 72:

| f*(VW) Rate Range (minus) | Risk Aversion | Withdrawal Amount | Withdrawal Probability |
|---|---|---|---|
| 1.0 - 0.9 | High | ↔ | ↔ |
| 0.9 - 0.8 | | | |
| 0.8 - 0.7 | | | |
| 0.7 - 0.6 | | | |
| 0.6 - 0.5 | | | |
| 0.5 - 0.4 | High-Average | | |
| 0.4 - 0.3 | Average | | |
| 0.3 - 0.2 | Average-Low | | |
| 0.2 - 0.1 | Low | | |
| 0.1 - 0.0 | | | |

Table 73:

| f*(VW) Rate Range (minus) | Expenditure Preference | Withdrawal Amount | Withdrawal Probability |
|---|---|---|---|
| 1.0 - 0.9 | Low | ↔ | ↔ |
| 0.9 - 0.8 | | | |
| 0.8 - 0.7 | | | |
| 0.7 - 0.6 | Low-Average | | |
| 0.6 - 0.5 | | | |
| 0.5 - 0.4 | Average | | |
| 0.4 - 0.3 | | | |
| 0.3 - 0.2 | Average-High | | |
| 0.2 - 0.1 | | | |
| 0.1 - 0.0 | High | | |

Table 74:

| f*(VW) Rate Range (minus) | Propensity Consume | Withdrawal Amount | Withdrawal Probability |
|---|---|---|---|
| 1.0 - 0.9 | High | ↔ | ↔ |
| 0.9 - 0.8 | | | |
| 0.8 - 0.7 | | | |
| 0.7 - 0.6 | | | |
| 0.6 - 0.5 | High-Average | | |
| 0.5 - 0.4 | | | |
| 0.4 - 0.3 | Average | | |
| 0.3 - 0.2 | | | |
| 0.2 - 0.1 | Average-Low | | |
| 0.1 - 0.0 | Low | | |

Table 75:

| f*(VW) Rate Range (minus) | Propensity Save | Withdrawal Amount | Withdrawal Probability |
|---|---|---|---|
| 1.0 - 0.9 | Low | ↔ | ↔ |
| 0.9 - 0.8 | | | |
| 0.8 - 0.7 | | | |
| 0.7 - 0.6 | | | |
| 0.6 - 0.5 | | | |
| 0.5 - 0.4 | | | |
| 0.4 - 0.3 | Low-Average | | |
| 0.3 - 0.2 | Average | | |
| 0.2 - 0.1 | Average-High | | |
| 0.1 - 0.0 | High | | |

Figure 16

Household Expenditure Report

| Household Income Range | Household Population | Expenditure Classifications | Consumer Expenditure Survey | Withdrawal Expenditure Classification | Withdrawal Classification Probability | Consumer Expenditure Variance | Consumer Variance Percentage | Substitution Amount | Substitution Probability | Risk Aversion Amount | Risk Aversion Probability | Preference Amount | Preference Probability |
|---|---|---|---|---|---|---|---|---|---|---|---|---|---|
| $90,000 and more | 2,029 | Mandatory | $ 33,730 | $ 33,055 | 91% | $ 675 | 2% | $ 1,983 | 92% | $ 436 | 94% | $ 992 | 98% |
| | | Lifestyle | 18,084 | 16,637 | 89% | 1,447 | 9% | 5,324 | 82% | 1,810 | 92% | 2,662 | 96% |
| | | Leisure | 8,805 | 7,660 | 86% | 1,145 | 15% | 5,132 | 91% | 2,207 | 78% | 2,566 | 89% |
| | | Luxury | 7,112 | 6,116 | 78% | 996 | 16% | 4,771 | 89% | 2,672 | 84% | 2,385 | 81% |
| | | Save | 13,384 | 11,243 | 69% | 2,141 | 19% | 4,047 | 84% | 1,376 | 67% | 2,024 | 79% |
| | | Total | $ 81,115 | $ 63,469 | 83% | $ 7,646 | 28% | $ 21,258 | 88% | $ 8,501 | 83% | $ 10,629 | 89% |
| ••••• | ••••• | ••••• | ••••• | ••••• | ••••• | ••••• | ••••• | ••••• | ••••• | ••••• | ••••• | ••••• | ••••• |
| $20,000 to $29,999 | 67,542 | Mandatory | $ 11,648 | $ 11,415 | 98% | $ 233 | 2% | $ 457 | 98% | $ 420 | 98% | $ 228 | 99% |
| | | Lifestyle | 3,915 | 3,602 | 94% | 313 | 9% | 792 | 97% | 681 | 95% | 396 | 98% |
| | | Leisure | 548 | 477 | 73% | 71 | 15% | 67 | 99% | 45 | 2% | 33 | 96% |
| | | Luxury | - | - | 0% | - | 0% | - | 0% | - | 0% | - | 0% |
| | | Save | - | - | 0% | - | 0% | - | 0% | - | 0% | - | 0% |
| | | Total | $ 16,111 | $ 15,494 | 88% | $ 617 | 4% | $ 1,316 | 98% | $ 1,146 | 65% | $ 658 | 98% |

Household Investment Report

Month: March — 103

| Household Income Range | Household Population | Investment Range | Investment Probability | Investment Amount | Substitution Amount | Cumulative Substitution Probability | Risk Aversion Amount | Risk Aversion Probability | Preference Amount | Preference Probability |
|---|---|---|---|---|---|---|---|---|---|---|
| $90,000 or more | 435 | Greater $4,501 | 53% | $ 1,210,388 | $ 677,817 | 92% | $ 74,560 | 33% | $ 460,916 | 0% |
| $70,000-$89,999 | 784 | $4,500 - $4,001 | 38% | $ 1,266,160 | $ 620,418 | 89% | $ 86,859 | 41% | $ 420,247 | 0% |
| $60,000-$69,999 | 972 | $4,000 - $3,501 | 32% | $ 1,166,400 | $ 478,224 | 83% | $ 90,863 | 52% | $ 399,912 | 0% |
| $50,000-$59,999 | 1,876 | $3,500 - $3,001 | 23% | $ 1,402,310 | $ 518,855 | 78% | $ 129,714 | 68% | $ 359,243 | 0% |
| $40,000-$49,999 | 4,981 | $3,000 - $2,501 | 21% | $ 2,876,528 | $ 920,489 | 72% | $ 285,352 | 79% | $ 338,909 | 0% |
| $30,000-$39,999 | 8,452 | $2,500 - $2,001 | 17% | $ 3,232,890 | $ 872,880 | 64% | $ 401,525 | 84% | $ 311,796 | 0% |
| $20,000-$29,999 | 11,675 | $2,000 - $1,501 | 11% | $ 2,247,438 | $ 494,436 | 56% | $ 262,051 | 89% | $ 257,570 | 0% |
| $15,000-$19,999 | 28,752 | $1,500 - $1,001 | 9% | $ 3,234,600 | $ 452,844 | 48% | $ 276,235 | 92% | $ 223,680 | 0% |
| $10,000-$14,999 | 67,569 | $1,000 - $501 | 4% | $ 2,027,070 | $ 162,166 | 29% | $ 110,273 | 96% | $ 189,789 | 0% |
| $5,000-$9,999 | 115,896 | Under $500 | 2% | $ 579,480 | $ - | 0% | $ - | 0% | $ - | 0% |
| TOTAL | 241,392 | | | $ 19,243,263 | $ 5,198,129 | 61% | $ 1,717,430 | 63% | $ 2,962,060 | 0% |

Figure 20

Household Investment Report
S&P 500 Index Mutual Fund
Qualified DDA Customers

| Number Customers | DDA Customer | DDA Number | Customer Since Date | Short Term Investment Amount | Short Term Investment Period | Short Term Investment Probability | Long Term Investment Amount | Long Term Investment Period | Long Term Investment Probability | Long-Term Household Economic Indicators - Substitution Amount | Probability | Long-Term Household Economic Indicators - Risk Aversion Amount | Probability | Long-Term Household Economic Indicators - Preference Amount | Probability |
|---|---|---|---|---|---|---|---|---|---|---|---|---|---|---|---|
| 1 | John Doe | 1-275678 | 02-Feb-98 | $ 4,789 | Mar-May | 73% | $ 11,987 | Mar-Aug | 33% | $ 7,911 | 91% | $ 2,215 | 77% | $ 5,380 | 87% |
| 2 | Mary Little | 1-107852 | 21-Jun-87 | $ 4,656 | Mar-May | 71% | $ 11,678 | Mar-Aug | 32% | $ 7,474 | 89% | $ 2,018 | 74% | $ 4,634 | 86% |
| 3 | Bob Page | 1-582763 | 14-Nov-02 | $ 4,234 | Mar-May | 68% | $ 11,256 | Mar-Aug | 29% | $ 6,866 | 87% | $ 1,785 | 71% | $ 4,051 | 85% |
| 4 | Bill Smith | 1-119762 | 18-Jun-99 | $ 3,976 | Mar-May | 71% | $ 10,899 | Mar-Aug | 30% | $ 6,430 | 87% | $ 1,479 | 70% | $ 3,408 | 82% |
| • • • | • • • | — | • • • | • • • | • • • | • • • | • • • | • • • | • • • | • • • | • • • | • • • | • • • | • • • | • • • |
| 2,345 | Linda Smart | 1-687264 | 24-Sep-95 | $ 2,987 | Mar-May | 72% | $ 7,658 | Mar-Aug | 28% | $ 4,365 | 83% | $ 786 | 61% | $ 2,183 | 73% |
| Total | — | — | — | $ 8,911,000 | — | 70% | $ 19,463,500 | — | 30% | $ 13,497,820 | 88% | $ 2,309,825 | 68% | $ 7,328,125 | 79% |

Lifestyle Expenditure Report

| Month | | | | | March | | | | | | |
|---|---|---|---|---|---|---|---|---|---|---|---|
| Household Income Range | Household Population | Average Lifestyle Expenditure | Expenditure Probability | Expenditure Potential | Substitution | | Cumulative Probability | Risk Aversion | | Preference | |
| | | | | | Amount | | | Amount | Probability | Amount | Probability |
| $90,000 or more | 435 | $ 2,065 | 53% | $ 476,086 | $ 266,608 | | 84% | $ 29,327 | 23% | $ 181,293 | 76% |
| $70,000-$89,999 | 784 | $ 1,360 | 38% | $ 405,171 | $ 198,534 | | 81% | $ 27,795 | 27% | $ 165,297 | 71% |
| $60,000-$69,999 | 972 | $ 1,202 | 32% | $ 373,870 | $ 153,287 | | 77% | $ 29,124 | 37% | $ 157,299 | 67% |
| $50,000-$59,999 | 1,876 | $ 1,021 | 23% | $ 440,541 | $ 163,000 | | 73% | $ 40,750 | 42% | $ 141,302 | 61% |
| $40,000-$49,999 | 4,981 | $ 839 | 21% | $ 877,602 | $ 280,833 | | 68% | $ 87,058 | 51% | $ 133,304 | 56% |
| $30,000-$39,999 | 8,452 | $ 720 | 17% | $ 1,034,525 | $ 279,322 | | 61% | $ 128,488 | 67% | $ 122,640 | 51% |
| $20,000-$29,999 | 11,675 | $ 591 | 15% | $ 1,034,989 | $ 227,698 | | 56% | $ 120,680 | 73% | $ 101,311 | 47% |
| $15,000-$19,999 | 28,752 | $ 479 | 13% | $ 1,790,387 | $ 250,654 | | 47% | $ 152,899 | 77% | $ 87,981 | 42% |
| $10,000-$14,999 | 67,569 | $ 403 | 11% | $ 2,995,334 | $ 239,627 | | 39% | $ 162,946 | 81% | $ 74,650 | 38% |
| $5,000-$9,999 | 115,896 | $ 336 | 9% | $ 3,504,695 | $ - | | 0% | $ - | 0% | $ - | 0% |
| TOTAL | 241,392 | | | $ 12,933,200 | $ 2,059,562 | | 59% | $ 779,067 | 48% | $ 1,165,077 | 51% |

Household Risk Report

Consolidated Risk Summary

| Household Income Range | Household Population | Risk Aversion Rate | Potential Attrition Population | Risk Aversion Rate | Potential Default Population | Risk Aversion Rate | Potential Fraud Population | Risk Aversion Rate | Potential Money Laundering Population | Total Risk Population |
|---|---|---|---|---|---|---|---|---|---|---|
| $90,000 or more | 2,029 | 0% | 0 | 0% | 0 | 0% | 0 | 0% | 0 | 0 |
| $70,000-$89,999 | 3,413 | 0% | 0 | 0% | 0 | 0% | 0 | 1% | 34 | 34 |
| $60,000-$69,999 | 7,514 | 1% | 75 | 0% | 0 | 0% | 0 | 1% | 75 | 150 |
| $50,000-$59,999 | 10,511 | 3% | 315 | 2% | 210 | 0% | 0 | 1% | 105 | 631 |
| $40,000-$49,999 | 28,571 | 4% | 1,143 | 3% | 857 | 1% | 286 | 0% | 0 | 2,286 |
| $30,000-$39,999 | 46,921 | 7% | 3,284 | 6% | 2,815 | 6% | 2,815 | 0% | 0 | 8,915 |
| $20,000-$29,999 | 67,542 | 11% | 7,430 | 9% | 6,079 | 3% | 2,026 | 0% | 0 | 15,535 |
| $15,000-$19,999 | 39,461 | 18% | 7,103 | 11% | 4,341 | 1% | 395 | 0% | 0 | 11,838 |
| $10,000-$14,999 | 24,832 | 21% | 5,215 | 17% | 4,221 | 0% | 0 | 0% | 0 | 9,436 |
| $5,000-$9,999 | 10,598 | 30% | 3,179 | 22% | 2,332 | 0% | 0 | 0% | 0 | 5,511 |
| — | 241,392 | — | 27,745 | — | 20,855 | — | 5,522 | — | 214 | 54,336 |

Account Performance Forecasting

119

| Period | March | | | | | | | 2005 | | | | | |
|---|---|---|---|---|---|---|---|---|---|---|---|---|---|
| | Forecast | | Actual | | | | | Forecast | | Actual | | | |
| Deposit Types | Total Deposit Amount | Customer Population | Total Deposit Amount | Customer Population | Cumulative Dep Amt Variance | Cumulative Dep Amt Variance % | | Total Deposit Amount | Customer Population | Total Deposit Amount | Customer Population | Cumulative Dep Amt Variance | Cumulative Dep Amt Variance % |
| Total New Deposits | $ 41,306 | 4,089 | $ 42,958 | 4,166 | $ 1,552 | 4% | | $113,591 | 19,083 | $128,514 | 21,657 | $14,924 | 13% |
| Non-Interest Demand Deposits | $ 5,750 | 25 | $ 6,613 | 28 | 863 | 15% | | $ 15,814 | 7,907 | $ 18,689 | 9,344 | $ 2,875 | 18% |
| NOW Accounts | $ 200 | 67 | $ 163 | 54 | (38) | -19% | | $ 550 | 183 | $ 575 | 192 | $ 25 | 5% |
| Savings Account | $ 4,347 | 869 | $ 3,804 | 761 | (543) | -13% | | $ 11,955 | 2,391 | $ 13,041 | 2,608 | $ 1,087 | 9% |
| Money Market Accounts | $ 9,135 | 1,305 | $ 10,505 | 1,501 | 1,370 | 15% | | $ 25,120 | 3,589 | $ 25,120 | 3,589 | $ - | 0% |
| Certificate of Deposits | $ 21,873 | 1,823 | $ 21,873 | 1,823 | - | 0% | | $ 60,151 | 5,013 | $ 71,088 | 5,924 | $10,937 | 18% |
| Total Existing Deposits | $ 87,403 | 7,789 | $ 87,163 | 7,965 | $ (239) | 0% | | $263,261 | 52,438 | $261,116 | 51,418 | $ (2,144) | -1% |
| Non-Interest Demand Deposits | $ 19,390 | 74 | $ 18,455 | 73 | (934) | -5% | | $ 58,403 | 29,201 | $ 56,768 | 28,384 | $ (1,635) | -3% |
| NOW Accounts | $ 969 | 323 | $ 934 | 311 | (35) | -4% | | $ 2,919 | 973 | $ 2,814 | 938 | $ (105) | -4% |
| Savings Account | $ 9,020 | 1,804 | $ 8,803 | 1,761 | (217) | -2% | | $ 27,170 | 5,434 | $ 26,952 | 5,390 | $ (217) | -1% |
| Money Market Accounts | $ 12,636 | 1,805 | $ 15,225 | 2,175 | 2,588 | 20% | | $ 38,061 | 5,437 | $ 36,234 | 5,176 | $ (1,827) | -5% |
| Certificate of Deposits | $ 45,387 | 3,782 | $ 43,747 | 3,646 | (1,640) | -4% | | $136,708 | 11,392 | $138,348 | 11,529 | $ 1,640 | 1% |
| Total Deposit Closures | $ 40,865 | 4,184 | $ 41,036 | 4,230 | $ 171 | 0% | | $114,621 | 17,883 | $121,564 | 19,199 | $ 6,943 | 6% |
| Non-Interest Demand Deposits | $ 4,421 | 19 | $ 4,690 | 23 | 270 | 6% | | $ 12,399 | 6,200 | $ 13,693 | 6,847 | $ 1,294 | 10% |
| NOW Accounts | $ 205 | 68 | $ 193 | 64 | (13) | -6% | | $ 575 | 192 | $ 615 | 205 | $ 40 | 7% |
| Savings Account | $ 4,456 | 891 | $ 4,619 | 924 | 163 | 4% | | $ 12,498 | 2,500 | $ 13,639 | 2,728 | $ 1,141 | 9% |
| Money Market Accounts | $ 9,363 | 1,338 | $ 9,934 | 1,419 | 571 | 6% | | $ 26,262 | 3,752 | $ 27,176 | 3,882 | $ 913 | 3% |
| Certificate of Deposits | $ 22,420 | 1,868 | $ 21,600 | 1,800 | (820) | -4% | | $ 62,886 | 5,240 | $ 66,440 | 5,537 | $ 3,554 | 6% |
| TOTAL ALL DEPOSITS | $ 169,573 | 16,062 | $171,156 | 16,362 | $ 1,583 | 1% | | $491,472 | 89,404 | $511,194 | 92,273 | $ 19,722 | 4% |

Figure 25

SYSTEM AND METHOD FOR MATCHING CUSTOMERS TO FINANCIAL PRODUCTS, SERVICES, AND INCENTIVES BASED ON BANK ACCOUNT TRANSACTION ACTIVITY

CROSS-REFERENCES TO RELATED APPLICATIONS

This application is a Non-Provisional Utility application which is a continuation-in-part of and claims benefit of co-pending U.S. patent application Ser. No. 10/858,745 filed Jun. 2, 2004, entitled "Systems and Methods for Scoring Bank Customers Direct Deposit Account Transaction Activity to Match Financial Behavior to Specific Acquisition, Performance and Risk Events Defined by the Bank Using a Decision Tree and Stochastic Process" which is hereby incorporated by reference.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

This invention generally relates to systems and methods used by financial institutions to identify existing customers as potential targets for the marketing of additional financial products and services. More particularly, this invention pertains to systems and methods for matching bank customers to financial products, services, and retail sales incentives by analyzing the cash transaction activity of customer holding a direct-deposit-account.

Banks continuously try to offer and cross-sell their customers additional products and services. One established marketing technique is to induce customers with savings accounts to open a certificate of deposit, or to induce customers retaining a certificate of deposit to participate in an investment fund at a higher interest rate yield. As an incentive to consider the cross-sell offer, banks offer "free" items such as kitchen appliances. One flaw associated with this "free product" incentive technique is that no consideration is given to the customer's individual preference or financial ability to be a candidate for the products being offered for a bank-defined acquisition program.

Over the last decade, banks have strengthened their retail cross-sell marketing initiatives by implementing demographic and lifestyle segmentation systems to better target and match acquisition products. These segmentation systems break down a bank customer database into lifestyle categories such as elite suburbs, urban core, country families, and rustic living. This lifestyle category may take into account a variety of factors including the age of the customer, individual and household income, marital status, family size, homeowner or renter status, ZIP code, occupation, and educational level to determine the best customer group to offer products.

When the lifestyle segment is selected, various statistical models are applied to lifestyle information stored in these segments. These models generate a statistical score and probability of a customer residing in the segment. The score and probability determinations help the bank identify the customer clusters that contain the more and less likely candidates that best match a bank defined acquisition, performance and risk initiatives. The statistical models used for this statistical probability process include, but are not limited to, time series, linear regression, and logistic regression models, or the use of decision tree and regression segmentation modeling techniques, such as Chi-Square Automatic Interactive Detector (CHAID) or Classification and Regression Tree (CART) models. The implementation of this class of statistical technology has contributed to an increase in the response rate from less than one-half percent a decade ago, to over two percent for a bank's target marketing programs. These lifestyle segmentation and statistical models are sometimes expanded to assist a bank in identifying customers that match specific bank defined performance and fraud detection criteria.

One example of bank-defined performance criteria is comparing a customer's beginning and ending account balance activity to a customer's income and demographic segment to evaluate a customer's financial potential to the bank. The customer account-balance-to-income metrics assist bank management in directing marketing campaigns to attract high valued customers to increase bank usage.

Another example of bank-defined risk criteria is matching a customer's income and demographic segment classification to a customer's monthly deposit activity. This allows the bank to detect and forecast a pattern change in deposits activity that could affect a future loan or mortgage payment.

One weakness in prior art lifestyle segmentation and statistical scoring modeling techniques is that no consideration has been given to measuring the individual and household consumption patterns found within each bank customer direct deposit, time deposit, and loan accounts to score and forecast the financial rate of substitution that a customer will support, the spending preferences of the customer, and the aversion to risk for each customers household.

Another prior art method that has taught the use of relationship scoring to identify customers that best match a bank defined incentive reward program is described in U.S. Pat. No. 6,009,415, issued to Shurling, et al., where each social security number (SSN) stored in a bank's customer-information-file (CIF) is assigned relationship points based on the number of bank accounts that are tied to a SSN holder. The length of time that each bank account is in existence is made part of the generation of the relationship points. An example of a relationship point matrix would then be the number of deposit account relationships, loan account relationships, and safe deposit account relationships owned by a SSN holder with the bank. Through a computer implementation of the relationship scoring system, the relationship points are summed for each SSN holder and matched to a specific incentive reward. Based on the points accumulated, an incentive reward could be reducing the interest rate on a loan, increasing interest paid on a deposit account, or eliminating the service charges on specific accounts.

The deficiency found in the methods of Shurling, et al., is that no consideration is given to the account usage, the account balances, and the account transaction history to justify the customer incentives. Assessing and scoring the number of bank accounts and years of longevity overlooks addressing the financial worthiness of the SSN holder to be a viable candidate to justify an incentive.

In the credit verification industry, an economic scoring technique has been a development that determines the likelihood that a credit user will pay his or her bills. The FICO scoring algorithm uses a scoring model and mathematical tables to assign points for different pieces of information which best predict future credit card payment behavior. The credit score analysis takes into consideration a borrower's credit history such as late payments, the amount of time credit has been established, the amount of credit used versus the amount of credit available, the length of time at present residence, and the negative credit information such as bankruptcies, charge-offs, collections, etc. The success of the FICO scoring algorithm has taught that by measuring and scoring the variation in payment history, that customer future payment ability can be forecast to a high degree of accuracy.

Economists for years have used the Euler equations to estimate the inter-temporal elasticity of substitution of individuals or households. From this consumption theoretical analysis the expenditure rates for maintaining a household, the expenditure rates for supporting a lifestyle, the propensity to save, and the aversion to risk can be predicted for an individual or a household. The empirical research foundation for proving these theoretical assumptions has been to use the consumption information provided by the Consumer Expenditure Survey published by the U.S. Department of Labor Bureau of Statistics. Because this consumption information is based on national or regional group consumption averages, the prediction results only address the consumption patterns for a selected demographic population. To obtain the consumption results for a specific individual or household, the actual consumption patterns would have to be observed. The banking industry is in a position for providing the insight to the consumption pattern for the individuals or households residing in each bank's database.

BRIEF SUMMARY OF THE INVENTION

The present invention relates to a system and method for matching bank customers to financial products, services, and retail sales incentives by predicting the financial income and expenditure behavior of bank customers having an active direct-deposit-account (DDA) with the bank. To determine each DDA holder's financial behavior, the system measures, classifies, scores, rates and forecasts the flow of the cash transactions within a customer's DDA, time-deposit, and loan accounts to predict the most likely and less likely candidates for bank-defined acquisition, performance, and risk initiatives. By adding the cash transaction scoring and forecasting component to the household income and expenditure profiles for each DDA customer or household, the system can predict with a high degree of accuracy financial substitution factors for the customer household, including the financial rate of substitution, the rate of substitution amount that the DDA customer of household is willing to risk, and the rate of substitution amount that will require a preference spending decision. The system can be implemented at any bank including a commercial bank, a savings bank, a savings and loan association, a credit union, or any financial institution processing a demand-deposit account.

The system establishes a monthly cash transaction deposit and withdrawal calendar for each account type retained by a DDA account holder at the banking institution. The cash transaction activity from these DDA, time-deposit, and loan cash transaction accounts are stored in each account-type calendar. In a preferred embodiment of the invention, the system applies a time series statistical pattern recognition model to the deposit and withdrawal cash transaction calendars to determine the frequency and probability of the deposit and withdrawal transaction amounts. A frequency and probability limit range is established for these deposit and withdrawal amount patterns to classify the deposit and withdrawal cash transactions into one the following groups: fixed or variable deposit amounts or fixed or variable withdrawal amounts.

To enhance the probability prediction for each deposit and withdrawal group, a preferred embodiment of the system maintains a statistical formula based on an inter-temporal functional derivative and stochastic probability process to measure the deposit and withdrawal rates for each DDA household. The ascending deposit rate and descending withdrawal rate provide the statistical pattern recognition processor with a cash transaction metric to assist in the separation of the fixed versus variable classifications.

The deposit transactions classified as fixed deposits are used to calculate the percent of the net income being processed by the bank. This income percentage is used to compare a DDA household having a low income processing percentage to a DDA household having a high income processing percentage, to thereby determine the income to expenditure profile that best matches the DDA household with a low processing percentage. This household income comparison process is applied to each DDA household residing in the bank's database.

The variable deposits are classified as secondary household income. Based on the frequency and probability, the variable deposits are classified as mandatory household income required to financially support the fixed household expenditures, or a secondary income group used to support lifestyle, leisure or luxury expenditures. The variable deposits classified as mandatory are added to the fixed deposit amount.

The fixed withdrawal transactions are classified as household mandatory expenditures and compared to the estimated household expenditure profiles for each DDA household to determine the percent of mandatory household expenditure processed by the bank. This household mandatory expenditure percentage, in conjunction with the percent of income processed by the bank, is used in a preferred embodiment to group together DDA households with similar income-to-expenditure profiles to forecast the deposit and withdrawal classification generated by the system.

Applying the inter-temporal functional derivative rate formula to the variable withdrawal patterns for each DDA household, the system classifies the expenditure patterns based on the inter-temporal variable withdrawal rates generated. The variable withdrawal rates are classified into a series of expenditure groups based on the descending rate limits established for each group. The mandatory expenditure group shows the amount and probability of the variable withdrawals that are required to maintain the household. The lifestyle expenditure group shows the variable withdrawals amount and probability that supports the household living preferences. The leisure expenditure group shows the variable withdrawal amount and probability that supports the leisure expenditures. The luxury expenditure group shows the variable withdrawal amount and probability that supports luxury expenditures. The amount and probability of the variable withdrawal rates classified as mandatory expenditure are added to the fixed withdrawal amount to refine the mandatory expenditure percent calculation processed by a bank.

As part of the inter-temporal variable withdrawal rates, classification limits are established for the determining the expenditure rate of substitution for each selected forecasting month. The expenditure rate of substitution determines the amount and probability of the mandatory, lifestyle, leisure, and luxury expenditures that can be substituted during a forecasting month. A secondary functional derivative generated from the rate of substitution is the forecasting of the amount and probability of the substitution amount that a household is will to risk. A third functional derivative generated from the rate of substitution is the forecasting of the amount and probability of the substitution amount that is determined by individual or joint household preference decisions.

The income to expenditure information published by the U.S. Department of Labor Bureau Labor Statistics is used to compare the monthly cash transaction household expenditure classifications generated by the system. The annual incomes to expenditure tables are published under the consumer expenditure survey and the monthly consumer price index and are the foundation of the income to expenditure comparison. The expenditures listed in the annual consumer expenditure tables are re-classified under the mandatory, lifestyle, leisure, and luxury classifications. A similar re-classification is applied to the monthly consumer price index tables used by the system.

A next step in the process is the conversion of the annual consumer expenditure survey tables to the monthly consumer expenditure tables. The monthly consumer price index tables published by the U.S. Department of Labor Bureau Labor Statistics are used to calculate the monthly expenditures show in the consumer expenditure tables used by the system. Because the consumer price index is derived from the monthly consumer expenditure tables, the Bureau of Labor Statistics stopped publishing the monthly expenditure tables in 2002 which is the reference year for the annual expenditure tables.

To forecast the monthly consumer expenditure patterns, a preferred embodiment of the system maintains a back-propagation statistical neural network to forecast the trends in the consumer price index. These consumer price index trends are used to forecast the consumer expenditure patterns. To forecast the consumer price index, the statistical neural network uses a series of economic indicators to find the training variables to forecast each consumer price index expenditure category.

A series of reports are maintained by the system that show the relationship between the expenditure patterns forecast by the U.S. Department of Labor—Bureau of Labor Statistics consumer expenditure survey and the expenditure patterns forecast from the cash transaction activity for each DDA household.

A preferred embodiment of the system uses the bank's database and the dynamic consumption theories to determine the relationship between income, expenditures, and saving for each bank customer, and for each bank customer household. A foundation of the system embodiment is the use of the account cash transaction activity stored in a bank's central database to measure, classify, score, and forecast the inter-temporal elasticity of substitution for household expenditures. These household expenditure classifications are derived from the elasticity of substitution model applied to the cash transaction activity and compared to the consumer expenditure profiles provide by the U.S. Department of Labor—Bureau of Labor Statistics to provide a demographic performance benchmark. The results from the inter-temporal elasticity of substitution modeling of the cash transaction activity provides the insight for determining the individual and household spending preference on disposable income, the time period and probability that a customer is most likely to consider an expenditure substitution, the aversion of taking financial risk of each individual or household, and the propensity for each individual or household to save or invest.

Accordingly, using this output, the system and method of this invention can assist a bank in identifying and matching its customers to financial products, services, and incentives that may be offered by the bank.

BRIEF DESCRIPTION OF THE SEVERAL VIEWS OF THE DRAWINGS

FIG. 2 shows the database structure of the account ownership matrix for each direct-deposit-accounts (DDA) household residing in a bank database.

FIG. 3 shows the DDA account cash transaction calendar for each DDA Household residing in a bank database.

FIG. 4 shows the time deposit account cash transaction calendar for each DDA Household residing in a bank database.

FIG. 5 shows the loan account cash transaction calendar for each DDA Household residing in a bank database.

FIG. 6 shows the re-classification of the consumer expenditure table 47 (as shown in the Appendix) into mandatory, lifestyle, leisure, luxury, and saving expenditure classifications.

FIG. 7 shows the personal ID profiles of each DDA household residing in a bank database.

FIG. 8 shows the household income modifier classification used to adjust the estimated income of each DDA household if the actual household income is not available.

FIG. 9 shows the re-classification of the consumer price index Table 3 (as shown in the Appendix) into mandatory, lifestyle, leisure, luxury, and saving expenditure classifications.

FIG. 10 shows the conversion of the consumer expenditure published annually by the U.S. Bureau of Labor Statistics to monthly consumer expenditure using the monthly consumer price index.

FIG. 11 shows the detail re-classification of the consumer expenditure table 47.

FIG. 15 illustrates the interpretation of the daily variable withdrawal balance to the inter-temporal variable withdrawal rate and expenditure classifications.

FIG. 16 illustrates the detail interpretation of the inter-temporal variable withdrawal rate and expenditure classifications.

FIG. 19 is a consolidated household expenditure report.

FIG. 20 is a consolidated household investment report.

FIG. 21 is a report for matching DDA customers to a specific investment marketing campaign.

FIG. 22 is a report for forecasting the lifestyle expenditures.

FIG. 23 is a consolidated household risk report.

FIG. 25 is an example of a bank defined ad-hoc report on DDA account performance.

DETAILED DESCRIPTION OF THE INVENTION

Figure 1:
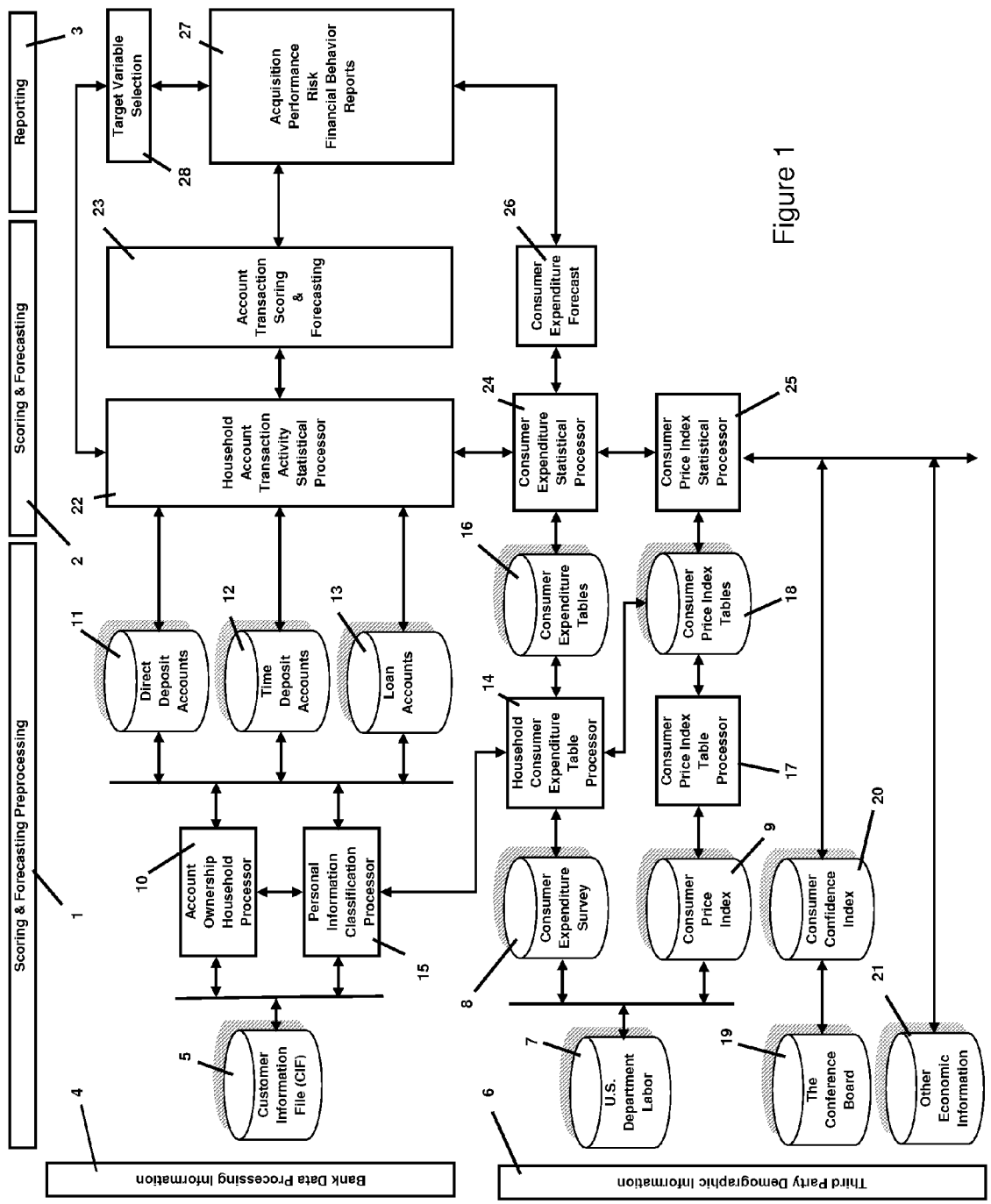
FIG. 1 is a block diagram of one embodiment of the master scoring and forecasting system of the present invention that shows the relationship between the pre-processing, scoring and forecasting, and reporting stage.

The scoring and forecasting system and process defined in FIG. 1 is partitioned into three stages. In stage one, the pre-processing stage 1, the data and datasets used by system are extracted, formatted and classified into the datasets used by the scoring and forecasting statistical processors in stage two, including account transaction activity processor 22 and account scoring and forecasting processor 23. In stage two, the scoring and forecasting stage 2, the statistical models in consumer expenditure statistical processor 24 and consumer price index statistical processor 25 execute the dataset training and compare cycle, using the historic data established in the pre-processing stage, to generate the scoring forecast. In stage three, the reporting stage 3, the results of the statistical generation are sorted and formatted to generate standard system reports. Using the system datasets and the available statistical modeling tools, a bank can customize reports for specific acquisition, performance, and risk bank defined initiatives.

The system preferably focuses on twelve to twenty-four months of past cash transaction data to execute the scoring and forecasting algorithm used by the system. The transaction information 4 stored in the bank's central customer information files 5 is the source of the cash transaction activity used by the preferred embodiment of the system. The customer information files (CIF) content includes multiple account types, such as demand deposit accounts (DDA), time deposit accounts, loan accounts, and the personal information for each bank customer.

The consumer information provided by U.S Department of Labor—Bureau of Labor Statistics 7 web site (www.bls.gov/) and the LABSTAT database is the primary third-party demographic information 6 used by the system. The consumer expenditure survey 8 tables (http://www.bls.gov/cex/home.htm) provided by the Bureau of Labor Statistics is the central benchmark used by the system to reference and compare the cash transaction expenditure patterns detected by the scoring and forecasting system for each DDA household. The consumer expenditure tables stored in the LABSTAT database are partitioned into a series of annual tables that define the household income to expenditure profiles of a reference person or consumer unit using income, age, size of the consumer unit, composition of the consumer unit, number of earners in the consumer unit, occupation of the reference person, education of the reference person, and housing tenure of the reference person. A preferred embodiment of the system uses the age of the reference person to define income to expenditure profile of each DDA household.

The Consumer Price Index is another group of consumer expenditure tables extracted from the Bureau of Statistic web site (http://www.bls.gov/cpi/home.htm). The Consumer Price Index (CPI) tables 9 used by the system are from the urban (CPI-U) and clerical (CPI-W) consumer groups. These CPI tables shows the month-to-month percent change for each expenditure tracked under the Consumer Expenditure Survey (http://www.bls.gov/cpi/cpi_dr.htm#2006).

The system preferably uses two years of the consumer expenditure and consumer price index tables to forecast current and future expenditure patterns. Based on the regional location of a banking institution, the consumer expenditure and consumer price index tables are selected from one of the four regions: Northeast, Midwest, South, or West.

Scoring and Forecasting Database Pre-Processing

The first step in the scoring and forecasting process is to establish the account ownership database matrix from the account transaction data that resides in the bank's CIF database for each customer and for each customer household. The account ownership household processor 10 shown in FIG. 1 extracts the customer identification (ID) of each DDA account holder and classifies the holder into single or married group. The system searches through the CIF database to find other DDA, Time Deposit, and Loan accounts connected to each DDA account holder's customer ID.

If the DDA account holder has a married status, the system searches the CIF database to find other members in the household that retain DDA, Time Deposit and Loan accounts with the bank institution. The search key used by the system is: (a) the checking of the joint account status flag in the CIF database; (b) the resident telephone number listed on the account; or (c) the address of the listed owner on the account. For each account related to a DDA account holder, the Customer ID and the relationship to the primary account holder are established.

For DDA account holders having single status, the system tests if the joint account holder status flag is set. If the joint account test is positive, the secondary account holder(s) customer ID is extracted and the relationship to the primary account holder is established. If the secondary joint account holder is contributing to the financial support of the singles household, a flag is set in the account ownership database that resides in direct deposit account database 11 (FIG. 1), and maintained by the system.

During the search and compare sequence of the CIF database 5, all accounts and account transactions are indexed to the account ownership database. This includes the account transactions for all members of a household. FIG. 2 illustrates one embodiment of a structure of the account ownership table established by the account ownership household processor 10 (FIG. 1) for each DDA household. The account ownership table is built around the ID of the primary household account holder 29 illustrated in FIG. 2. The primary household classification is established after the search of the CIF database extracts all the DDA, Time Deposit, and Loan account data related to the primary DDA holder ID index used for the account ownership search. The relationship between the family account holders is established by the size of the deposits being held by each DDA account holder that resides on the household unit. The account holder having the highest deposit activity is classified as the primary account holder 29. The DDA holder ID(s) that are related to the primary account holder 29 are classified as secondary account holders (30) or family member account holder 31. Under each account holders ID, all the DDA, Time Deposit and Loan accounts are identified.

Upon completing the building of the account ownership database for each DDA account holder residing in the CIF database, the system proceeds to establish an account transaction calendar database for each DDA household. The account transaction calendar identifies all account cash transactions that occur every month in each family members account. In FIG. 1, the account transaction calendar database is stored in the DDA 11, Time Deposit 12 or Loan 13 database maintained by the system. All cash transactions that occurred in the last twelve to twenty months are stored in each DDA holder's calendar. The account calendar database for each DDA holder is organized into a deposits calendar and withdrawal calendar for all cash transactions occurring monthly in the DDA, Time Deposit and Loan accounts.

FIG. 3 illustrates one embodiment of a database structure for DDA deposit 32 and withdrawal 33 calendars. All DDA cash transactions that occur in the account ownership table are consolidated into the central deposit 32 and withdrawal 33 calendars. The deposit calendar 32 tracks the daily deposit amount and the amount of interest that is deposit daily in the DDA calendar. The DDA calendar classifies each deposit and withdrawal cash transaction into one of the following groups: cash, check, interest, ACH (Automated Clearing House), EFT (Electronic Fund Transfer) or internal bank transfer.

FIG. 4 illustrates one embodiment of a database structure for time-deposit deposit 34 and withdrawal 35 calendars. All time deposit cash transactions that occur in the account ownership table are consolidated into the central deposit 34 and withdrawals 35 calendars. The time deposit calendar tracks 34 the daily account balance, the daily deposit amounts, the maturity date of the time deposits, and the daily interest paid on the time deposit account balance. The time deposit calendar classifies each deposit and withdrawal cash transaction into one of the following groups: cash, check, interest, ACH (Automated Clearing House), EFT (Electronic Fund Transfer) or internal bank transfer.

FIG. 5 illustrates one embodiment of a database structure for loan payment 36 and withdrawal 37 calendars. All loan cash transactions that occur in the account ownership table are consolidated into the central loan payment 36 and withdrawal 37 calendars. The loan payment calendar 36 tracks the daily loan amount, loan payment, and maturity date of the loan. The loan payment calendar classifies each deposit and withdrawal cash transaction into one of the following groups: cash, check, interest, ACH (Automated Clearing House), EFT (Electronic Fund Transfer) or internal bank transfer.

To compare the scoring and forecasting results of the DDA 11, Time Deposits 12 and Loan 13 cash transaction activity, the system establishes a consumer expenditure profile for each DDA household using the Consumer Expenditure Survey 8 and the Consumer Price Index 9 published by the U.S. Department of Labor—Bureau of Labor Statistics 7, as shown in FIG. 1. The household information used by the system is extracted from the U.S. Department of Labor Bureau of Statistics web site (http://www.bls.gov/) using a FTP transfer process and stored in the consumer expenditure survey 8 and consumer price index 9 database (FIG. 1) maintained by the system.

The Consumer Expenditure Survey (http://www.bls.gov/cex/home.htm) is made up of a series of tables that profile the household income to expenditures distribution for a reference person or consumer unit. The system utilizes the expenditure tables for the following classifications: age, size, occupation, and housing tenure of the reference person or consumer unit. The income to expenditure table classifications are divided into two household expenditure groups by the household consumer expenditure table processor 14 shown in FIG. 1. The income to expenditure groups are (1) the primary income to expenditure group, and (2) the household income modifier group.

The personal information classification processor 15 shown in FIG. 1 determines the income range for each DDA household by one of the following methods: (a) extracting the actual household income stored in the CIF personal information files, and matching the age range and expenditure profile to the actual household income; or (b) if the actual household income is not available, the system uses the age of the primary DDA holder to determine the estimated income for each DDA household.

The primary income to expenditure table used by a preferred embodiment is consumer expenditure survey Table 47 (Appendix). Table 47 shows the income to expenditure distribution for each age range. Table 1 below shows a sample of the Table 47. After Table 47 is extracted from the LABSTAT database, the household consumer expenditure table processor 14 as shown in FIG. 1 re-classifies Table 47 consumer expenditures under following groups: mandatory, lifestyle, leisure, and luxury expenditures. FIG. 6 illustrates the re-classification structure 38 of the Table 47 expenditures. These expenditure re-classifications are stored in consumer expenditure table database 16 (FIG. 1) maintained by the system. These classifications match the scoring and forecasting expenditure categories established for the DDA, Time Deposit, and Loan cash transaction activity. The propensity to save is calculated for each income to expenditure group based on the net household income minus the expenditure for each income to expenditure age group extracted from Table 47.

When the actual household income is not available from the CIF database, the consumer expenditure survey tables 48, 51, and 53 are used as household income modifiers for determining the estimated household income. The household consumer expenditure table processor 14 shown in FIG. 1 uses these tables to modify the estimated income extracted from Table 47 based on the age of the primary DDA account holder. Below is the list of consumer expenditure survey tables used by a preferred embodiment of the system.

Primary Income-Expenditure % Share Table
Table 47 Age of Reference Person
Household Income Modifier Tables
Table 48 Size of Consumer Unit
Table 51 Housing Tenure of the Reference Person
Table 53 Occupation of the Reference Person FIG. 7 shows the personal information 39 captured for each member of the primary DDA holder household. The personal ID profile for the primary DDA account holder shows the current family status: (1) single or married, (2) actual income, (2) age, (3) mortgage status, (4) renting status, (5) occupation, and (6) size of the household for the primary account holder. The personal ID profiles for the secondary household member retaining an account with the bank are captured: (1) the relationship to the primary account holder, (2) the actual income of the secondary account holder, (3) the age and occupation of the secondary account holder If the actual income is not available, the system calculates the estimated household income for each DDA household. FIG. 8 illustrates the household income modifiers 40 that extract the income profiles from Tables 47, 51, 53, and 48 based on age, housing tenure, occupation, and household size. Based on the percent of income adjustment calculated from the household income modifier 40 table, the estimated household income based on age is adjusted. This adjusted estimated household income is stored in the personal ID profiles that reside in the DDA 11 databases shown in FIG. 1.

Referring to FIG. 1, the next step in the process is to extract the Consumer Price Index 9 tables from the Bureau of Labor Statistics web site (http://www.bls.gov/home.htm). The extracted Consumer Price Index tables are store in a Consumer Price Index 9 database maintained by the system.

Because the consumer expenditure survey tables are only published annually, the monthly consumer price index detail tables (http://www.bls.gov/cpi/cpi_dr.htm) are used by the consumer price index table processor 17 (FIG. 1) to generate the month-to-month expenditure profiles for each DDA household. The tables from the consumer price index web site are available under two classifications: (a) consumer price index for all urban consumers (CPI-U); and (b) consumer price index for urban wage earners and clerical workers (CPI-W). Using the personal information classification processor 15, each DDA household is classified under one of the groups CPI (U), or CPI (W), based the primary DDA account holder occupation. Table 2 in the Appendix is a sample of a consumer price index CPI-U Table 3 extracted from the LABSTAT database.

After the consumer price index table processor 17 has established the consumer price index 9 databases, the system starts the database re-classification process. Under this re-classification process, the expenditure items shown in the consumer price index are re-classified to match the expenditure categories established for consumer expenditure Table 47: Mandatory, Lifestyle, Leisure and Luxury. FIG. 9 shows the re-classification database structure for the CPI index. This CPI re-classification database is stored in consumer expenditure table 16 as shown in FIG. 1 and maintained by the system.

FIG. 10 illustrates the use of the month-to-month CPI tables 42 [FIG. 10 refers to Table 2] to generate the month-to-month expenditures for each age and income group. The following formula is used by the household consumer expenditure table processor 14 shown in FIG. 1 to calculate and generate the month-to-month expenditure database for each targeted year:

$$\text{Current Year Expenditure }(B) = \text{Previous Year Expenditure }(A) \times \frac{CPI(B)}{CPI(A)}$$

These month to month expenditure patterns are stored in the consumer expenditure table 16 database maintained by the system.

FIG. 11 illustrates the database structure 43 of Table 47 used by the invention to determine and calculate the expenditure distribution for each primary account holder age. Based on the actual or estimated household income these expenditure percentages are applied to each DDA household to generate the annual expenditure forecast.

To forecast the monthly growth in consumer expenditures and the consumer price index, the system preferably uses a neural statistical network to forecast growth patterns. From an economic viewpoint, these growth patterns are predictable using a services economic indicator that affects consumer expenditures. The CPI neural network model extracts and uses the following economic indexes to train the network to forecast future expenditure and CPI patterns:

(a) The Consumer Confidence Index is published by the Consumer Confidence Board. The Consumer Confidence Survey is a monthly report that details the attitude and buying intentions of the consumers. The index data is available based by age, income and regions. The system extracts the Consumer Confidence monthly indexes and stores the data in the consumer confidence index database 20 shown in FIG. 1. The system maintains the consumer confidence index database 20.

(b) The Other Economic Indicators used to enhance the CPI forecasting are stored in the other economic information database 21 and maintained by the system. The table below list the indexes used by the CPI neural network.

Figure 12:
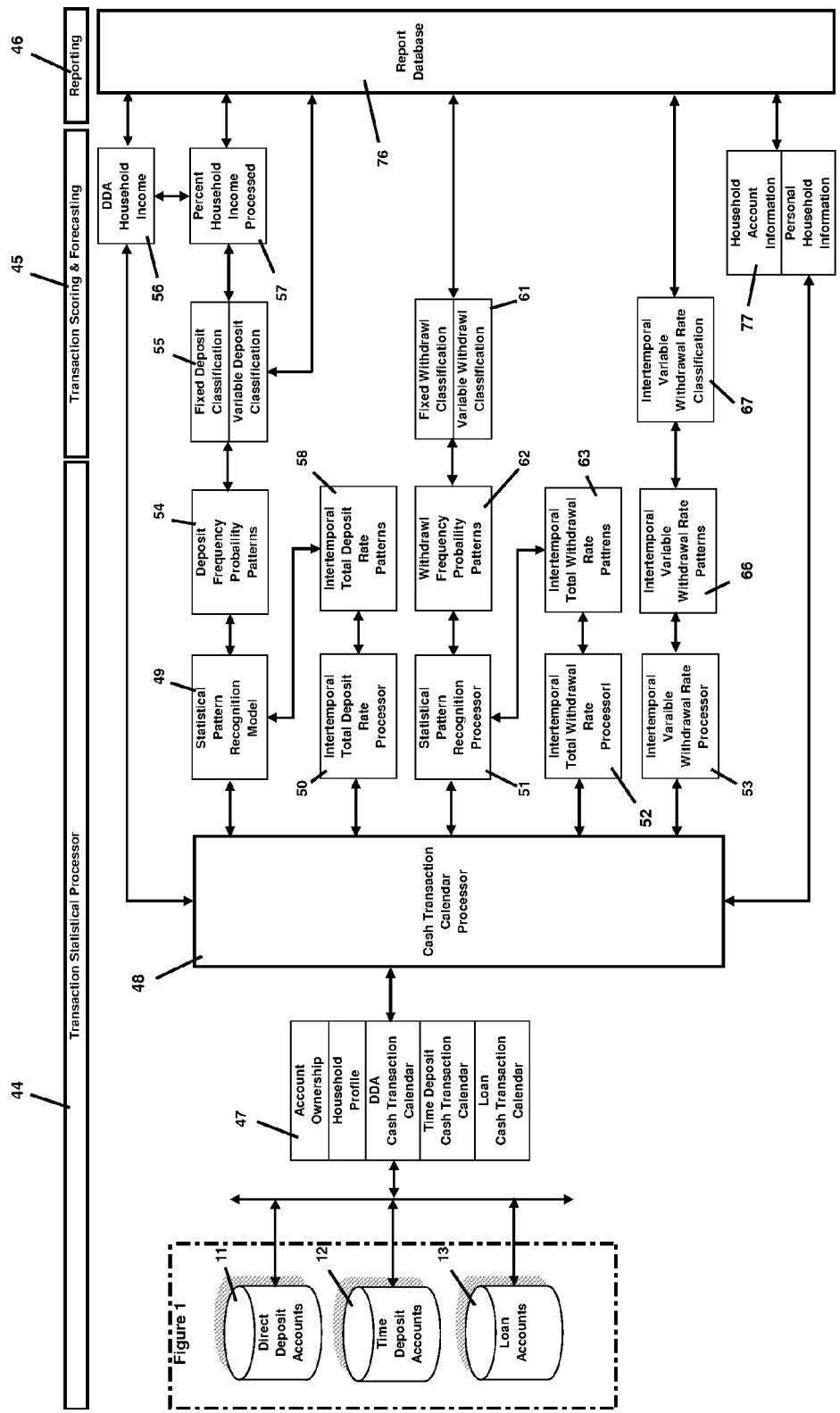
FIG. 12 is a system diagram for the cash transaction scoring and forecasting process for the deposit and withdrawal calendar.

Consumer Confidence Index
S&P 500 Index
Dow Jones Industrial Index
Dow Jones Utility Index
M2 Index
Housing Market Index
Producer Price Index Scoring and Forecasting Statistical Modeling FIG. 12 shows the sections used by the system for the statistical scoring and forecasting modeling in the scoring and forecasting stage 2 (FIG. 1). In particular, FIG. 12 provides detailed information about the customer/household account transaction activity statistical processor 22 (FIG. 1), identified as section 44 in FIG. 12, and the account transaction scoring and forecasting processor 23 (FIG. 1), identified as section 45 in FIG. 12. The first section 44 uses a series of statistical pattern recognition processors to generate and identify the cash transaction patterns from the DDA 11, Time Deposit 12, and Loan 13 database calendars established in pre-processing section 1 in FIG. 1. In second section 45 of the statistical modeling process, the cash transaction patterns are classified into groups of household deposit and withdrawal patterns that score and forecast the monthly income and expenditure patterns for each DDA household. The third section 46 is a reporting processor (3 on FIG. 1) that classifies the deposit and withdrawal datasets into a series of income, expenditure and classification profiles stored in the report database 76.

All cash transaction scoring and forecasting statistical modeling used by the system are extracted from the account ownership, personal household, DDA, Time Deposit, and Loan cash transaction profiles 47 and used by the cash transaction calendar processor 48 to generate the scoring and forecasting of the income and expenditure classifications. The cash transaction calendar processor 48 organizes the data stored in the DDA, Time Deposit and Loan cash transaction calendars to the formats required by the following processors: (a) the deposit pattern recognition processor 49 for determining the fixed and variable deposit patterns and probability, (b) the inter-temporal total deposit rate processor 50 for determining the daily deposit rate for each DDA household, (c) the fixed and variable withdrawal pattern recognition processor 51 for determining the withdrawal patterns and probability for each DDA household, (d) the inter-temporal total withdrawal rate processor 52 for determining the daily withdrawal rate, and (e) the inter-temporal variable withdrawal rate processor 53 for classifying the variable withdrawal rate into the mandatory, lifestyle, leisure and luxury expenditure groups.

Fixed and Variable Deposit Classification

The statistical pattern recognition processor 49 is a time series process that establishes the fixed and variable deposit patterns 54 occurring daily and monthly in each DDA household account. The fixed and variable deposit classifications 55 are determined by setting the probability limits in the statistical pattern recognition processor 49 for the deposit amount and the inter-temporal deposit rate ranges.

The mathematical formula that represents the statistical time series sequence used and maintained by a preferred embodiment of the system for determining the fixed deposit amount (FD) patterns and probability 55 is illustrated below:

$$f(FD) = \sum_n (D_0 t_0 \varepsilon_0 + D_1 t_1 \varepsilon_1 + \ldots D_n t_n \varepsilon_n)$$

The fixed deposits (FD) statistical time series are a function of the deposit (D) sequence, the time (t) of the deposit event, and the stochastic probability patterns ($\varepsilon$) of the deposit amount events occurring over a twelve or twenty-four month period. The stochastic process adds the statistical pattern recognition and probability dimension to the deposit and withdrawal classification process. By definition, the probability space ($\Omega$, $\Im$, P) in the stochastic process is a collection of X-valued random variables indexed by a set T ("time"). The probability space matrix controlled by the statistical pattern recognition processors shown in FIG. 12 is defined as Ω= the sample space, ℑ=the subset of Ω, and P=a function from ℑ that assigns to each deposit or withdrawal event a probability with a magnitude of 0 to 1.

The fixed deposits are compared to the, actual or estimated, household income 56 of each DDA customer to determine the percent (%) of the household income 57 processed by the bank. Using the actual or estimated household income 56 for each DDA household income group, the system matches a low income percentage group to a DDA household profile with a higher income processing percentage to forecast the household income and expenditure potential.

The fixed deposits are classified based on the source of the fixed deposit into the following household income categories: salary, interest, retirement, social security, bank transfer, or third-party electronic transfer. These categories are generated from the deposit method used: cash, check, automated clearing house (ACH) and electronic funds transfer (EFT).

The monthly deposits that fall outside the limits set for the fixed deposit probability are categorized as variable deposits (VD). These random deposits are not used in the calculation of the percent of household income processed by the bank. The variable deposits are classified under a secondary household income category: (a) mandatory household income support; or (b) lifestyle, leisure, luxury household income support. Based on the frequency and probability, the mandatory deposits are considered a part of household income. The time series used for determining the variable deposit (VD) amount probability patterns is represent by the following mathematical formula:

$$f(VD) = \sum_n (D_0 t_0 \varepsilon_0 + D_1 t_1 \varepsilon_1 + \ldots D_n t_n \varepsilon_n)$$

The table below illustrates the limits for the deposit amount and frequency probability range to classify the fixed and variable deposits. The fixed and variable deposit limits may vary based on the household income range processed by the bank.

| Frequency Probability Range | Monthly Deposit Amount | Deposit Classification Range |
|---|---|---|
| 1.0-0.9 | ↑ | Fixed |
| 0.9-0.8 | ↑ | |
| 0.8-0.7 | ↑ | |
| 0.7-0.6 | ↓ | Variable |
| 0.6-0.5 | ↓ | |
| 0.5-0.4 | ↓ | |
| 0.4-0.3 | ↓ | |
| 0.3-0.2 | ↓ | |
| 0.2-0.1 | ↓ | |
| 0.1-0.0 | ↓ | |

Figure 13:
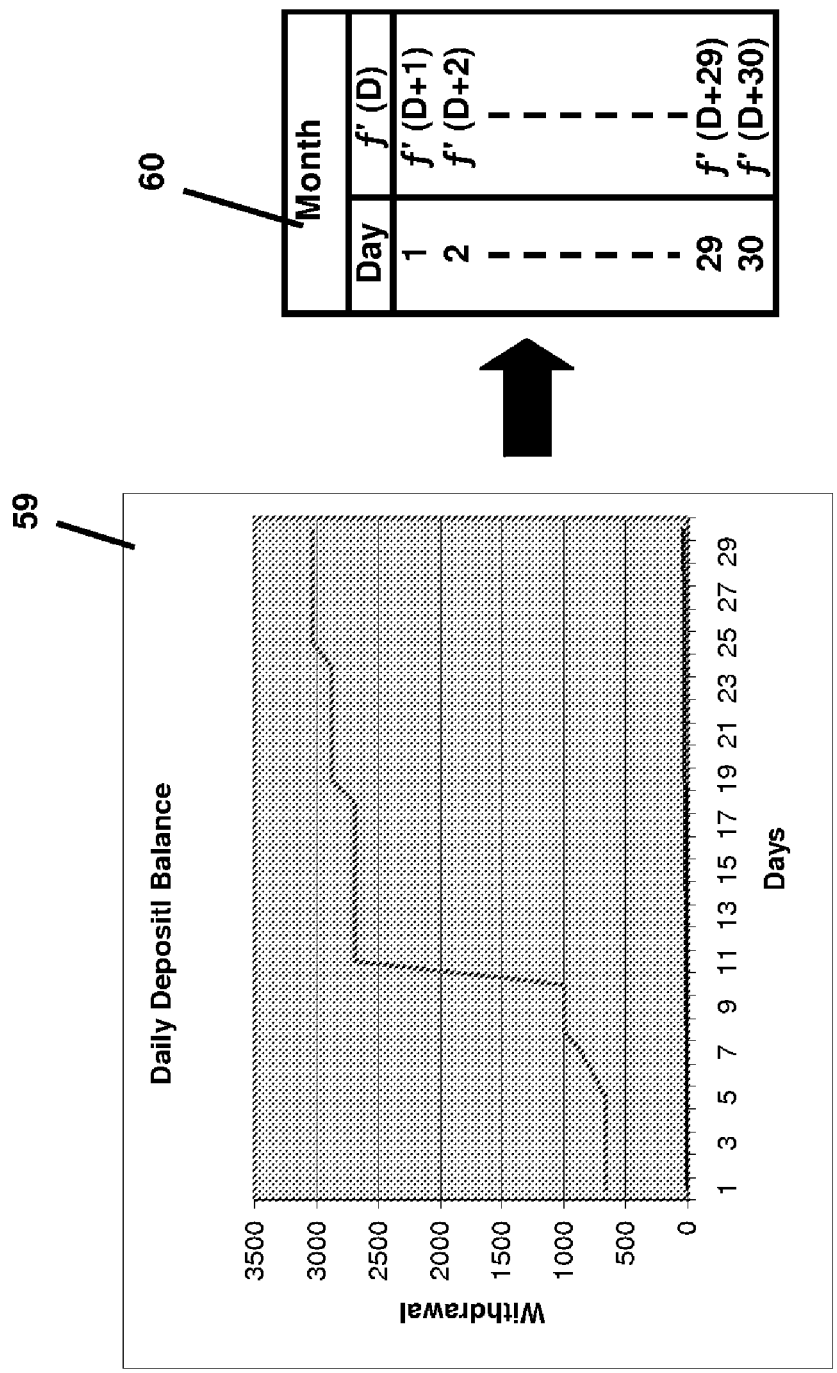
FIG. 13 illustrates the interpretation of the total daily deposit to the inter-temporal deposit rate.

To increase probability prediction accuracy for fixed versus variable deposits, the deposit statistical pattern recognition process uses the inter-temporal deposit rate patterns 58 generated by the inter-temporal deposit rate processor 50. The foundation of the inter-temporal total deposit rate processor 50 is a functional derivative model that is applied to the DDA 11, Time Deposit 12 and Loan 13 calendars to determine the inter-temporal deposit rate patterns 58 for each DDA household. FIG. 13 illustrates conversion of the daily deposit patterns 59 to the inter-temporal deposit rates 60. The daily inter-temporal deposits rate patterns 58 are fed back to the statistical pattern recognition processor 49 to enhance the accuracy of fixed and variable deposit probability. The system has the responsibility to maintain the functional derivative for deposit as illustrated below:

$$f'(D) = \lim_{t \to 0} \frac{[f(D_1 + t_1) - f(D_0)] + \varepsilon}{t_1} \quad \varepsilon = \text{Stochastic Process}$$

Fixed and Variable Withdrawal Classification

The fixed and variable withdrawal patterns for each DDA household are determined by the same statistical pattern recognition processor 51 used to determine the fixed and variable deposit patterns. The fixed and variable withdrawal classifications 61 are determined by the withdrawal amount patterns 62, the inter-temporal withdrawal rate 63 generated by the inter-temporal total withdrawal rate processor 52, and probability limits set in the statistical pattern recognition processor 51.

The following statistical time series formula is used and maintained by the preferred embodiment to determine the fixed withdrawal (FW) patterns and probability.

$$f(FW) = \sum_n (W_0 t_0 \varepsilon_0 + W_1 t_1 \varepsilon_1 + \ldots W_n t_n \varepsilon_n)$$

The fixed withdrawals (FW) are a function of the withdrawal (W) sequence, the time (t) the withdrawal event occurred within a month, and the stochastic probability (ε) prediction that the withdrawal event occurred over a twelve to twenty-four month period. The withdrawal amounts that fall into a fixed withdrawal probability range are classified as mandatory household expenditures. These mandatory household expenditure patterns are compared to estimated mandatory expenditure profile provided under the consumer expenditure survey section of the system to determine the estimated mandatory expenditure percentage processed by the bank for each DDA household.

The withdrawals that fall outside the limits set for the fixed withdrawals are categorized as variable withdrawals (VW). Based on the frequency probability for variable withdrawals, and the inter-temporal variable withdrawal rate, the variable withdrawals are classified under one of the following household expenditure groups: mandatory, lifestyle, leisure, or luxury expenditures. The process required in determining classifications is described the next section of the scoring and forecasting statistical modeling system. The following statistical time series formula is used and maintained by the system to determine variable withdrawal (VW) amount patterns and probability.

$$f(VW) = \sum_n (W_0 t_0 \varepsilon_0 + W_1 t_1 \varepsilon_1 + \ldots W_n t_n \varepsilon_n)$$

The table below illustrates using the withdrawal amount and the frequency probability range to classify the fixed and variable withdrawals. The fixed and variable withdrawal limits may vary based on the household income and expenditure range processed by the bank.

| Frequency Probability Range | Monthly Withdrawal Amount | Withdrawal Classification Range |
|---|---|---|
| 1.0-0.9 | ↑ | Fixed |
| 0.9-0.8 | ↑ | |
| 0.8-0.7 | ↓ | Variable |
| 0.7-0.6 | ↓ | |
| 0.6-0.5 | ↓ | |
| 0.5-0.4 | ↓ | |
| 0.4-0.3 | ↓ | |
| 0.3-0.2 | ↓ | |
| 0.2-0.1 | ↓ | |
| 0.1-0.0 | ↓ | |

Figure 14:
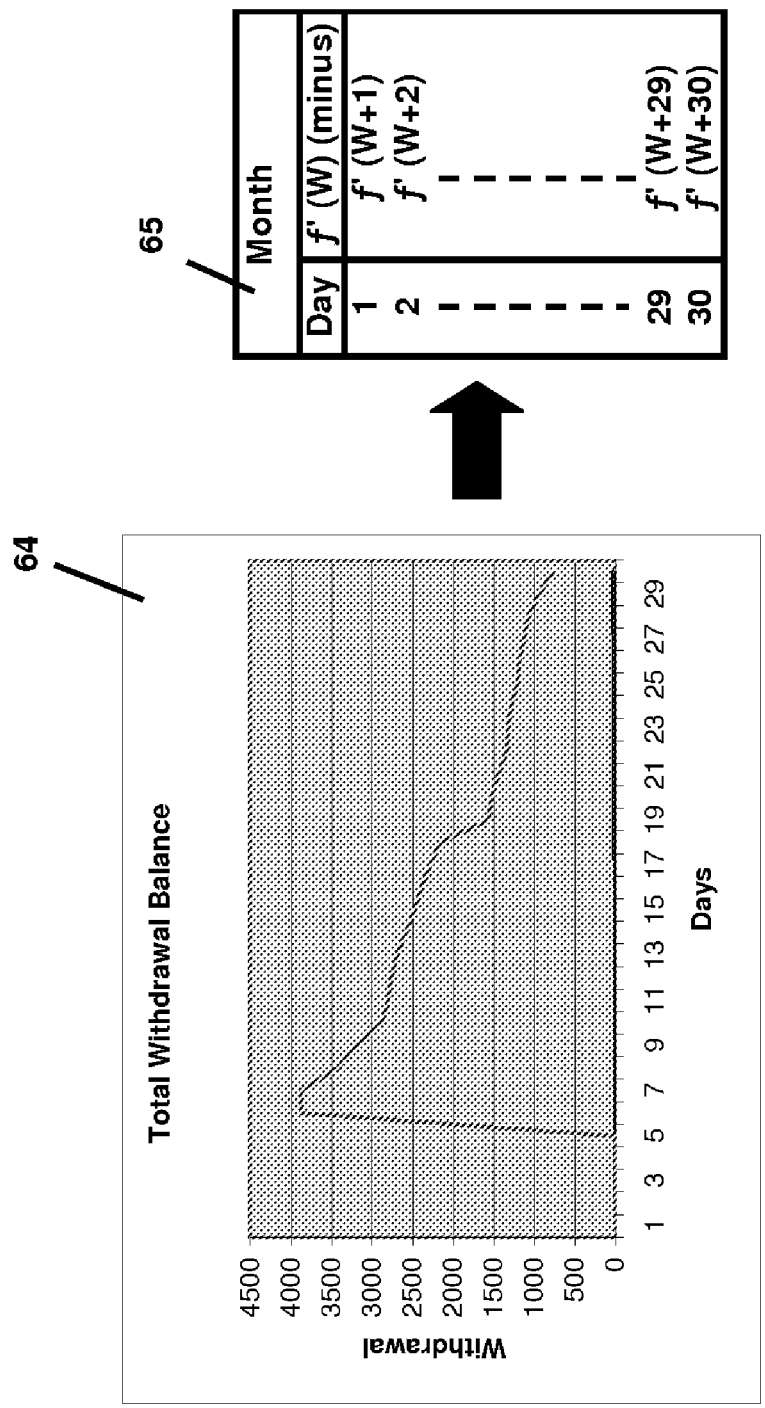
FIG. 14 illustrates the interpretation of the total daily withdrawals to the inter-temporal withdrawal rate.

Similar to the deposit classification described above, the statistical pattern recognition processor 51 uses the inter-temporal withdrawal rate patterns 63 to increase the accuracy of the fixed versus variable withdrawal probability prediction. The same functional derivative model used in the monthly deposit patterns 58 is applied to the monthly withdrawal patterns to generate the inter-temporal withdrawal rate patterns 63. FIG. 14 illustrates conversion of the daily withdrawal patterns 64 to the inter-temporal withdrawal rates 65. The daily inter-temporal withdrawal rates 65 are fed back to the statistical pattern recognition process 51 to enhance the accuracy of the fixed and variable probability prediction. A preferred embodiment of the system maintains the functional derivative for the total withdrawals as illustrated below:

$$f'(W) = \lim_{t \to 0} \frac{[f(W_1 + t_1) - f(W_0)] + \varepsilon}{t_1} \quad \varepsilon = \text{Stochastic Process}$$

Inter-Temporal Variable Withdrawal Rate Economic Classification

Classifying the variable withdrawals patterns uses the terminology defined by the economic consumption models developed by the economist. Determining certain financial substitution factors (the financial rate of substitution, the aversion to taking financial risk, the expenditure preference, and the propensity to consume versus save of a household) is the economic metric that is determined by the inter-temporal variable withdrawal rate processor 53. By applying the functional variable withdrawal derivative to the daily variable withdrawal patterns, the inter-temporal variable withdrawal rate (VW) patterns 66 and economic classifications 67 are generated for each DDA household.

$$f'(VW) = \lim_{t \to 0} \frac{[f(VW_1 + t_1) - f(VW_0)] + \varepsilon}{t_1} \quad \varepsilon = \text{Stochastic Process}$$

FIG. 15 illustrates the conversion of the variable withdrawal rates 68 to the household expenditure classifications 69 tracked by the system. Setting the limits for the inter-temporal variable withdrawal rate ranges generated by the inter-temporal variable withdrawal rate processor 53 shown in FIG. 12 is the foundation for determining the classification of the variable withdrawal patterns 66. These variable withdrawal patterns provide insight into the expenditure habits of each DDA household. These variable rate range limits are set for each regional geographic bank location and are compared to the household expenditure classification 67 provided by the consumer expenditure survey processed by the system.

FIG. 16 shows the detail breakdown of the variable withdrawal rate limits for each of the household expenditure classifications 67 as shown in FIG. 12. These household expenditure classifications 67 and the withdrawal amount linked to the classification provide different expenditure profiles on each DDA household, as described below.

The expenditure classifications 70 group for the variable withdrawal rate classifications 67 shown in FIG. 12 is partitioned into five expenditure classifications: mandatory, luxury, lifestyle, leisure, and savings. These expenditure classifications 70 show the variable withdrawal amount and the probability of the withdrawals for each DDA household. The variable withdrawals classified as mandatory are added to the fixed withdrawal classification to obtain the total mandatory expenditure amount for each DDA household.

The inter-temporal rate of substitution 71 group shows the withdrawal amounts and probability that can be substituted during a month based on the inter-temporal variable withdrawal rate classification 67 as shown in FIG. 12. Based on the substitution amount and probability, the variable withdrawals are classified (a) withdrawal amounts having a low rate of substitution, (b) withdrawal amounts having low to average rate of substitution, (c) withdrawal amounts having an average rate of substitution, (d) withdrawal amounts having an average to high rate of substitution, or (e) withdrawal amounts having a high rate of substitution.

The risk aversion 72 group uses the substitution amount generated by the inter-temporal rate of substitution 71 to determine the amount and probability of the financial risk each DDA household is willing to consider. Based on the risk aversion rate, the variable withdrawals are classified (a) as the amount of substitution having a high risk aversion rate, (b) as the amount of substitution having high to average risk aversion rate, (c) as the amount of substitution having an average risk aversion rate, (d) as the amount of substitution having an average to low risk aversion rate, or (e) as the amount of substitution having a low risk aversion rate.

The expenditure preference 73 group uses the substitution amount generated by the inter-temporal rate of substitution 71 to determine the amount and probability of the household expenditure preferences 73 that will be decided on individual or joint household decisions. Based on the expenditure preference rate, the variable withdrawals are classified (a) as the amount of substitution having a low expenditure preference rate, (b) as the amount of substitution having low to average expenditure preference rate, (c) as the amount of substitution having an average expenditure preference rate, (d) as the amount of substitution having an average to high expenditure preference rate, or (e) as the amount of substitution having a high expenditure preference rate.

The propensity to consume group 74 shows the withdrawal amounts and probability for the consumption rate of each DDA household. Based on the propensity to consume rate, the variable withdrawals are classified (a) as a withdrawal amount having a high consumption rate, (b) as a withdrawal amount having high to average consumption rate, (c) as a withdrawal amount having an average consumption rate, (d) as a withdrawal amount having an average to low consumption rate, or (e) as a withdrawal amount having a low consumption rate.

The propensity to save group 75 shows the withdrawal amounts and probability for the saving rate of each DDA household. Based on the propensity to save rate, the variable withdrawals are classified (a) as a withdrawal amount having a low savings rate, (b) as a withdrawal amount having low to average savings rate, (c) as a withdrawal amount having an average savings rate, (d) as a withdrawal amount having an average to high savings rate, or (e) as a withdrawal amount having a high savings rate.

Scoring & Forecasting Report Database

All the scoring and forecasting datasets generated by the system process are stored in the report database 76 shown in FIG. 12. The following are dataset groups stored in the report database 76: (a) the DDA household income 56; (b) the percent household income processed 57; (c) the fixed deposit classification 55; (d) the variable deposit classification 55; (e) the fixed withdrawal classification 61; (f) the variable withdrawal classification 61; (g) the inter-temporal variable withdrawal rate classification 67, (h) the household account information 77, and (i) the personal household information 77.

Account Transaction Scoring & Forecasting

Figure 17:
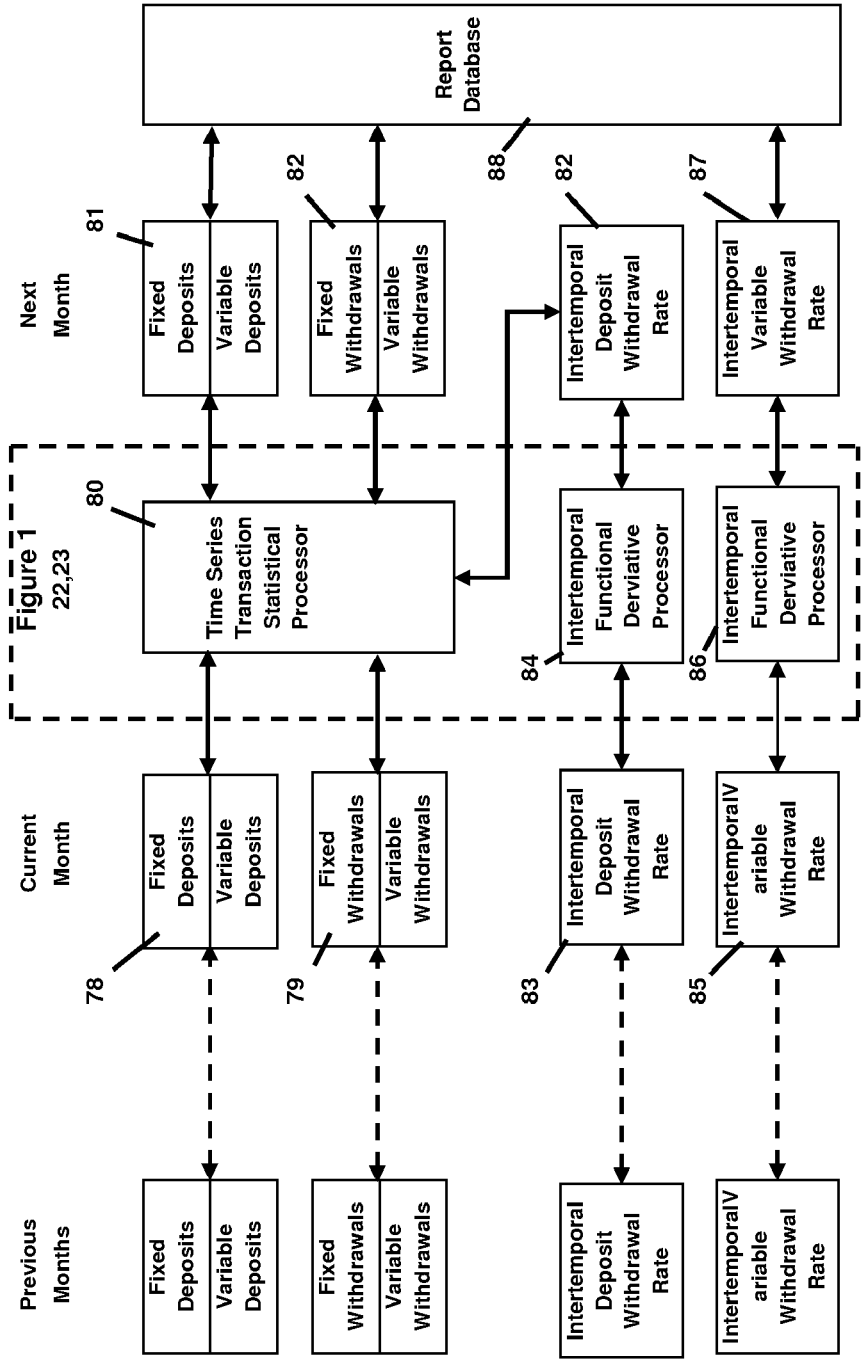
FIG. 17 is a system diagram of the deposit and withdrawal statistical scoring and forecasting.

FIG. 17 illustrates the detail statistical process for scoring and forecasting the cash transaction activity for each DDA household. FIG. 17 provides detail regarding the processing blocks 22 and 23 shown in FIG. 1. In FIG. 17 the current and historic cash transaction activity for the fixed and variable deposits 78 and the fixed and variable withdrawals 79 are processed by the account transaction activity statistical processor 80 to forecast the deposit 81 and withdrawals 82 patterns for at least one month ahead.

Using the current and historic inter-temporal total deposit and withdrawal rates 83, the inter-temporal functional derivative processor 84 forecasts the inter-temporal total deposit and withdrawal rate 82 patterns for at least one month ahead. At least twelve months of inter-temporal total deposits and withdrawals 83 are preferably used by the inter-temporal functional derivative processor 84 to train the statistical algorithm in forecasting the inter-temporal total deposit and withdrawal rate 82 patterns.

To enhance the forecasting of the deposit and withdrawal amounts and probability, the system adds the inter-temporal total deposit and withdrawal 82 rates to the deposit 78 and withdrawal 79 patterns used by the time series transaction statistical processor 80. At least twelve months of deposit and withdrawals patterns are preferably used by time series model 80 to train the statistical algorithm in forecasting the deposit 81 and withdrawal 82 patterns Using the current and historic inter-temporal variable withdrawal rate 85, the inter-temporal functional derivative processor 86 forecasts the inter-temporal variable withdrawal rate 87 patterns and expenditure classifications for at least one month ahead. At least twelve months of inter-temporal variable withdrawals and expenditure classifications 83 are preferably used by the inter-temporal functional derivative processor 86 to train the statistical algorithm in forecasting the inter-temporal variable withdrawal rates and expenditure 87 patterns.

The forecasting of fixed and variable deposits, the fixed and variable withdrawals, the inter-temporal rate for the total deposits and withdrawals, and the inter-temporal rate for the variable withdrawals are stored in the report database 88.

Consumer Expenditure Survey Forecasting

Figure 18:
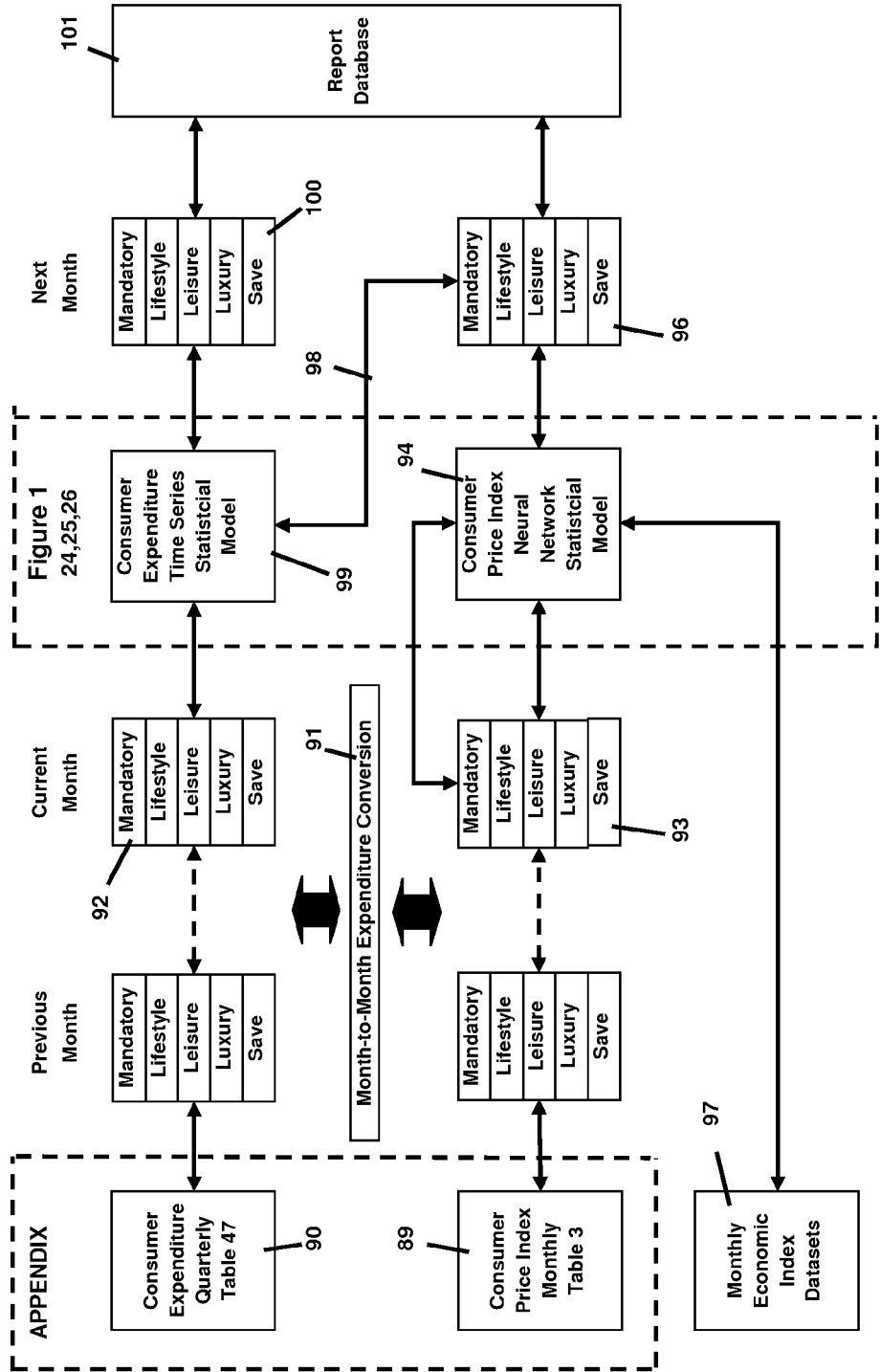
FIG. 18 is a system diagram for the consumer expenditure and consumer price index statistical scoring and forecasting.

FIG. 18 illustrates the statistical process for scoring and forecasting the consumer expenditure annual table and monthly consumer price index shown in household account transaction activity statistical processor 22, consumer price index statistical processor 25, and consumer expenditure forecast processor 26 illustrated in FIG. 1. The first step in the statistical scoring and forecasting process is the conversion of the annually published consumer expenditure tables 90 to the monthly consumer expenditure tables 91 by calculating and applying the expenditure changes reflected in the monthly consumer prices index tables 89. The forecast for the consumer expenditure survey 90 and consumer price index 89 tables are grouped under the following expenditure classifications: mandatory, lifestyle, leisure, luxury, and savings. At least twelve months of the re-classified consumer expenditure 92 and consumer price index 93 tables are preferably used by the statistical forecasting model.

Figure 26:
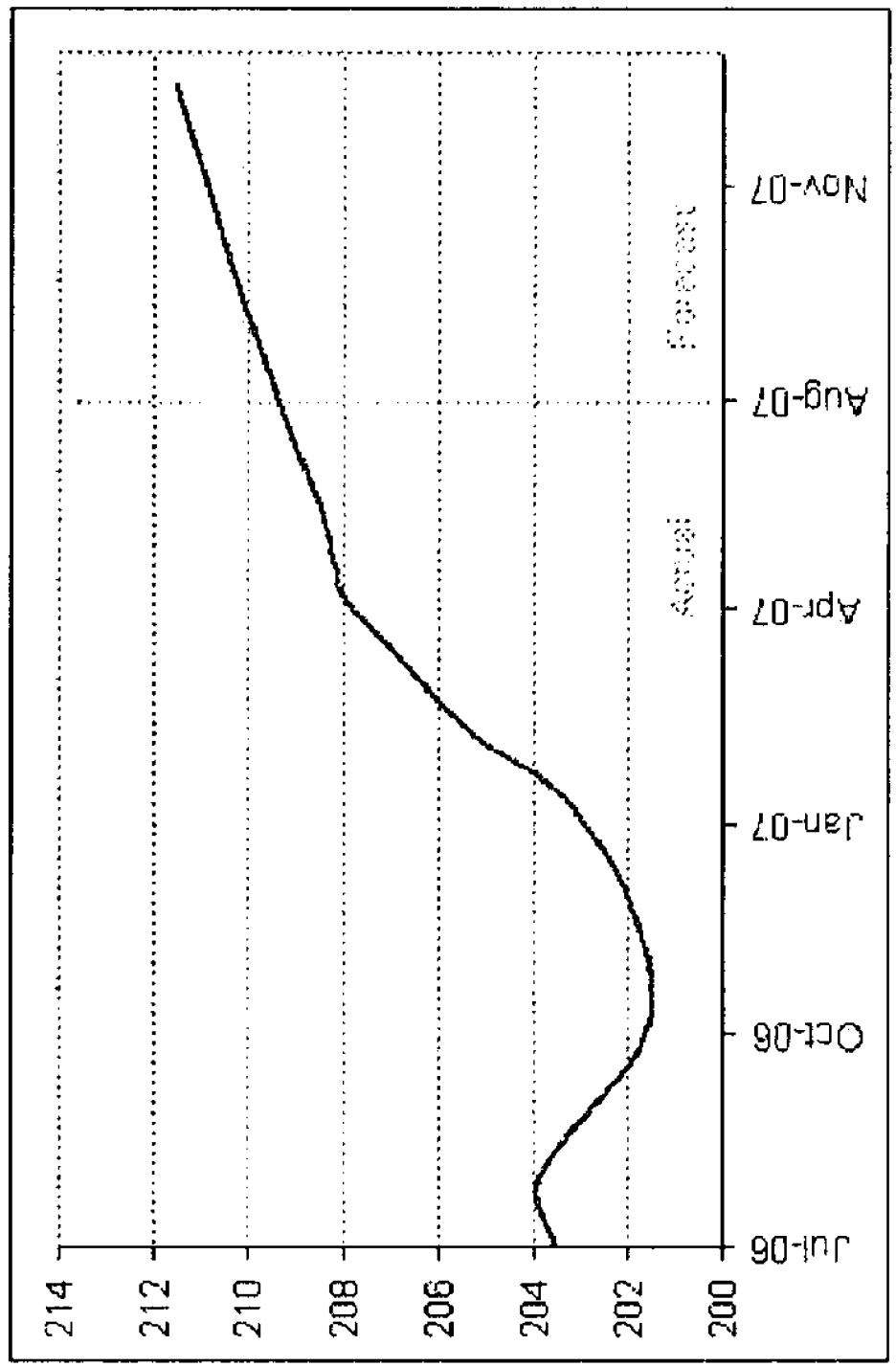
FIG. 26 is a graph showing the results from a monthly CPI forecast.

The next step of the consumer expenditure forecasting process is the forecasting of the monthly consumer price index (CPI). Preferably using at least twelve months of the re-classified consumer price index tables, the neural statistical network 94 is trained 95 to forecast the CPI 96 for at least one month ahead. To enhance the forecasting of the CPI values and probability, the system adds a group of monthly economic indexes 97 to the twelve months of re-classified CPI data. After several months of CPI re-classified patterns, the CPI neural network processor 94 can forecast at least three months ahead with a high degree of accuracy. These re-classified CPI forecasts are fed 98 back to the consumer expenditure time series statistical model 99 to generate the month-to-month consumer expenditure reclassified forecast patterns. The graph in FIG. 26 shows the results from the monthly CPI forecast.

The final step in the consumer expenditure classification forecasting is the processing of the current and historic consumer expenditure patterns 92 through the consumer expenditure time series statistical model 99 process, to forecast the consumer expenditure classification patterns 100 for at least one month ahead. The forecasts of the monthly consumer expenditure and consumer price index patterns are stored in the report database 101.

Scoring and Forecasting Reports

Referring to FIG. 1, the reports 27 generated by the scoring and forecasting process are divided into two groups: (a) standard summary and detail reports that show the results of the statistical scoring and forecasting process for each or all DDA households; and (b) bank specialty reports defined by selecting the target variables 28 that the report management system should use to generate the specialty reports. Typical bank specialty reports focus on specific acquisition, performance or risk initiatives. Using the scoring and forecasting process, the system can forecast the expenditure classification trend for next several months. The following is a summary of the standard scoring and forecasting reports generated by a preferred embodiment of the system.

FIG. 19 illustrates the consolidated household expenditure report 102 for all DDA bank households. The consolidated expenditure report compares the expenditure patterns extracted from two groups: (1) the consumer expenditure survey tables provided by the U.S. Bureau of Labor Statistic; and (2) the expenditure patterns generated from the inter-temporal variable withdrawal rate process defined in the system for all DDA households. The expenditure patterns are classified as mandatory, lifestyle, leisure, luxury, or savings expenditures. For the expenditure classifications generated by the inter-temporal variable withdrawal rate, the amount and the probability of the amount occurring in the selected period of time are included in the report. The report shows the variances between the two expenditure group forecasts and provides a bank executive with a comparison benchmark to evaluate the scoring and forecasting results to a reliable regional economic standard.

A second part of the household expenditure report 102 shows the forecast for the rate of substitution, the risk aversion, and the preference for the mandatory, lifestyle, leisure, luxury, or savings expenditures for all DDA households. The substitution rate shows the amount and probability that a household is willing to substitute within an expenditure classification. The risk aversion group shows the amount and probability that a household is willing to risk of the calculated rate of substitution amount. The household preference group shows the amount and probability that will require an individual or joint household decision of the calculated rate of substitution amount.

FIG. 20 illustrates the consolidated household investment report 103 for all DDA bank households. Based on the household income range, the consolidated investment report 103 shows the forecast for the investment range, the investment probability, and the investment amount. The investment range for each household income range group is determined by the mandatory, lifestyle, leisure, luxury, and saving withdrawal patterns and the inter-temporal variable withdrawal rates applied to each DDA household within an income range. The forecast for the withdrawal patterns are compared and adjusted based on the consumer expenditure patterns provided by the U.S. Bureau of Labor Statistics. This consumer expenditure adjustment is based on the percent of household income being processed by the bank for each DDA household residing in income range.

The second part of the household expenditure report 103 shows the forecast for the rate of substitution, the risk aversion, and the household preference for each household income group. The substitution rate shows the amount and probability of the investment amount that a household is willing to substitute for an investment during the selected month of March. The risk aversion group shows the substitution amount and probability that a household is willing to risk on an investment product during March. The household preference group shows the substitution amount and probability that will require an individual or joint lifestyle decision during March.

Using the scoring and forecasting process, a bank can identify the DDA households that best match an investment criterion. An example would be identifying the DDA customers that have the short and long term investment capability to purchase an S&P 500 indexed mutual fund in the next six months. The qualification criteria for purchasing the S&P 500 indexed mutual fund would be a DDA customer having a minimum of $1,000 to $10,000 to investment in the next six months.

Continuing this example, FIG. 21 identifies 2,345 DDA customers matching the six month investment criteria for the S&P 500 indexed mutual fund marketing campaign. The report 104 shows the short term investment amount and probability, and the long term investment amount and probability, for each DDA customer. The scoring and forecasting process generates the rate of substitution, the risk aversion, and preference economic indicators to the long term amount and probability to measure the actual investment amount the DDA household will tolerate based on the economic indicator rates.

FIG. 22 illustrates a report for forecasting the lifestyle expenditure for the month of March. Forecasting reports can be generated for the mandatory, leisure and luxury expenditure categories. These reports give the bank insight to the purchasing incentives that would best match each DDA household. The purchasing incentives are used by the bank to motivate DDA customers to open other types of accounts. The incentives may include, but are not limited to, discount coupons, rebate incentives, buy one get one free offers, product rewards, and frequent shopper rewards. The report 105 shows the average expenditure amount, the expenditure probability, and the total expenditure potential for each household income group. The economic indicator rates are applied to each income group to forecast the rate of substitution, risk aversion, and preference metrics.

FIG. 23 illustrates the consolidated household risk report 106 for all DDA bank households. The foundation of the household risk report is the limits set on the inter-temporal variable withdrawal risk aversion rate to detect the potential attrition, default, fraud, and money laundering candidates residing the CIF database.

System Platform

Figure 24:
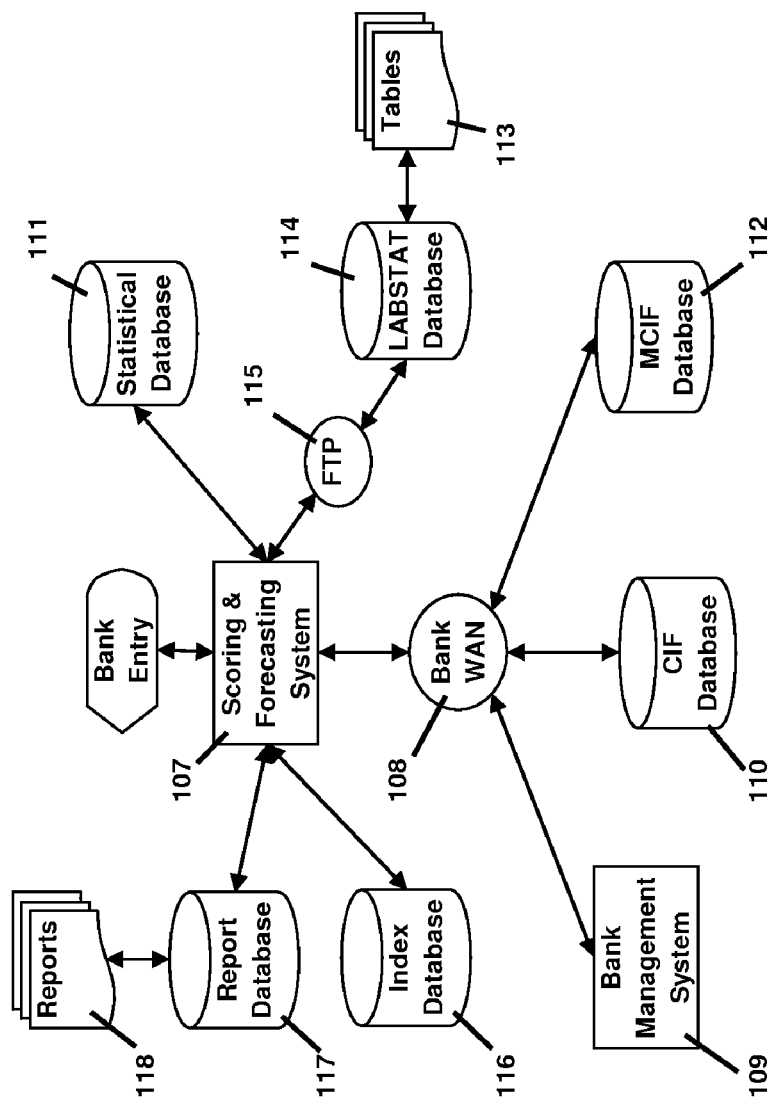
FIG. 24 is a system diagram of the scoring and forecasting system platform.

Referring to FIG. 24, a preferred embodiment of a scoring and forecasting system includes a computer system 107 and a bank network management system 108. The bank maintains a database management system 109 to manage the customer accounts stored in a central customer-information-file (CIF) database 110. The bank uses the CIF database 110 to manage multiple account types, including, but not limited to, demand deposit accounts (DDA), time deposit accounts and loan accounts.

In the preferred embodiment, the scoring and forecasting system uses the daily transactions activity of the account types stored in the CIF database 110 to score and forecast the financial behavior patterns of each bank customer having an active DDA account. To train the statistical models in the scoring and forecasting process, the system preferably utilizes between twelve to twenty-four months of daily account transaction activity. This statistical learning process is the accuracy foundation for the statistical forecasting process. The scoring and forecasting results are stored in the statistical database 111 controlled and maintained by the scoring and forecasting system. Based on the cash transaction patterns per geographic bank location, the scoring and forecasting system has the option to select a statistical model that best match the cash transaction patterns. These statistical models include, but are not limited to, the time series, linear regression, logistic regression, automatic interaction detection (AID), chi-square automatic interaction detection (CHAID), classification and regression tree (CART), rule induction and neural network models.

As part the CIF database structure, the bank maintains a marketing-customer-information-file (MCIF) database 112. The MCIF database 112 contains the personal information on all bank customers and a summary of each bank customer's account transaction activity. A preferred embodiment of the scoring and forecasting system uses the personal information residing in the MCIF database 112 for each bank customer retaining an active DDA account to build a personal information database on each DDA household. This personal information is stored in the statistical database 111.

Another embodiment of the scoring and forecasting system establishes a TCP/IP link to the U.S. Department of Labor Bureau of Labor Statistics web site (http://www.bls.gov/). Through this TCP/IP link, the expenditure tables 113 used by the system downloaded from Bureau of Labor Statistics LABSTAT 114 database using the FTP file transfer protocol 115. The system extracts the LABSTAT tables from the annually published consumer expenditure survey (www.bls.gov/cex/home.htm) and the monthly published consumer price index (www.bls.gov/cpi/home.htm). All LABSTAT tables 113 retrieved from the Bureau of Labor Statistics are stored in statistical database 111 controlled and maintained by the scoring and forecasting system.

Using the LABSTAT tables 113 stored in the statistical database 111, the scoring and forecasting system preferably contains a neural statistical network that combines the consumer expenditure survey and consumer price index table to forecast consumer expenditure patterns. To enhance the consumer expenditure forecasting, various economic indicators are downloaded and stored in the index database 116.

All datasets generated from the statistical scoring and forecasting process are stored in the report database 117. Included in the report database 117 are the personal information captured from the MCIF 112 for each DDA household. The scoring and forecasting system includes a report management system that generates the standard reports 118 that profile the results of the statistical process performed under the system.

FIG. 25 illustrates an ad-hoc report using the fixed and variable deposits stored in the report database 117 to forecast the account performance 119 for new, existing, and account DDA closures. The DDA account performance 119 report compares the forecast deposit against the actual deposits for a selected month and shows the forecasting variance. Additionally, the account performance report 119 compares the results of the deposit forecast to the monthly forecast and variances from the previous year. Other ad-hoc reports can measure the return-on-investment (ROI) that a bank is receiving from the DDA, Time Deposit, and Loan cash transaction activity from each bank defined marketing campaign utilizing the scoring and forecasting process defined under the preferred embodiment.

Thus, in accordance with one embodiment of the invention, the system determines the functional derivative of the cash deposits and withdrawals to forecast the inter-temporal rate of substitution, risk aversion, preferences, propensity to consume and propensity to save of each direct-deposit-account (DDA) household.

The system classifies the deposit and withdrawal transaction activity for each DDA household into the following categories: fixed deposits, variable deposits, fixed withdrawals, and variable. Based on the withdrawal functional derivative rate the withdrawal transactions are classified into one of the following expenditure groups: mandatory, lifestyle, leisure and luxury.

The system matches each DDA household to the regional expenditure information provided by the U.S. Department of Labor—Bureau of Statistics. This regional expenditure information provides a benchmark for forecasting the expenditure potential of each DDA household. The system partitions the regional expenditure information into the expenditure groups used by the system: mandatory, lifestyle, leisure and luxury.

The system uses the datasets and a statistical model to forecast the future expenditures categories, the deposits and withdrawals, the rates of substitution, risk aversion, preferences, propensity to save, and propensity to consume of each DDA household.

To score and forecast the cash flow that is processed monthly for each DDA household, the system preferably uses a minimum of twelve (12) months to a maximum of twenty-four (24) months of deposit and withdrawal transaction history to generate the invention metric.

Using the customer information stored in a bank's customer information files (CIF), the customer/family profile of each DDA customer is determined. The system uses the household income as the primary identification index for each DDA household.

The household income of DDA household is matched to the consumer expenditure survey tables generated quarterly by the U.S. Department of Labor—Bureau of Labor Statistics. These expenditure tables can be transferred to the system using an FTP process. These consumer expenditure survey tables are used by the system to forecast the potential household expenditures for each household based on the household income.

In a preferred embodiment, the household expenditures percentages provided by the consumer expenditure tables are adjusted for each household based on the following customer profile information: age, size of the household, occupation, education, and number of earners in a household.

To forecast the consumer expenditures percentage, the system may use a back-propagation statistical neural model to forecast monthly the consumer price index (CPI). The Producer Price Index (PPI), the Consumer Confidence Index, the Housing Market Index, the M2 Index, the S&P 500 indexes and Dow Jones indexes may be used to train the neural network in forecasting future CPI's. The positive or negative changes in future CPI forecasts are used to forecast the monthly consumer expenditure of each household income group. Research has shown that eighty-five (85) percent accuracy rate can be achieved for forecasting future CPI rates using the neural network approach.

The consumer expenditure survey is published quarterly. The system divides the consumer expenditures and percentage provided by each table into the following expenditure categories: mandatory, lifestyle, leisure and luxury. The consumer expenditure survey tables are divided into two groups, (1) the primary expenditure profiles, and (2) the expenditure modifier profiles.

Primary Expenditure Profiles

Table 47 Age of Reference Person

Expenditure Modifier Profiles

Table 48 Size of consumer unit

Table 53 Occupation of the Reference Person

Table 51 Housing Tenure of the Reference Person

The U.S. Department of Labor publishes the consumer price index (CPI) monthly. The system divides the CPI expenditure into the categories that match consumer expenditure survey categories.

In one embodiment of the system, a monthly deposit and withdrawal calendar is generated for each DDA customer and each DDA customer's household. Using a statistical pattern classification model, the daily, monthly and annual cash deposits and withdrawals for each DDA household are partitioned into the following groups:

Fixed Deposits (FD)—The monthly deposits are classified into the monthly deposit calendar as fixed deposits based on the deposit amount range, frequency probability limits set by the invention. Based on the frequency probability of the fixed deposits, the inter-temporal deposit rate and the source of the deposits, the fixed deposits are group into a household income category: salary, interest, retirement, social security, or third-party electronic transfers.

In one embodiment, the fixed deposit statistical pattern recognitions process is based on the following:

$$f(FD) = \sum_n (D_0 t_0 \varepsilon_0 + D_1 t_1 \varepsilon_1 + \ldots D_n t_n \varepsilon_n)$$

$\varepsilon$=Stochastic Process

The stochastic process adds a statistical pattern recognition and probability dimension to the deposit and withdrawal classifications. Given a probability space ($\Omega$, $\Im$, P), the stochastic process with X states being a collection of X-valued random variables indexed by a set T ("time").

$\Omega$=the sample space $\Im$=the subset of $\Im$

P=a function from $\Im$ that assigns to each event a probability 0 and 1

The fixed deposits are compared to the, actual or estimated, household income of each DDA customer to determine the percent (%) of household income processed by the bank. This percent (%) of household income is used as a predictive accuracy modifier when determining the analytical results defined in the invention.

Using the actual or estimated household income for each DDA household income group, the system may match the low income percentage groups to the DDA household expenditure profiles with a higher income processing percentage to forecast the household income to expenditure potential.

Variable Deposits (VD)—The monthly fixed deposit that fall outside the limits set for the frequency probability and inter-temporal deposit rate may be categorized as variable deposits. These random deposits are not used to calculate the percent of household income being processed by the bank. The variable deposits are classified under a secondary household income category under the following groups: mandatory, or lifestyle, leisure, luxury expense support. The variable deposit statistical pattern recognitions process can be based on the following:

$$f(VD) = \sum_n (D_0 t_0 \varepsilon_0 + D_1 t_1 \varepsilon_1 + \ldots D_n t_n \varepsilon_n)$$

Fixed Withdrawals (FW)—The monthly withdrawals may be classified into the monthly withdrawal calendar as fixed withdrawals based on the withdrawal amount, frequency probability, and inter-temporal withdrawal rate limits set by the system. Using these withdrawals limits, the fixed withdrawal patterns may be classified under one of the expenditure classifications: mandatory, lifestyle, leisure, luxury. The fixed withdrawal statistical pattern recognition process may be based on the following:

$$f(FW) = \sum_n (W_0 t_0 \varepsilon_0 + W_1 t_1 \varepsilon_1 + \ldots W_n t_n \varepsilon_n)$$

Variable Withdrawals (VW)—The monthly fixed withdrawals that fall outside the limits set for the frequency probability and inter-temporal withdrawal rates may be categorized as variable withdrawals. Based on the frequency probability, and inter-temporal variable withdrawal rate of the variable withdrawals, the withdrawals may be classified as follows: mandatory, lifestyle, leisure, luxury. The variable withdrawal statistical pattern recognitions process may be based on the following:

$$f(VW) = \sum_n (W_0 t_0 \varepsilon_0 + W_1 t_1 \varepsilon_1 + \ldots W_n t_n \varepsilon_n)$$

The table below illustrates the use of the frequency probability to classify the deposit and withdrawal into the fixed or variable deposit categories. The frequency probability range for defining fixed and variable deposit categories may vary based on the household income range processed by the bank.

| Frequency Probability Range | Monthly Deposit Amount | Monthly Withdrawal Amount | Transaction Classification Range |
|---|---|---|---|
| 1.0-0.9 | ↑ | ↑ | Fixed |
| 0.9-0.8 | ↑ | ↑ | |
| 0.8-0.7 | ↑ | ↑ | |
| 0.7-0.6 | ↑ | ↑ | |
| 0.6-0.5 | ↓ | ↓ | Variable |
| 0.5-0.4 | ↓ | ↓ | |
| 0.4-0.3 | ↓ | ↓ | |
| 0.3-0.2 | ↓ | ↓ | |
| 0.2-0.1 | ↓ | ↓ | |
| 0.1-0.0 | ↓ | ↓ | |

The table below illustrates the use of the frequency probability to classify the withdrawals into the fixed or variable withdrawal categories. The frequency probability range for defining fixed and variable withdrawal categories may vary based on the household income range processed by the bank.

| Frequency Probability Range | Monthly Withdrawal Amount | Withdrawal Classification Range |
|---|---|---|
| 1.0-0.9 | ↑ | Fixed |
| 0.9-0.8 | ↑ | |
| 0.8-0.7 | ↓ | Variable |
| 0.7-0.6 | ↓ | |
| 0.6-0.5 | ↓ | |
| 0.5-0.4 | ↓ | |
| 0.4-0.3 | ↓ | |
| 0.3-0.2 | ↓ | |
| 0.2-0.1 | ↓ | |
| 0.1-0.0 | ↓ | |

Using the datasets established for the fixed deposits, variable deposits, fixed withdrawals and variable withdrawals a functional derivative rate is generated for each dataset group based on the daily, month, and annual cash flow that is processed through each group calendar, including the cash transactions from time deposit and loan accounts related to each DDA account, to generate the following inter-temporal rates for each withdrawal group:

Inter-temporal Deposit (D) Rate:

$$f'(D) = \lim_{t \to 0} \frac{[f(D_1 + t_1) - f(D_0)] + \varepsilon}{t_1}$$

Inter-temporal Withdrawal (W) Rate:

$$f'(W) = \lim_{t \to 0} \frac{[f(W_1 + t_1) - f(W_0)] + \varepsilon}{t_1}$$

$\varepsilon$=Stochastic Process

Using the inter-temporal withdrawal rate results, the frequency probability of the withdrawal patterns are classified for each DDA household. The daily functional derivative rates are used to classify the deposit and withdrawal patterns.

Figure 27:
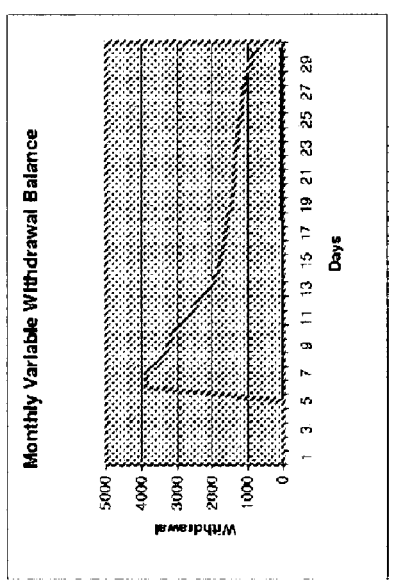
FIG. 27 is a graph and table illustrating the rate conversion of a monthly variable rate plan.

Using the variable withdrawal rate as an example, the graph and table shown in FIG. 27 is an illustration of the rate conversion of the monthly variable withdrawal rate pattern. The daily variable withdrawal amounts are accumulated under the corresponding rate range.

Using the frequency probability and inter-temporal rates, the daily deposit and withdrawal transaction activity may be classified into fixed deposits, variable deposits, fixed withdrawal, and variable withdrawal groups.

The fixed deposits, variable deposits, fixed withdrawals, and variable withdrawals groups are classified in mandatory, lifestyle, leisure and luxury events using the limits set for the frequency probability and inter-temporal rates. These group classifications may be compared to consumer expenditure benchmarks to evaluate the acquisition, performance and risk target initiative for each DDA household.

Using the inter-temporal withdrawal rates for fixed and variable withdrawals, the rates may be classified into low, low-middle, middle, middle-high, high substitution groups. These substitution group classifications show the amount and rate of the withdrawals that can be substituted during a monthly withdrawal forecast for each group classification.

Using the inter-temporal withdrawal rates for fixed and variable withdrawals the rates are classified into high, high-middle, middle, middle-low, low risk aversion groups. These risk aversion group classifications show the risk amount and rate limits that a household is willing to substitute monthly.

Using the inter-temporal withdrawal rates for fixed and variable withdrawals the rates are classified into low, low-middle, middle, middle-high, high preference groups. These preference group classifications show the preference amount and rate limits that a household is willing to substitute monthly.

Using the inter-temporal withdrawal rates for fixed and variable withdrawals the rates are classified into high, high-middle, middle, middle-low, low propensity to consume groups. This propensity to consume group classifications shows the expenditure amount and percentage that a household consumes monthly based on household income.

Using the inter-temporal withdrawal rates for fixed and variable withdrawals the rates are classified into low, low-middle, middle, middle-high, high propensity to save groups. This propensity to save group classification shows the expenditure amount and percentage that a household is most likely to save monthly based on household income.

Using statistical modeling and the datasets, system can forecast future expenditures, deposits, withdrawals, rates of substitution, risk aversion, preferences, propensity to save, propensity to consume. These forecasts are compared to the expenditure forecast generated for the consumer expenditure survey forecast to provide a benchmark on the accuracy of the household forecast.

Using the statistical models, a bank can tailor specific target initiative to the datasets. These target initiatives are defined under target variable selection module. The statistical models used for this forecasting can include, but not limited to: Time-Series, Linear Regression, Automatic Interaction Detection (AID), Chi-Square Automatic Interaction Detection (CHAID), Rule Induction, and Neural Networks.

The system generates a group of standard reports. Each bank has the option to use the system datasets to generate specialty reports that target households for specific acquisition, performance, and risk defined initiatives.

The Household Expenditure Scoring & Forecasting report is divided in two groups: (1) a summary report of the consumer expenditure survey table, the inter-temporal variable withdrawal rate forecast for each household expenditure group, variance between the consumer expenditure survey and the variable withdrawal rate expenditure classifications; and (2) a report that shows the details of the summary of the rate of substitution, risk aversion, and preference for each expenditure classification.

A Household Investment Scoring & Forecasting report is based on the mandatory, lifestyle, leisure, and luxury classifications generated from the consumer expenditure table, and fixed and variable withdrawals for each household income group.

The standard investment report shows the investment range forecast and probability for the DDA household residing in each household income level.

In one embodiment of the system, each investment range forecast and probability is tied and factored by the following likelihood metric for each DDA household: inter-temporal rate of substitution, aversion to expenditure rate substitution, preference for expenditure substitution, propensity to consume and the propensity of save for each DDA household. A summary and detail investment report is generated for each DDA household.

The Mandatory, Lifestyle, Leisure and Luxury Expenditure Scoring & Forecasting report has the same structure and format of the household expenditure report. It focuses on the mandatory, lifestyle, leisure, and luxury expenditure forecast and probability for each DDA household. The summary report and detail expenditure report is generated for each DDA household.

The Household Risk report is based on the fixed deposits, variable deposits, fixed withdrawals, and variable withdrawals forecast and probability, and measures the fluctuation in each DDA household's cash flow forecast and probability to detect potential attrition, default, fraud and money laundering candidates. A threshold limit function may be used to detect the attrition, default, fraud and money laundering threshold events for each DDA household. A summary report and detail household at-risk account report is generated for each DDA household.

The Account Performance report forecasts for the tracking of the monthly fixed and variable withdrawal calendar. The system measures, classifies and forecast the withdrawals for the following account events: interest collected, loan impound fees, loan processing fees, loan late fees, service fees, NSF fees, overdraft fees, off-line debit card fees. The accounts performance reports track the variance to the defined performance forecast. A summary and detail account performance report is generated for each DDA household.

It will be apparent to those of skill in the art that the use of the terms "processor" and "stage" in the description of the system can refer to various combinations of hardware, firmware, and/or software in a conventional computing platform that are coded or instructed to implement the novel functions and steps described herein. The various processors and stages can be part of a single computing system having sufficient processing power and related resources (in a single processor device) to implement the system. In such an embodiment, the various described "processors" and "stages" can be software modules, tools, or sub-routines coded to cause the described steps to be performed.

APPENDIX

TABLE 1

Table 47. Age of reference person: Shares of average annual expenditures and sources of income, Consumer Expenditure Survey, 2005

| Item | All consumer units | Under 25 years | 25-34 years | 35-44 years | 45-54 years | 55-64 years | 65 years and older | 65-74 years | 75 years and older |
|---|---|---|---|---|---|---|---|---|---|
| Number of consumer units (in thousands) | 117,356 | 8,543 | 19,835 | 23,835 | 24,393 | 18,104 | 22,847 | 11,505 | 11,342 |
| Consumer unit characteristics: | | | | | | | | | |
| Income before taxes | $58,712 | $27,494 | $55,066 | $72,699 | $75,266 | $64,156 | $36,936 | $45,202 | $28,552 |
| Income after taxes | $56,304 | $27,120 | $53,257 | $69,619 | $71,442 | $61,068 | $36,007 | $43,976 | $27,924 |
| Age of reference person | 48.6 | 21.5 | 29.5 | 39.7 | 49.3 | 59.3 | 75.2 | 69.1 | 81.4 |
| Average number in consumer unit: | | | | | | | | | |
| Persons | 2.5 | 2.1 | 2.8 | 3.2 | 2.7 | 2.1 | 1.7 | 1.9 | 1.5 |
| Children under 18 | 0.6 | 0.5 | 1.1 | 1.3 | 0.6 | 0.2 | 0.1 | 0.1 | ($^1$) |
| Persons 65 and over | 0.3 | ($^1$) | ($^1$) | ($^1$) | ($^1$) | 0.1 | 1.4 | 1.4 | 1.3 |
| Earners | 1.3 | 1.4 | 1.5 | 1.7 | 1.7 | 1.3 | 0.5 | 0.7 | 0.2 |
| Vehicles | 2.0 | 1.3 | 1.8 | 2.1 | 2.4 | 2.2 | 1.6 | 1.9 | 1.2 |
| Percent distribution: | | | | | | | | | |
| Sex of reference person: | | | | | | | | | |
| Male | 47 | 47 | 48 | 48 | 48 | 49 | 44 | 48 | 39 |
| Female | 53 | 53 | 52 | 52 | 52 | 51 | 56 | 52 | 61 |
| Housing tenure: | | | | | | | | | |
| Homeowner | 67 | 19 | 48 | 69 | 75 | 82 | 80 | 83 | 78 |
| With mortgage | 43 | 12 | 42 | 59 | 58 | 46 | 19 | 28 | 11 |
| Without mortgage | 25 | 6 | 6 | 11 | 17 | 36 | 61 | 55 | 67 |
| Renter | 33 | 81 | 52 | 31 | 25 | 18 | 20 | 17 | 22 |
| Race of reference person: | | | | | | | | | |
| Black or African-American | 12 | 11 | 14 | 13 | 13 | 10 | 9 | 11 | 7 |
| White, Asian, and all other races | 88 | 89 | 86 | 87 | 87 | 90 | 91 | 89 | 93 |
| Hispanic or Latino origin of reference person: | | | | | | | | | |
| Hispanic or Latino | 11 | 14 | 17 | 14 | 10 | 7 | 5 | 6 | 4 |
| Not Hispanic or Latino | 89 | 86 | 83 | 86 | 90 | 93 | 95 | 94 | 96 |
| Education of reference person: | | | | | | | | | |
| Elementary (1-8) | 5 | 3 | 3 | 4 | 4 | 5 | 11 | 9 | 13 |
| High school (9-12) | 36 | 37 | 31 | 34 | 34 | 35 | 44 | 42 | 47 |
| College | 59 | 60 | 66 | 62 | 62 | 60 | 44 | 49 | 40 |
| Never attended and other | ($^2$) | ($^3$) | ($^2$) | ($^2$) | ($^2$) | ($^2$) | ($^2$) | ($^2$) | ($^2$) |
| At least one vehicle owned or leased | 88 | 75 | 89 | 91 | 91 | 91 | 84 | 89 | 79 |
| Average annual expenditures | $46,409 | $27,776 | $45,068 | $55,190 | $55,854 | $49,592 | $32,866 | $38,573 | $27,018 |
| Food | 12.8 | 14.2 | 12.5 | 13.3 | 12.5 | 12.5 | 12.7 | 12.7 | 12.5 |
| Food at home | 7.1 | 6.9 | 6.5 | 7.5 | 6.8 | 7.0 | 7.9 | 7.7 | 8.2 |
| Cereals and bakery products | 1.0 | 1.0 | 0.9 | 1.0 | 0.9 | 0.9 | 1.1 | 1.0 | 1.2 |
| Cereals and cereal products | 0.3 | 0.4 | 0.3 | 0.3 | 0.3 | 0.3 | 0.3 | 0.3 | 0.4 |
| Bakery products | 0.7 | 0.6 | 0.6 | 0.7 | 0.6 | 0.7 | 0.8 | 0.8 | 0.8 |
| Meats, poultry, fish, and eggs | 1.6 | 1.6 | 1.5 | 1.7 | 1.6 | 1.7 | 1.7 | 1.8 | 1.6 |
| Beef | 0.5 | 0.5 | 0.4 | 0.5 | 0.5 | 0.5 | 0.5 | 0.5 | 0.4 |
| Pork | 0.3 | 0.3 | 0.3 | 0.4 | 0.3 | 0.3 | 0.4 | 0.4 | 0.4 |
| Other meats | 0.2 | 0.2 | 0.2 | 0.2 | 0.2 | 0.2 | 0.2 | 0.2 | 0.2 |
| Poultry | 0.3 | 0.3 | 0.3 | 0.3 | 0.3 | 0.3 | 0.3 | 0.3 | 0.2 |
| Fish and seafood | 0.2 | 0.2 | 0.2 | 0.2 | 0.3 | 0.3 | 0.3 | 0.3 | 0.3 |
| Eggs | 0.1 | 0.1 | 0.1 | 0.1 | 0.1 | 0.1 | 0.1 | 0.1 | 0.1 |
| Dairy products | 0.8 | 0.8 | 0.8 | 0.9 | 0.8 | 0.8 | 0.9 | 0.9 | 1.0 |
| Fresh milk and cream | 0.3 | 0.3 | 0.3 | 0.3 | 0.3 | 0.3 | 0.4 | 0.3 | 0.4 |
| Other dairy products | 0.5 | 0.4 | 0.5 | 0.5 | 0.5 | 0.5 | 0.6 | 0.6 | 0.6 |
| Fruits and vegetables | 1.2 | 1.1 | 1.0 | 1.2 | 1.1 | 1.3 | 1.5 | 1.4 | 1.6 |
| Fresh fruits | 0.4 | 0.3 | 0.3 | 0.4 | 0.4 | 0.4 | 0.5 | 0.5 | 0.5 |
| Fresh vegetables | 0.4 | 0.3 | 0.3 | 0.4 | 0.4 | 0.4 | 0.4 | 0.4 | 0.5 |
| Processed fruits | 0.2 | 0.2 | 0.2 | 0.2 | 0.2 | 0.2 | 0.3 | 0.3 | 0.4 |
| Processed vegetables | 0.2 | 0.2 | 0.2 | 0.2 | 0.2 | 0.2 | 0.2 | 0.2 | 0.2 |
| Other food at home | 2.5 | 2.5 | 2.4 | 2.6 | 2.4 | 2.4 | 2.7 | 2.5 | 2.8 |
| Sugar and other sweets | 0.3 | 0.2 | 0.2 | 0.3 | 0.3 | 0.3 | 0.3 | 0.3 | 0.4 |
| Fats and oils | 0.2 | 0.2 | 0.2 | 0.2 | 0.2 | 0.2 | 0.2 | 0.2 | 0.2 |
| Miscellaneous foods | 1.3 | 1.4 | 1.4 | 1.4 | 1.2 | 1.2 | 1.4 | 1.3 | 1.5 |
| Nonalcoholic beverages | 0.7 | 0.7 | 0.6 | 0.7 | 0.7 | 0.6 | 0.6 | 0.6 | 0.6 |
| Food prepared by consumer unit on out-of-town trips | 0.1 | ($^1$) | 0.1 | 0.1 | 0.1 | 0.1 | 0.1 | 0.1 | 0.1 |
| Food away from home | 5.7 | 7.3 | 6.0 | 5.9 | 5.7 | 5.5 | 4.7 | 5.0 | 4.3 |
| Alcoholic beverages | 0.9 | 1.4 | 1.1 | 0.9 | 0.8 | 0.9 | 0.8 | 0.8 | 0.6 |
| Housing | 32.7 | 32.2 | 34.4 | 33.5 | 30.9 | 31.8 | 33.6 | 32.3 | 35.6 |
| Shelter | 19.0 | 19.9 | 21.1 | 19.6 | 18.4 | 17.5 | 17.8 | 16.7 | 19.4 |
| Owned dwellings | 12.8 | 4.5 | 11.6 | 14.4 | 13.8 | 13.4 | 11.9 | 12.1 | 11.6 |
| Mortgage interest and charges | 7.1 | 3.0 | 7.8 | 9.4 | 8.0 | 6.2 | 3.2 | 4.1 | 2.0 |
| Property taxes | 3.3 | 1.0 | 2.3 | 3.2 | 3.5 | 3.8 | 4.6 | 4.3 | 5.1 |

TABLE 1-continued

Table 47. Age of reference person: Shares of average annual expenditures and sources of income, Consumer Expenditure Survey, 2005

| Item | All consumer units | Under 25 years | 25-34 years | 35-44 years | 45-54 years | 55-64 years | 65 years and older | 65-74 years | 75 years and older |
|---|---|---|---|---|---|---|---|---|---|
| Maintenance, repairs, insurance, other expenses | 2.4 | 0.5 | 1.4 | 1.8 | 2.2 | 3.4 | 4.0 | 3.7 | 4.5 |
| Rented dwellings | 5.1 | 14.7 | 9.0 | 4.5 | 3.3 | 2.6 | 4.5 | 3.0 | 6.8 |
| Other lodging | 1.1 | 0.7 | 0.5 | 0.8 | 1.4 | 1.5 | 1.3 | 1.6 | 1.0 |
| Utilities, fuels, and public services | 6.9 | 6.3 | 6.5 | 6.5 | 6.6 | 6.9 | 8.6 | 8.0 | 9.4 |
| Natural gas | 1.0 | 0.7 | 0.9 | 0.9 | 1.0 | 1.1 | 1.5 | 1.3 | 1.8 |
| Electricity | 2.5 | 2.3 | 2.3 | 2.3 | 2.4 | 2.5 | 3.1 | 3.0 | 3.4 |
| Fuel oil and other fuels | 0.3 | 0.1 | 0.1 | 0.2 | 0.3 | 0.3 | 0.6 | 0.5 | 0.7 |
| Telephone services | 2.3 | 2.7 | 2.4 | 2.2 | 2.2 | 2.2 | 2.2 | 2.2 | 2.3 |
| Water and other public services | 0.8 | 0.5 | 0.7 | 0.7 | 0.8 | 0.8 | 1.1 | 1.0 | 1.3 |
| Household operations | 1.7 | 1.4 | 2.2 | 2.1 | 1.2 | 1.4 | 2.0 | 1.8 | 2.3 |
| Personal services | 0.7 | 0.9 | 1.4 | 1.2 | 0.2 | 0.1 | 0.3 | 0.2 | 0.5 |
| Other household expenses | 1.0 | 0.5 | 0.8 | 0.9 | 1.0 | 1.2 | 1.6 | 1.5 | 1.8 |
| Housekeeping supplies | 1.3 | 0.9 | 1.1 | 1.3 | 1.3 | 1.5 | 1.6 | 1.7 | 1.5 |
| Laundry and cleaning supplies | 0.3 | 0.2 | 0.3 | 0.3 | 0.3 | 0.3 | 0.3 | 0.3 | 0.3 |
| Other household products | 0.7 | 0.4 | 0.6 | 0.7 | 0.7 | 0.8 | 0.8 | 0.8 | 0.8 |
| Postage and stationery | 0.3 | 0.2 | 0.3 | 0.3 | 0.3 | 0.4 | 0.5 | 0.5 | 0.4 |
| Household furnishings and equipment | 3.8 | 3.7 | 3.6 | 4.0 | 3.4 | 4.5 | 3.7 | 4.3 | 3.0 |
| Household textiles | 0.3 | 0.2 | 0.3 | 0.3 | 0.3 | 0.3 | 0.3 | 0.3 | 0.2 |
| Furniture | 1.0 | 1.1 | 1.2 | 1.1 | 0.8 | 1.1 | 0.9 | 1.1 | 0.6 |
| Floor coverings | 0.1 | 0.1 | 0.1 | 0.1 | 0.2 | 0.2 | 0.1 | 0.1 | 0.1 |
| Major appliances | 0.5 | 0.3 | 0.4 | 0.4 | 0.4 | 0.6 | 0.6 | 0.6 | 0.7 |
| Small appliances, miscellaneous housewares | 0.2 | 0.2 | 0.2 | 0.2 | 0.2 | 0.3 | 0.3 | 0.3 | 0.3 |
| Miscellaneous household equipment | 1.7 | 1.7 | 1.4 | 1.9 | 1.5 | 2.1 | 1.5 | 1.8 | 1.1 |
| Apparel and services | 4.1 | 5.7 | 4.6 | 4.3 | 4.2 | 3.6 | 2.9 | 3.4 | 2.2 |
| Men and boys | 0.9 | 1.1 | 1.0 | 1.1 | 1.0 | 0.8 | 0.6 | 0.7 | 0.4 |
| Men, 16 and over | 0.8 | 1.0 | 0.8 | 0.7 | 0.9 | 0.7 | 0.5 | 0.6 | 0.3 |
| Boys, 2 to 15 | 0.2 | 0.1 | 0.3 | 0.3 | 0.2 | 0.1 | 0.1 | 0.1 | ($^1$) |
| Women and girls | 1.6 | 2.4 | 1.6 | 1.7 | 1.7 | 1.4 | 1.4 | 1.6 | 1.0 |
| Women, 16 and over | 1.4 | 2.3 | 1.3 | 1.2 | 1.5 | 1.3 | 1.3 | 1.5 | 0.9 |
| Girls, 2 to 15 | 0.3 | 0.1 | 0.3 | 0.5 | 0.2 | 0.1 | 0.1 | 0.1 | 0.1 |
| Children under 2 | 0.2 | 0.4 | 0.4 | 0.2 | 0.1 | 0.1 | 0.1 | 0.1 | ($^1$) |
| Footwear | 0.7 | 1.1 | 0.9 | 0.7 | 0.7 | 0.6 | 0.5 | 0.5 | 0.5 |
| Other apparel products and services | 0.6 | 0.7 | 0.7 | 0.6 | 0.7 | 0.7 | 0.4 | 0.5 | 0.3 |
| Transportation | 18.0 | 21.6 | 19.5 | 18.0 | 17.5 | 18.0 | 15.7 | 17.0 | 13.9 |
| Vehicle purchases (net outlay) | 7.6 | 9.8 | 8.8 | 8.0 | 7.1 | 7.6 | 6.1 | 6.8 | 5.2 |
| Cars and trucks, new | 4.2 | 2.6 | 4.2 | 4.3 | 3.9 | 4.8 | 4.2 | 4.6 | 3.6 |
| Cars and trucks, used | 3.3 | 6.9 | 4.4 | 3.4 | 3.1 | 2.6 | 1.9 | 2.2 | 1.6 |
| Other vehicles | 0.2 | 0.3 | 0.2 | 0.3 | 0.1 | 0.2 | ($^1$) | ($^1$) | ($^3$) |
| Gasoline and motor oil | 4.3 | 5.5 | 4.7 | 4.3 | 4.3 | 4.2 | 3.7 | 4.1 | |
| Other vehicle expenses | 5.0 | 5.5 | 5.2 | 4.8 | 5.1 | 5.1 | 4.8 | 5.0 | |
| Vehicle finance charges | 0.6 | 0.7 | 0.9 | 0.7 | 0.6 | 0.6 | 0.3 | 0.4 | |
| Maintenance and repairs | 1.4 | 1.6 | 1.4 | 1.3 | 1.5 | 1.5 | 1.6 | 1.7 | |
| Vehicle insurance | 2.0 | 2.3 | 2.0 | 1.8 | 2.1 | 1.9 | 2.0 | 1.9 | |
| Vehicle rental, leases, licenses, and other charges | 1.0 | 1.0 | 1.0 | 1.0 | 1.0 | 1.1 | 0.9 | 0.9 | |
| Public transportation | 1.0 | 0.7 | 0.8 | 0.9 | 1.0 | 1.1 | 1.1 | 1.2 | |
| Healthcare | 5.7 | 2.5 | 3.4 | 4.1 | 4.8 | 6.9 | 12.8 | 10.8 | |
| Health insurance | 2.9 | 1.4 | 1.8 | 2.1 | 2.3 | 3.2 | 7.0 | 6.1 | |
| Medical services | 1.5 | 0.7 | 0.9 | 1.2 | 1.4 | 2.0 | 2.3 | 1.9 | |
| Drugs | 1.1 | 0.4 | 0.5 | 0.6 | 0.9 | 1.4 | 3.0 | 2.5 | |
| Medical supplies | 0.2 | 0.1 | 0.1 | 0.2 | 0.2 | 0.3 | 0.4 | 0.3 | |
| Entertainment | 5.1 | 5.0 | 5.4 | 5.0 | 5.4 | 4.9 | 4.8 | 5.6 | |
| Fees and admissions | 1.3 | 0.9 | 1.1 | 1.4 | 1.3 | 1.3 | 1.3 | 1.4 | |
| Audio and visual equipment and services | 1.9 | 2.3 | 2.1 | 1.9 | 1.9 | 1.7 | 2.0 | 2.1 | |
| Pets, toys, hobbies, and playground equipment | 0.9 | 0.7 | 1.0 | 0.8 | 1.0 | 1.1 | 0.7 | 0.8 | |
| Other entertainment supplies, equipment, and services | 1.1 | 1.2 | 1.3 | 0.9 | 1.2 | 0.8 | 0.9 | 1.2 | |
| Personal care products and services | 1.2 | 1.2 | 1.1 | 1.1 | 1.1 | 1.1 | 1.4 | 1.3 | |
| Reading | 0.3 | 02 | 0.2 | 0.2 | 0.3 | 0.3 | 0.4 | 0.4 | |
| Education | 2.0 | 4.9 | 1.7 | 1.7 | 3.2 | 1.5 | 0.6 | 0.7 | |
| Tobacco products and smoking supplies | 0.7 | 1.1 | 0.7 | 0.6 | 0.8 | 0.7 | 0.5 | 0.6 | |
| Miscellaneous | 1.7 | 0.9 | 1.5 | 1.4 | 1.7 | 2.0 | 2.6 | 2.7 | |
| Cash contributions | 3.6 | 1.4 | 2.4 | 3.1 | 3.7 | 4.0 | 5.7 | 5.0 | |
| Personal insurance and pensions | 11.2 | 7.7 | 11.4 | 12.6 | 13.2 | 11.9 | 5.4 | 6.7 | |
| Life and other personal insurance | 0.8 | 0.2 | 0.5 | 0.7 | 0.8 | 1.1 | 1.2 | 1.2 | |
| Pensions and Social Security | 10.4 | 7.5 | 10.9 | 11.8 | 12.3 | 10.8 | 4.2 | 5.5 | |
| Sources of income and personal taxes: | | | | | | | | | |
| Money income before taxes | $58,712 | $27,494 | $55,066 | $72,699 | $75,266 | $64,156 | $36,936 | $45,202 | |
| Wages and salaries | 78.8 | 87.4 | 91.6 | 89.7 | 87.1 | 72.6 | 28.5 | 35.3 | |
| Self-employment income | 6.4 | 3.5 | 5.1 | 6.3 | 7.3 | 7.1 | 6.6 | 9.0 | |

TABLE 1-continued

Table 47. Age of reference person: Shares of average annual expenditures and sources of income, Consumer Expenditure Survey, 2005

| Item | All consumer units | Under 25 years | 25-34 years | 35-44 years | 45-54 years | 55-64 years | 65 years and older | 65-74 years | 75 years and older |
|---|---|---|---|---|---|---|---|---|---|
| Social Security, private and government retirement | 10.5 | 0.7 | 0.6 | 1.1 | 2.8 | 14.9 | 55.6 | 48.4 | |
| Interest, dividends, rental income, other property Income | 2.3 | 1.1 | 0.5 | 1.2 | 1.2 | 4.0 | 7.7 | 5.7 | |
| Unemployment and workers' compensation, veterans' benefits | 0.3 | 0.2 | 0.3 | 0.3 | 0.4 | 0.4 | 0.3 | 0.3 | |
| Public assistance, supplemental security income, food stamps | 0.6 | 1.4 | 0.6 | 0.5 | 0.5 | 0.6 | 0.6 | 0.6 | |
| Regular contributions for support | 0.6 | 3.5 | 0.7 | 0.7 | 0.5 | 0.3 | 0.5 | 0.5 | |
| Other income | 0.3 | 2.1 | 0.5 | 0.2 | 0.3 | 0.2 | 0.3 | 0.2 | |
| Personal taxes | 4.1 | 1.4 | 3.3 | 4.2 | 5.1 | 4.8 | 2.5 | 2.7 | |
| Federal income taxes | 2.9 | 0.7 | 2.2 | 3.0 | 3.7 | 3.4 | 1.7 | 1.9 | |
| State and local Income taxes | 0.9 | 0.6 | 0.9 | 1.0 | 1.1 | 1.0 | 0.3 | 0.2 | |
| Other taxes | 0.3 | ([1]) | 0.2 | 0.2 | 0.3 | 0.4 | 0.6 | 0.6 | |
| Income after taxes | 95.9 | 98.6 | 96.7 | 95.8 | 94.9 | 95.2 | 97.5 | 97.3 | |

[1] Value less than 0.05.
[2] Value less than or equal to 0.5.
[3] No data reported
[4] Data are likely to have large sampling errors.

TABLE 2

Table 3. Consumer Price Index for all Urban Consumers (CPI-U): U.S. city average, detailed expenditure categories (1982-84 = 100, unless otherwise noted)

| Item and Group | Relative importance, December 2005 | Unadjusted indexes | | Unadjusted percent change to | | Seasonally adjusted percent change from- | | |
|---|---|---|---|---|---|---|---|---|
| | | November 2006 | December 2006 | December 2006 from- December 2005 | November 2006 | September to October | October to November | November to December |
| Expenditure category | | | | | | | | |
| All Items | 100.000 | 201.5 | 201.8 | 2.5 | 0.1 | −0.5 | 0.0 | 0.5 |
| All Items (1967 = 100) | — | 603.6 | 604.5 | — | — | — | — | — |
| Food and beverages | 15.051 | 197.2 | 197.4 | 2.2 | .1 | .3 | −.1 | .0 |
| Food | 13.942 | 195.8 | 157.0 | 2.1 | .1 | .3 | −.1 | .0 |
| Food at home | 7.988 | 194.3 | 194.3 | 1.4 | .0 | .3 | −.3 | −.3 |
| Cereals and bakery products | 1.098 | 214.5 | 214.3 | 3.1 | 1 | .3 | .4 | .4 |
| Cereals and cereal products | .361 | 188.2 | 159.0 | 2.1 | .4 | .3 | 1.2 | .2 |
| Flour and prepared flour mixes | .046 | 179.2 | 177.0 | 3.1 | −1.2 | 1.1 | 2.0 | −1.5 |
| Breakfast cereal [1] | .203 | 200.5 | 202.3 | .5 | .9 | .3 | .8 | .9 |
| Rice, pasta, cornmeal [1] | .111 | 174.4 | 174.9 | 4.7 | .3 | .9 | .9 | .3 |
| Rice [1 2 3] | — | 117.8 | 117.3 | 6.5 | −.4 | 1.5 | .3 | −.4 |
| Bakery products [1] | .738 | 228.5 | 228.5 | 3.5 | .0 | .5 | −.3 | .0 |
| Bread [1 3] | .215 | 133.5 | 133.4 | 5.1 | −.1 | 1.1 | .5 | −.1 |
| White bread [1 2] | — | 244.5 | 244.6 | 5.2 | .0 | 1.6 | .9 | .0 |
| Bread other than white [1 2] | — | 252.3 | 251.3 | 4.6 | −.4 | −1.0 | .5 | −.4 |
| Fresh biscuits, rolls, muffins [1 3] | .100 | 133.4 | 134.0 | 5.3 | .4 | 1.0 | .8 | .4 |
| Cakes, cupcakes, and cookies | .209 | 217.0 | 216.1 | 1.0 | −.4 | −.4 | .9 | −.7 |
| Cookies [1 2] | — | 215.5 | 216.2 | 1.7 | .3 | 1.0 | 1.4 | .3 |
| Fresh cakes and cupcakes [1 2] | — | 218.9 | 216.9 | .4 | −.9 | −.3 | 1.2 | −.9 |
| Other bakery products | .213 | 211.7 | 212.4 | 3.2 | .3 | .5 | −1.8 | .9 |
| Fresh sweetrolls, coffeecakes, doughnuts [1 2] | — | 223.1 | 225.3 | 3.9 | 1.0 | 1.2 | −.4 | 1.0 |
| Crackers, bread, and cracker products [2] | — | 244.5 | 244.4 | 3.3 | −.1 | .4 | −1.8 | .3 |
| Frozen and refrigerated bakery products, pies, tarts, turnovers [2] | — | 213.9 | 217.3 | 2.7 | 1.6 | 1.0 | −3.4 | 2.5 |
| Meals, poultry, fish, and eggs | 2.133 | 188.4 | 168.6 | 1.6 | .1 | .2 | .2 | .1 |
| Meats, poultry, and fish | 2.044 | 189.7 | 169.0 | 1.0 | −.4 | .2 | .0 | −.2 |
| Meats | 1.327 | 190.7 | 189.4 | .9 | −.7 | .5 | .4 | −.4 |
| Beef and veal [1] | .641 | 203.8 | 202.6 | .5 | −.8 | .6 | .7 | −.6 |
| Uncooked ground beef [1] | .237 | 177.4 | 177.7 | .5 | .2 | .2 | .7 | .2 |
| Uncooked beef roasts [1 3] | .108 | 151.5 | 147.5 | −.2 | −2.6 | 1.9 | 3.7 | −2.6 |
| Uncooked beef steaks [1 3] | .245 | 146.1 | 145.1 | .1 | −.7 | .5 | −.3 | −.7 |

TABLE 2-continued

Table 3. Consumer Price Index for all Urban Consumers (CPI-U): U.S. city average, detailed expenditure categories (1982-84 = 100, unless otherwise noted)

| Item and Group | Relative importance, December 2005 | Unadjusted indexes | | Unadjusted percent change to December 2006 from- | | Seasonally adjusted percent change from- | | |
|---|---|---|---|---|---|---|---|---|
| | | November 2006 | December 2006 | December 2005 | November 2006 | September to October | October to November | November to December |
| Uncooked other beef and veal [1][3] | .051 | 137.4 | 138.1 | 4.1 | .5 | .0 | −.1 | .5 |
| Pork | .422 | 177.2 | 176.4 | .7 | −.5 | .3 | −.9 | .5 |
| Bacon, breakfast sausage, and related products [3] | .133 | 122.2 | 122.3 | 1.7 | .1 | 1.7 | −3.2 | .7 |
| Bacon and related products [2] | — | 213.2 | 211.1 | 1.6 | −1.0 | 2.5 | −3.4 | −.6 |
| Breakfast sausage and related products [2][3] | — | 117.5 | 119.3 | 1.4 | 1.5 | 1.6 | −2.9 | 1.7 |
| Ham | .097 | 177.5 | 173.6 | .4 | −2.2 | .5 | −.7 | .4 |
| Ham, excluding canned [2] | — | 202.5 | 195.9 | 1.3 | −3.3 | .6 | −1.0 | −.1 |
| Pork chops | .083 | 168.3 | 156.2 | −.4 | −1.2 | −1.3 | 2.6 | −.2 |
| Other pork including roasts and picnics [3] | .108 | 111.0 | 112.1 | .4 | 1.0 | −.5 | −.4 | .7 |
| Other meats [1] | .265 | 185.0 | 184.0 | 2.0 | −1.1 | .3 | 1.8 | −1.1 |
| Frankfurters [1][2] | — | 181.8 | 177.6 | 1.1 | −2.3 | 3.5 | 3.3 | −2.3 |
| Lunchmeats [1][2][3] | — | 120.2 | 119.1 | .9 | −.9 | −.2 | .3 | −.9 |
| Lamb and organ meats [1][2] | — | NA | NA | — | — | −.6 | — | — |
| Lamb and mutton [1][2][3] | — | NA | NA | — | — | — | — | — |
| Poultry [1] | .383 | 181.8 | 152.5 | −.7 | .4 | −.5 | −.5 | .4 |
| Chicken [1][3] | .308 | 111.8 | 118.5 | −.9 | .6 | −1.0 | .1 | .6 |
| Fresh whole chicken [1][2] | — | 185.3 | 186.1 | −1.3 | .4 | −1.6 | 1.8 | .4 |
| Fresh and frozen chicken parts [1][2] | — | 179.7 | 181.2 | −1.1 | .8 | −1.0 | −.8 | .8 |
| Other poultry including turkey [3] | .075 | 114.8 | 114.7 | .3 | −.1 | .6 | .6 | −.8 |
| Fish and seafood [1] | .334 | 211.8 | 211.6 | 3.5 | −.1 | .0 | −.9 | −.1 |
| Fresh fish and seafood [1][3] | .203 | 125.3 | 125.9 | 4.1 | .5 | .7 | −2.5 | .5 |
| Processed fish and seafood [3] | .129 | 112.0 | 110.9 | 2.5 | −1.0 | −1.1 | 1.5 | −.2 |
| Canned fan and seafood [2] | — | 145.4 | 144.0 | 5.5 | −1.0 | −.5 | 2.6 | −.4 |
| Frozen fish and seafood [1][2] | — | 235.5 | 233.8 | 1.0 | −.7 | −3.5 | 1.9 | −.7 |
| Eggs | .089 | 159.3 | 176.5 | 14.1 | 10.8 | −.3 | 4.0 | 6.9 |
| Dairy and related products | .852 | 180.6 | 151.0 | −1.2 | .2 | .7 | −.6 | .1 |
| Milk [3] | .309 | 125.6 | 125.5 | −2.5 | −.1 | 1.3 | −.4 | −.2 |
| Fresh whole milk [2] | — | 181.7 | 181.2 | −4.3 | −.3 | 2.0 | −.5 | −.3 |
| Fresh milk other than whole [1][2][3] | — | 128.1 | 128.0 | .0 | −.1 | .9 | .5 | −.1 |
| Cheese and related products | .264 | 179.1 | 176.9 | −1.9 | −.1 | .2 | −.8 | .3 |
| Ice cream and related products | .143 | 181.8 | 182.0 | 1.6 | .1 | .1 | 1.4 | −.8 |
| Other dairy and related products [1][3] | .137 | 120.0 | 121.7 | −.2 | 1.4 | 1.2 | −3.0 | 1.4 |
| Fruits and vegetables | 1.219 | 256.8 | 257.2 | 1.9 | 0.2 | 0.0 | −2.2 | −1.5 |
| Fresh fruits and vegetables | .971 | 306.4 | 305.4 | 1.8 | .0 | .0 | −3.1 | −2.2 |
| Fresh fruits | .485 | 322.8 | 325.7 | 4.3 | .9 | −.7 | −1.4 | −.8 |
| Apples | .060 | 283.5 | 276.3 | 10.0 | −2.5 | −1.6 | −.4 | −3.2 |
| Bananas | .073 | 173.5 | 174.6 | 2.7 | .6 | −.1 | 1.6 | −.8 |
| Citrus fruits [3] | .091 | 204.3 | 155.0 | 6.1 | −9.4 | 1.4 | −.8 | −1.9 |
| Oranges, including tangerines [2] | — | 425.2 | 370.7 | 11.8 | −12.8 | .9 | .2 | −.1 |
| Other fresh fruits [3] | .240 | 116.1 | 124.4 | 2.1 | 7.1 | −3.9 | −2.8 | .8 |
| Fresh vegetables | .486 | 288.6 | 255.1 | −.8 | −.9 | .8 | −4.7 | −3.8 |
| Potatoes | .074 | 267.8 | 266.8 | 6.0 | −.4 | −2.0 | −.6 | .3 |
| Lettuce [1] | .058 | 265.1 | 281.9 | 8.4 | 6.3 | −1.6 | −1.7 | 5.3 |
| Tomatoes | .102 | 347.5 | 318.5 | −7.0 | −8.4 | 15.6 | −20.5 | −13.0 |
| Other fresh vegetables | .261 | 266.8 | 258.0 | −2.4 | .4 | −3.8 | −1.0 | −2.4 |
| Processed fruits and vegetables [3] | .247 | 122.7 | 123.5 | 2.7 | .7 | −.2 | 1.5 | .8 |
| Canned fruits and vegetables [3] | .129 | 120.8 | 122.2 | 2.6 | 1.2 | −.7 | 1.9 | 1.1 |
| Canned fruits [1][2][3] | — | 119.4 | 122.3 | 3.8 | 2.4 | −1.8 | −.8 | 2.4 |
| Canned vegetables [2][3] | — | 125.5 | 125.9 | 1.2 | .3 | −.5 | 3.0 | −.5 |
| Frozen fruits and vegetables [3] | .077 | 126.2 | 125.7 | 2.5 | −.4 | .3 | 1.1 | −.1 |
| Frozen vegetables [2] | — | 178.1 | 178.7 | .7 | .3 | −.5 | 1.8 | .3 |
| Other processed fruits and vegetables including dried [3] | .042 | 121.0 | 122.5 | 3.4 | 1.2 | .9 | −.6 | 1.2 |
| Dried beans, peas, and lentils [1][2][3] | — | 121.0 | 123.6 | 6.0 | 2.1 | −.2 | .4 | 2.1 |
| Nonalcoholic beverages and beverage materials | .910 | 148.9 | 148.5 | 2.1 | −.3 | .3 | .9 | −.3 |
| Juices and nonalcoholic drinks [3] | .606 | 114.2 | 113.6 | 1.9 | −.5 | .4 | 1.0 | −.9 |
| Carbonated drinks | .332 | 135.6 | 133.6 | .4 | −1.5 | .7 | 1.6 | −1.7 |
| Frozen noncarbonated juices and drinks [1][3] | .016 | 126.2 | 126.5 | 13.2 | .2 | .7 | 4.8 | .2 |
| Nonfrozen noncarbonated juices and drinks [1][3] | .259 | 109.9 | 110.7 | 3.1 | .7 | .2 | −.3 | .7 |
| Beverage materials including coffee and tea [1][3] | .304 | 105.4 | 105.6 | 2.4 | .2 | .5 | 1.2 | .2 |
| Coffee [1] | .100 | 163.8 | 165.8 | 2.2 | 1.2 | .2 | −1.1 | 1.2 |
| Roasted coffee [1][2] | — | 166.6 | 166.3 | −.5 | −.2 | −.2 | −1.0 | −.2 |

TABLE 2-continued

Table 3. Consumer Price Index for all Urban Consumers (CPI-U): U.S. city average, detailed expenditure categories (1982-84 = 100, unless otherwise noted)

| Item and Group | Relative importance, December 2005 | Unadjusted indexes | | Unadjusted percent change to December 2006 from- | | Seasonally adjusted percent change from- | | |
|---|---|---|---|---|---|---|---|---|
| | | November 2006 | December 2006 | December 2005 | November 2006 | September to October | October to November | November to December |
| Instant and freeze dried coffee [1] [2] | — | 182.2 | 188.5 | 7.7 | 3.5 | 2.7 | .4 | 3.5 |
| Other beverage materials including tea [1] [3] | .204 | 119.3 | 118.9 | 2.6 | −.3 | .6 | 2.3 | −.3 |
| Other food at home | 1.777 | 169.2 | 168.7 | .7 | −.3 | .2 | −.3 | −.2 |
| Sugar and sweets | .302 | 172.7 | 172.4 | 2.7 | −.2 | .5 | .3 | .1 |
| Sugar and artificial sweeteners | .054 | 155.0 | 163.3 | 5.3 | −1.5 | .7 | 2.0 | −1.9 |
| Candy and chewing gum [1] [3] | .196 | 113.0 | 113.1 | 1.5 | .1 | .6 | .4 | .1 |
| Other sweets [3] | .051 | 122.7 | 123.3 | 4.0 | .5 | −.2 | .5 | .4 |
| Fats and oils | .231 | 168.1 | 166.7 | .9 | −.8 | .5 | .9 | −.6 |
| Butter and margarine [1] [3] | .071 | 129.7 | 129.5 | −1.3 | −.2 | 3.4 | −2.7 | −.2 |
| Butter [2] | — | 164.9 | 164.5 | −5.8 | −.2 | 3.5 | .2 | −.2 |
| Margarine [2] | — | 178.2 | 177.0 | 1.7 | −.7 | .3 | 1.7 | −1.0 |
| Salad dressing [3] | .062 | 111.6 | 109.2 | 3.4 | −2.2 | .2 | 1.6 | −2.3 |
| Other fats and oils including peanut butter [1] [3] | .099 | 117.9 | 117.3 | .9 | −.5 | .2 | .4 | −.5 |
| Peanut butter [1] [2] [3] | — | 110.2 | 108.5 | −2.9 | −1.5 | −2.1 | 1.6 | −1.5 |
| Other foods [1] | 1.244 | 184.0 | 183.5 | .1 | −.3 | .1 | −.6 | −.3 |
| Soups | .068 | 208.5 | 211.3 | .0 | 1.3 | 3.7 | −1.3 | .2 |
| Frozen and freeze dried prepared foods | .257 | 153.4 | 151.7 | −1.7 | −1.1 | .4 | −.5 | −1.6 |
| Snacks [1] | .278 | 181.6 | 179.5 | −1.0 | −1.2 | 1.2 | −.9 | −1.2 |
| Spices, seasonings, condiments, sauces [1] | .221 | 186.3 | 185.0 | −.1 | −.7 | −.2 | −2.5 | −.7 |
| Salt and other seasonings and spices [1] [2] [3] | — | 109.4 | 109.0 | −3.7 | −.4 | −1.6 | −.8 | −.4 |
| Olives, pickles, relishes [1] [2] [3] | — | 112.2 | 112.6 | 2.2 | .4 | .9 | −5.4 | .4 |
| Sauces and gravies [1] [2] [3] | — | 109.0 | 109.4 | 2.9 | .4 | .6 | −1.9 | .4 |
| Other condiments [1] [2] | — | 205.5 | 199.3 | .2 | −3.0 | −5.5 | −2.6 | −3.0 |
| Baby food [1] [3] | .073 | 129.4 | 128.6 | .9 | −.9 | .0 | .9 | −.6 |
| Other miscellaneous foods [1] [3] | .328 | 113.8 | 115.1 | 2.4 | 1.1 | −.4 | .1 | 1.1 |
| Food away from home [1] | 5.953 | 201.6 | 202.2 | 3.2 | .3 | .3 | .2 | .3 |
| Full service meals and snacks [1] [3] | 2.594 | 127.1 | 127.5 | 3.4 | .3 | .5 | .1 | .3 |
| Limited service meals and snacks [1] [3] | 2.702 | 127.3 | 127.7 | 3.0 | .3 | .2 | .4 | .3 |
| Food at employee sites and schools [3] | .254 | 125.0 | 125.0 | 3.6 | .0 | −.2 | .1 | −.1 |
| Food at elementary and secondary schools [1] [2] [4] | — | 104.4 | 104.3 | 4.3 | −.1 | .4 | .2 | −.1 |
| Food from vending machines and mobile vendors [1] [3] | .126 | 115.2 | 116.5 | 2.0 | .3 | .2 | .5 | .3 |
| Other food away from home [3] | .277 | 138.6 | 139.1 | 4.0 | .4 | .1 | .7 | .5 |
| Alcoholic beverages [1] | 1.109 | 201.6 | 201.1 | 2.4 | −0.2 | 0.2 | −0.1 | −0.2 |
| Alcoholic beverages at home | .716 | 175.0 | 174.0 | 1.5 | −.6 | .5 | −.1 | −.1 |
| Beer, ale, and other malt beverages at home | .336 | 176.6 | 177.8 | 1.3 | −.4 | .2 | .0 | −.2 |
| Distilled spirits at home | .125 | 179.5 | 178.7 | .8 | −.6 | .2 | .1 | .0 |
| Whiskey at home [1] [2] | — | 181.0 | 178.9 | 1.0 | −1.2 | −.3 | .00 | −1.2 |
| Distilled spirits, excluding whiskey, at home [2] | — | 177.9 | 177.2 | .2 | −.4 | .7 | .2 | .3 |
| Wine at home | .254 | 155.4 | 158.4 | 1.9 | −.6 | .6 | −.4 | −.1 |
| Alcoholic beverages away from home | .393 | 257.6 | 258.4 | 4.2 | .3 | .0 | −.2 | .4 |
| Beer, ale, and other malt beverages away from home [1] [2] [3] | — | 131.4 | 131.7 | 4.8 | .2 | .2 | −.2 | .2 |
| Wine away from home [1] [2] [3] | — | 139.7 | 140.1 | 3.2 | .3 | .1 | −.3 | .3 |
| Distilled spirits away from home [2] [3] | — | 135.6 | 136.2 | 3.5 | .4 | −.4 | .1 | .7 |
| Housing | 42.350 | 204.5 | 204.8 | 3.3 | .1 | .0 | .4 | .4 |
| Shelter | 32.260 | 234.9 | 235.1 | 4.2 | .1 | .3 | .4 | .3 |
| Rent of primary residence [5] | 5.832 | 228.9 | 230.0 | 4.3 | .5 | .2 | .4 | .5 |
| Lodging away from home [3] | 2.511 | 130.7 | 127.7 | 4.0 | −2.3 | −.5 | 1.0 | .4 |
| Housing at school, excluding board [5] [6] | .151 | 352.9 | 362.9 | 5.1 | .0 | .3 | .4 | .4 |
| Other lodging away from home including hotels and motels | 2.460 | 273.3 | 269.8 | 3.9 | −2.4 | −.5 | 1.0 | .4 |
| Owners' equivalent rent of primary residence [5] [8] | 23.442 | 242.1 | 242.8 | 4.3 | .3 | .4 | 3 | .3 |
| Tenants' and household insurance [1] [3] | .375 | 118.3 | 117.1 | .9 | −1.0 | −.2 | 1.8 | −1.0 |
| Fuels and utilities | 5.371 | 190.6 | 192.6 | .5 | 1.0 | −2.2 | 1.0 | 1.1 |
| Fuels | 4.494 | 172.1 | 174.2 | −.3 | 1.2 | −2.7 | 1.2 | 1.3 |
| Fuel oil and other fuels | .339 | 227.2 | 233.2 | 24 | 2.6 | −5.0 | .0 | 3.2 |
| Fuel oil | .232 | 233.3 | 240.9 | 2.3 | 3.3 | −6.1 | .3 | 4.3 |
| Other household fuels [7] | .107 | 268.3 | 271.9 | 2.6 | 1.3 | −2.6 | .3 | 1.2 |
| Gas (piped) and electricity [5] | 4.155 | 177.0 | 179.0 | −.6 | 1.1 | −2.5 | 1.2 | 1.2 |
| Electricity [6] | 2.625 | 164.4 | 164.8 | 7.5 | .2 | −.2 | −.2 | .0 |
| Utility (piped) gas service [5] | 1.530 | 214.8 | 221.3 | −14.2 | 3.0 | −7.7 | 4.7 | 3.9 |

TABLE 2-continued

Table 3. Consumer Price Index for all Urban Consumers (CPI-U): U.S. city average, detailed expenditure categories (1982-84 = 100, unless otherwise noted)

| Item and Group | Relative importance, December 2005 | Unadjusted indexes | | Unadjusted percent change to December 2006 from- | | Seasonally adjusted percent change from- | | |
|---|---|---|---|---|---|---|---|---|
| | | November 2006 | December 2006 | December 2005 | November 2006 | September to October | October to November | November to December |
| Water and sewer and trash collection services [3] | .877 | 139.0 | 139.3 | 4.8 | .2 | .2 | .3 | .3 |
| Water and sewerage maintenance [5] | .555 | 301.7 | 302.5 | 4.7 | .3 | .4 | .3 | .4 |
| Garbage and trash collection [1 8] | .222 | 336.9 | 337.2 | 5.2 | .1 | .5 | .3 | .1 |
| Household furnishings and operations | 4.749 | 127.2 | 127.0 | .5 | -.2 | .0 | -.2 | .1 |
| Window and floor coverings and other linens [3] | .377 | 82.5 | 62.4 | -4.8 | -.1 | -.4 | -1.9 | .0 |
| Floor coverings [1 3] | .050 | 119.9 | 119.5 | 4.0 | -.3 | .3 | 1.3 | -.3 |
| Window coverings [1 3] | .100 | 86.6 | 87.9 | -.8 | 1.5 | 1.1 | -1.9 | 1.5 |
| Other linens [1 3] | .227 | 71.5 | 71.3 | -8.5 | -.7 | -1.1 | -3.1 | -.7 |
| Furniture and bedding [1] | 1.013 | 126.7 | 126.2 | -.7 | -.4 | .2 | -.2 | -.4 |
| Bedroom furniture [1] | .336 | 145.8 | 144.4 | -1.2 | -1.0 | -.1 | .4 | -1.0 |
| Living room, kitchen, and dining room furniture [1 3] | .473 | 92.3 | 92.3 | -.8 | .0 | .3 | -.6 | .0 |
| Other furniture [3] | .197 | 89.4 | 89.0 | .5 | -.4 | .1 | -.7 | -.8 |
| Infants' furniture [1 2 4] | — | 98.9 | 98.6 | -1.4 | -.3 | -.3 | -.5 | -.3 |
| Appliances [3] | .339 | 68.8 | 88.0 | 1.1 | -.9 | .9 | -.1 | -1.0 |
| Major appliances [1 3] | .192 | 98.1 | 97.2 | 2 9 | -.9 | 1.3 | .0 | -.9 |
| Laundry equipment [1 2] | — | 112.6 | 112.4 | 1.5 | -.4 | 1.0 | .7 | -.4 |
| Other appliances [1 3] | .140 | 75.8 | 73.1 | -1.3 | -.9 | .4 | -1.0 | -.9 |
| Other household equipment and furnishings [3] | .635 | 79.0 | 78.7 | -5.4 | -.4 | -.3 | -.5 | .4 |
| Clocks, lamps, and decorator items [1] | .356 | 77.7 | 77.6 | -8.3 | -.1 | .9 | .0 | -.1 |
| Indoor plants and flowers [9] | .104 | 120.8 | 121.6 | -.7 | .7 | .4 | .2 | .6 |
| Dishes and flatware [1 3] | .082 | 75.7 | 74.2 | -6.3 | -2.0 | -.1 | -1.0 | -2.0 |
| Nonelectric cookware and tableware [1 3] | .093 | 91.5 | 90.6 | 1.0 | -1.1 | 1.0 | -.3 | -1.1 |
| Tools, hardware, outdoor equipment and supplies [1 3] | .766 | 94.7 | 94.8 | 1.2 | .1 | -.3 | .3 | .1 |
| Tools, hardware and supplies [1 3] | .208 | 99.6 | 100.1 | 1.9 | .5 | -.9 | .4 | .5 |
| Outdoor equipment and supplies [3] | .371 | 92.2 | 92.1 | .8 | -.1 | .5 | .7 | -.2 |
| Housekeeping supplies [1] | .841 | 168.4 | 166.3 | 4.0 | -.1 | -.3 | .2 | -.1 |
| Household cleaning products [1 3] | .372 | 112.6 | 112.9 | 2.7 | .1 | -.7 | 1.1 | .1 |
| Household paper products [1 3] | .203 | 133.6 | 133.9 | 6.6 | .2 | .5 | -.5 | .2 |
| Miscellaneous household products [1 3] | .266 | 112.1 | 111.4 | 3.8 | -.6 | -.4 | -.5 | -.6 |
| Household operations [1 3] | .779 | 138.9 | 139.1 | 4.4 | .1 | .9 | .2 | .1 |
| Domestic services [1 3] | .247 | 136.8 | 137.3 | 4.6 | .4 | 2.6 | .4 | .4 |
| Gardening and lawncare services [1 3] | .249 | 138.5 | NA | — | — | -.1 | .0 | — |
| Moving, storage, freight expense [3] | .081 | 128.5 | 125.6 | .2 | .0 | -1.2 | -.4 | .2 |
| Repair of household items [1 3] | .126 | 168.0 | 158.4 | 4.3 | 0.3 | 0.6 | 0.7 | 0.3 |
| Apparel | 3.785 | 121.7 | 118.6 | .9 | -2.5 | -.7 | -.3 | .6 |
| Men's and boys' apparel | .915 | 115.6 | 113.2 | -.8 | -2.1 | -1.0 | -.9 | .4 |
| Men's apparel | .718 | 121.0 | 119.4 | -.3 | -1.3 | -.7 | -1.4 | .9 |
| Men's suits, sport coats, and outerwear | .145 | 122.7 | 120.2 | -4.1 | 2.0 | -2.3 | .1 | .6 |
| Men's furnishings | .182 | 134.5 | 131.7 | -1.3 | -2.2 | -1.5 | -1.2 | -.7 |
| Men's shirts and sweaters [3] | .197 | 87.4 | 87.8 | 2.8 | .5 | -.7 | -1.8 | 3.8 |
| Men's pants and shorts | .177 | 108.8 | 106.8 | .4 | -1.8 | 1.0 | -2.2 | -.3 |
| Boys' apparel | .196 | 96.2 | 91.4 | 2.6 | -5.0 | -1.4 | .4 | 1.8 |
| Women's and girls' apparel | 1.612 | 113.9 | 110.2 | 1.2 | -3.2 | -1.2 | -.3 | 1.0 |
| Women's apparel | 1.365 | 115.2 | 111.6 | 1.7 | -3.1 | -1.9 | -.4 | 1.4 |
| Women's outerwear | .116 | 108.7 | 101.7 | -.7 | -6.4 | 2.7 | 2.8 | -1.2 |
| Women's dresses | .132 | 119.7 | 112.4 | 7.9 | -6.1 | -1.1 | 2.0 | 1.3 |
| Women's suits and separates [3] | .725 | 90.0 | 57.6 | 2.3 | -2.7 | -3.5 | -1.7 | 2.9 |
| Women's underwear, nightwear, sportswear and accessories [3] | .364 | 92.2 | 91.0 | -.9 | -1.3 | -.3 | .2 | .3 |
| Girls' apparel | .247 | 107.3 | 102.8 | -1.5 | -4.2 | 2.6 | .5 | -2.1 |
| Footwear | .753 | 124.5 | 123.0 | 1.3 | -1.2 | .5 | .0 | .7 |
| Men's footwear [1] | .228 | 124.6 | 123.4 | 2.2 | -1.0 | -.2 | .8 | -1.0 |
| Boys' and girls' footwear [1] | .168 | 124.5 | 123.4 | -.8 | -.9 | .8 | -1.8 | -.9 |
| Women's footwear | .352 | 123.6 | 121.7 | 1.7 | 1.5 | 1.4 | .0 | 1.4 |
| Infants' and toddlers' apparel | .183 | 117.6 | 114.1 | -.8 | -3.0 | 1.4 | -1.0 | -2.0 |
| Jewelry and watches [7] | .318 | 132.1 | 129.1 | 4.8 | -2.3 | -.4 | .7 | .6 |
| Watches [7] | .046 | 116.7 | 115.7 | 1.8 | -.9 | .1 | -.1 | .0 |
| Jewelry [7] | .272 | 136.4 | 133.0 | 5.2 | -2.5 | -.5 | .8 | .4 |
| Transportation | 17.415 | 173.9 | 175.4 | 1.8 | .9 | -3.1 | -.9 | 1.8 |
| Private transportation | 16.329 | 170.0 | 171.8 | 1.7 | 1.1 | -3.3 | -.8 | 2.0 |
| New and used motor vehicles [3] | 7.858 | 94.9 | 94.8 | -1.0 | -.1 | -.3 | -.8 | -.3 |
| New vehicles | 5.155 | 136.8 | 137.1 | -.9 | .2 | -.1 | -.7 | -.2 |
| New cars and trucks [2 3] | — | 94.6 | 95.0 | -.9 | .2 | .0 | -.8 | -.1 |

TABLE 2-continued

Table 3. Consumer Price Index for all Urban Consumers (CPI-U): U.S. city average, detailed expenditure categories (1982-84 = 100, unless otherwise noted)

| Item and Group | Relative importance, December 2005 | Unadjusted indexes | | Unadjusted percent change to December 2006 from- | | Seasonally adjusted percent change from- | | |
|---|---|---|---|---|---|---|---|---|
| | | November 2006 | December 2006 | December 2005 | November 2006 | September to October | October to November | November to December |
| New cars [2] | — | 136.6 | 136.9 | .2 | .2 | −.1 | −.4 | −.1 |
| New trucks [2 8] | — | 141.1 | 141.5 | −2.0 | .3 | .1 | −1.1 | −.1 |
| Used cars and trucks [1] | 1.793 | 137.3 | 136.2 | −2.2 | −.8 | −1.2 | −1.4 | −.8 |
| Leased cars and trucks [1 10] | .613 | 93.4 | 92.9 | −.1 | −.5 | −.4 | −.5 | −.5 |
| Car and truck rental [3] | .090 | 115.3 | 115.4 | 2.9 | .1 | 3.0 | .5 | .6 |
| Motor fuel | 4.191 | 191.4 | 199.3 | 6.4 | 4.1 | −11.1 | −1.6 | 8.1 |
| Gasoline (all types) | 4.148 | 190.3 | 198.1 | 6.4 | 4.1 | −11.1 | −1.6 | 8.0 |
| Gasoline, unleaded regular [2] | — | 190.0 | 197.9 | 5.5 | 4.2 | −11.1 | −1.5 | 8.3 |
| Gasoline, unleaded midgrade [2 11] | — | 194.2 | 202.1 | 5.9 | 4.1 | −11.2 | −1.7 | 7.7 |
| Gasoline, unleaded premium [2] | — | 185.0 | 192.3 | 6.2 | 3.9 | −10.8 | −1.8 | 7.5 |
| Other motor fuels [1 3] | .042 | 193.4 | 200.1 | 7.3 | 3.5 | −8.9 | .0 | 3.5 |
| Motor vehicle parts and equipment [1] | .362 | 119.5 | 119.5 | 4.8 | .0 | .2 | .5 | .0 |
| Tires [1] | .217 | 110.0 | 110.0 | 3.6 | .3 | .0 | .5 | .0 |
| Vehicle accessories other than tires [1 3] | .146 | 126.2 | 126.2 | 6.6 | .0 | .2 | .5 | .0 |
| Vehicle parts and equipment other than tires [1 2] | — | 125.5 | 125.6 | 4.8 | .1 | .2 | .2 | .1 |
| Motor oil, coolant, and fluids [1 2] | — | 225.0 | 224.4 | 15.0 | −.3 | .6 | 1.0 | −.3 |
| Motor vehicle maintenance and repair | 1.131 | 218.5 | 218.8 | 3.3 | .1 | .6 | .0 | .1 |
| Motor vehicle body work [1] | .085 | 227.5 | 228.1 | 3.4 | .3 | .0 | .4 | .3 |
| Motor vehicle maintenance and servicing [1] | .423 | 197.8 | 198.3 | 3.2 | .3 | .4 | .0 | .3 |
| Motor vehicle repair [3] | .602 | 134.6 | 134.9 | 4.4 | .1 | .7 | −.1 | .2 |
| Motor vehicle insurance | 2.301 | 335.5 | 335.2 | .8 | −.1 | .3 | −.1 | .1 |
| Motor vehicle fees [1 3] | .485 | 139.2 | 139.4 | 2.3 | .1 | −.1 | .1 | .1 |
| State and local registration and license [1 3 5] | .311 | 137.5 | 137.6 | 2.4 | .0 | −.1 | .0 | .0 |
| Parking and other fees [1 3] | .162 | 141.6 | 142.3 | 2.0 | .4 | −.4 | .2 | .4 |
| Parking fees and tolls [1 2 3] | — | 146.4 | 146.5 | 1.6 | .1 | .1 | .1 | .1 |
| Automobile service clubs [1 2 3] | — | 117.0 | 118.2 | 3.6 | 1.0 | −1.6 | .2 | 1.0 |
| Public transportation | 1.087 | 220.4 | 217.8 | .1 | −1.2 | −1.0 | −1.9 | −.2 |
| Airline fare [1] | .673 | 237.0 | 231.4 | −1.0 | −2.4 | −1.4 | −4.8 | −2.4 |
| Other intercity transportation [1] | .163 | 152.9 | 154.7 | 2.0 | 1.2 | −1.4 | 1.1 | 1.2 |
| Ship fare [1 2 3] | — | 70.8 | 71.3 | −1.4 | .7 | .3 | .7 | .7 |
| Intracity transportation [1] | .248 | 226.6 | 227.5 | 1.9 | 0.4 | −0.2 | 0.1 | 0.4 |
| Medical care | 6.220 | 340.1 | 340.1 | 3.6 | .0 | .3 | .2 | .1 |
| Medical care commodities | 1.457 | 286.6 | 285.9 | 1.8 | −.2 | .0 | −.4 | −.2 |
| Prescription drugs and medical supplies | 1.025 | 364.5 | 362.3 | 1.9 | −.6 | −.2 | −.7 | −.5 |
| Nonprescription drugs and medical supplies [1 7] | .432 | 155.3 | 156.3 | 1.8 | .6 | .5 | .3 | .6 |
| Internal and respiratory over-the-counter drugs [1] | .296 | 184.3 | 185.5 | 1.9 | .7 | .5 | .3 | .7 |
| Nonprescription medical equipment and supplies [1] | .136 | 184.3 | 185.1 | 1.5 | .4 | .5 | .5 | .4 |
| Medical care services | 4.764 | 355.6 | 356.0 | 4.1 | .1 | .4 | .3 | .2 |
| Professional services | 2.815 | 291.9 | 292.4 | 2.6 | .2 | .3 | .4 | .3 |
| Physicians' services [5] | 1.631 | 293.7 | 294.3 | 1.7 | .2 | .3 | .4 | .4 |
| Dental services [5] | .704 | 345.9 | 346.2 | 5.0 | .1 | .5 | .3 | .3 |
| Eyeglasses and eye care [7] | .226 | 169.5 | 170.3 | 2.0 | .5 | −.1 | .9 | −.5 |
| Services by other medical professionals [5 7] | .254 | 154.1 | 194.2 | 3.1 | .1 | −.1 | .2 | .1 |
| Hospital and related services [5] | 1.576 | 477.7 | 477.2 | 5.1 | −.1 | .4 | .1 | .1 |
| Hospital services [5 12] | 1.490 | 175.7 | 175.4 | 6.2 | −.2 | .3 | .2 | .1 |
| Inpatient hospital services [2 5 12] | — | 170.8 | 170.6 | 6.8 | −.1 | .7 | .1 | .1 |
| Outpatient hospital services [1 2 5 7] | — | 402.8 | 402.4 | 5.2 | −.1 | .2 | .9 | −.1 |
| Nursing homes and adult daycare [5 12] | .087 | 153.9 | 154.5 | 5.0 | .4 | .9 | .5 | .5 |
| Health insurance [1 4] | .373 | 105.8 | 106.4 | 6.4 | .5 | .9 | 1.1 | .6 |
| Recreation [3] | 5.637 | 111.2 | 110.8 | 1.0 | −.4 | .0 | .1 | −.3 |
| Video and audio [3] | 1.783 | 103.7 | 102.8 | −1.1 | −.9 | −.6 | −.3 | −.7 |
| Televisions | .164 | 19.4 | 18.8 | −22.6 | −3.1 | −3.3 | −5.3 | −3.1 |
| Cable and satellite television and radio service [6] | 1.144 | 347.2 | 344.7 | 2.6 | −.7 | −.2 | .3 | −.5 |
| Other video equipment [3] | .047 | 25.3 | 25.3 | −13.9 | .0 | −1.6 | −1.2 | .0 |
| Video cassettes, discs, and other media including rental [1 3] | .175 | 77.5 | 77.4 | 1.2 | −.1 | .0 | 1.3 | −.1 |
| Video cassettes and discs, blank and prerecorded [1 2 3] | — | 68.5 | 68.4 | −3.3 | −.1 | −.9 | .1 | −.1 |
| Rental of video tapes and discs [1 2 3] | — | 92.1 | 92.2 | 3.5 | .1 | 1.0 | 1.7 | .1 |
| Audio equipment [1] | .079 | 56.9 | 55.9 | −4.3 | −1.8 | −.2 | .5 | −1.8 |
| Audio discs, tapes and other media [1 3] | .095 | 106.9 | 105.9 | −2.9 | −.9 | .7 | −.8 | −.9 |

TABLE 2-continued

Table 3. Consumer Price Index for all Urban Consumers (CPI-U): U.S. city average, detailed expenditure categories (1982-84 = 100, unless otherwise noted)

| Item and Group | Relative importance, December 2005 | Unadjusted indexes | | Unadjusted percent change to December 2006 from- | | Seasonally adjusted percent change from- | | |
|---|---|---|---|---|---|---|---|---|
| | | November 2006 | December 2006 | December 2005 | November 2006 | September to October | October to November | November to December |
| Pets, pet products and services [3] | .640 | 129.6 | 129.8 | 3.5 | .2 | .0 | .2 | −.1 |
| Pets and pet products | .375 | 162.6 | 152.6 | 3.2 | .0 | −.2 | −.1 | −.5 |
| Pet food [1 2 3] | — | 116.3 | 116.2 | 3.4 | −.1 | −.5 | −.3 | −.1 |
| Purchase of pets, pet supplies, accessories [1 2 3] | — | 110.8 | 110.9 | 3.0 | .1 | −.3 | .9 | .1 |
| Pet services including veterinary [3] | .265 | 158.7 | 159.3 | 4.1 | .4 | .3 | .6 | .6 |
| Pet services [1 2 3] | — | 138.7 | 138.5 | 4.1 | −.1 | .7 | 1.0 | −.1 |
| Veterinarian services [2 3] | — | 162.4 | 163.0 | 4.3 | .4 | .4 | .7 | .4 |
| Sporting goods [1] | .682 | 117.7 | 117.2 | 1.5 | −.4 | .8 | .3 | −.4 |
| Sports vehicles including bicycles | .398 | 139.9 | 138.8 | 3.0 | −.8 | 1.1 | −.4 | −.4 |
| Sports equipment [1] | .274 | 96.6 | 96.5 | −1.0 | .2 | .3 | .7 | .2 |
| Photography [1 3] | .181 | 85.4 | 84.7 | −4.8 | −.8 | −.5 | −1.2 | −.8 |
| Photographic equipment and supplies [1] | .092 | 86.9 | 64.9 | −11.2 | −2.3 | −.7 | −2.1 | −2.3 |
| Film and photographic supplies [1 2 3] | — | 84.8 | 84.5 | −4.0 | −.4 | −.5 | −.5 | −.4 |
| Photographic equipment [1 2 3] | — | 47.4 | 45.5 | −15.0 | −4.0 | −1.0 | −3.1 | −4.0 |
| Photographers and film processing [1 3] | .087 | 106.1 | 106.7 | 1.8 | .6 | .0 | −.4 | .6 |
| Photographer fees [1 2 3] | — | 114.3 | 114.6 | 1.1 | .3 | −.3 | −.2 | .3 |
| Film processing [1 2 3] | — | 100.0 | 100.5 | 1.7 | .5 | −.1 | −.4 | .5 |
| Other recreational goods [3] | .403 | 67.0 | 66.4 | −3.1 | −.9 | −.1 | −.1 | −.9 |
| Toys [1] | .264 | 73.6 | 72.7 | −4.8 | −1.2 | .0 | −.1 | −1.2 |
| Toys, games, hobbies and playground equipment [1 2 3] | — | 70.9 | 70.0 | −2.5 | −1.3 | −.1 | .0 | −1.3 |
| Sewing machines, fabric and supplies [1 3] | .072 | 92.4 | 92.6 | 1.0 | .2 | −.5 | −.2 | .2 |
| Music instruments and accessories [1 3] | .050 | 97.6 | 96.9 | .0 | −.7 | .1 | −.4 | −.7 |
| Recreation services [3] | 1.631 | 137.0 | 137.2 | 3.9 | .1 | .3 | .5 | .3 |
| Club membership dues and fees for participant sports [3] | .507 | 122.6 | 122.0 | 2.2 | −.5 | −.4 | .2 | −.2 |
| Admissions | .688 | 297.6 | 299.9 | 5.2 | .7 | 1.0 | .8 | .7 |
| Admission to movies, theaters, and concerts [2 3] | — | 144.5 | 145.7 | 5.4 | .8 | .9 | .8 | .8 |
| Admission to sporting events [2 3] | — | 156.1 | 156.0 | 3.7 | −.1 | 1.2 | .9 | .0 |
| Fees for lessons or instructions [7] | .216 | 239.0 | 233.9 | 3.5 | .0 | −.1 | .4 | .3 |
| Recreational reading materials [1] | .318 | 206.3 | 205.7 | .8 | −.3 | .6 | .2 | −.3 |
| Newspapers and magazines [1 3] | .187 | 121.5 | 121.0 | 1.0 | −.4 | .3 | .3 | −.4 |
| Recreational books [1 3] | .130 | 103.6 | 103.6 | 0.7 | 0.0 | 1.2 | 0.0 | 0.0 |
| Education and communication [3] | 6.047 | 118.1 | 118.0 | 2.3 | −.1 | .2 | −.2 | .2 |
| Education [3] | 2.967 | 167.4 | 167.6 | 6.3 | .1 | .6 | .5 | .5 |
| Educational books and supplies | .196 | 398.5 | 399.5 | 5.7 | .3 | 1.1 | .8 | .5 |
| College textbooks [1 2 10] | — | 131.1 | 131.4 | 6.8 | .2 | 1.0 | .1 | .2 |
| Tuition, other school fees, and childcare | 2.771 | 463.7 | 484.0 | 6.3 | .1 | .5 | .6 | .5 |
| College tuition and fees | 1.462 | 527.2 | 527.2 | 7.0 | .0 | .6 | .8 | .5 |
| Elementary and high school tuition and fees | .395 | 526.9 | 527.1 | 5.9 | .0 | .4 | .4 | .5 |
| Child care and nursery school [9] | .716 | 210.8 | 211.2 | 5.3 | .2 | .5 | .3 | .5 |
| Technical and business school tuition and fees [3] | .065 | 173.5 | 174.4 | 5.1 | .5 | .1 | .6 | .8 |
| Communication [3] | 3.080 | 83.3 | 83.1 | −1.4 | −.2 | −.2 | −.8 | −.2 |
| Postage and delivery services [3] | .185 | 126.7 | 126.5 | 5.0 | −.2 | .0 | −.1 | −.2 |
| Postage [1] | .169 | 201.1 | 201.1 | 5.3 | .0 | .0 | .0 | .0 |
| Delivery services [1] | .015 | 174.6 | 171.3 | 1.3 | −1.8 | .2 | −1.2 | −2.4 |
| Information and information processing [1 3] | 2.895 | 80.8 | 80.5 | −1.9 | −.2 | −.2 | −.9 | −.2 |
| Telephone services [1 3] | 2.245 | 96.5 | 96.8 | 1.7 | .3 | .7 | −.3 | .2 |
| Land-line telephone services, local charges [1 5] | .749 | 216.2 | 216.8 | 2.2 | .3 | .1 | .0 | .3 |
| Land-line telephone services, long distance charges [1 3] | .661 | 69.3 | 69.6 | 3.3 | .4 | 2.2 | −.7 | .4 |
| Land-line interstate toll calls [1 2] | — | 50.2 | 50.3 | 5.0 | .2 | 3.1 | −.4 | .2 |
| Land-line intrastate toll calls [1 2] | — | 71.3 | 72.1 | 3.3 | 1.1 | 2.0 | −.3 | 1.1 |
| Wireless telephone services [1 3] | .816 | 64.6 | 64.6 | .0 | .0 | −.2 | .0 | .0 |
| Information technology, hardware and services [1 13] | .850 | 11.4 | 11.2 | −14.5 | −1.8 | −3.3 | 4.2 | −1.8 |
| Personal computers and peripheral equipment [1 3] | .236 | 10.3 | 10.3 | −12.0 | .0 | −1.0 | −1.0 | .0 |
| Computer software and accessories [1 3] | .041 | 53.8 | 54.2 | −7.4 | .7 | −.9 | −.4 | .7 |
| Internet services and electronic information providers [1 3] | .307 | 81.1 | 77.2 | −16.3 | −4.8 | −6.5 | −6.8 | −4.8 |

TABLE 2-continued

Table 3. Consumer Price Index for all Urban Consumers (CPI-U): U.S. city average,
detailed expenditure categories (1982-84 = 100, unless otherwise noted)

| Item and Group | Relative importance, December 2005 | Unadjusted indexes | | Unadjusted percent change to December 2006 from- | | Seasonally adjusted percent change from- | | |
|---|---|---|---|---|---|---|---|---|
| | | November 2006 | December 2006 | December 2005 | November 2006 | September to October | October to November | November to December |
| Telephone hardware, calculators, and other consumer information items [1][3] | .057 | 40.3 | 40.3 | −8.8 | .0 | .7 | −.2 | .0 |
| Other goods and services | 3.463 | 324.3 | 326.7 | 3.0 | .7 | .3 | .1 | .8 |
| Tobacco and smoking products [1] | .710 | 519.4 | 527.3 | 2.8 | 1.5 | .1 | −.3 | 1.5 |
| Cigarettes [1][3] | .661 | 210.1 | 213.4 | 2.8 | 1.6 | .0 | −.3 | 1.6 |
| Tobacco products other than cigarettes [1][3] | .046 | 156.3 | 157.7 | 2.0 | .9 | .1 | −1.4 | .9 |
| Personal care | 2.752 | 192.2 | 193.3 | 3.0 | .6 | .4 | .2 | .6 |
| Personal care products [1] | .710 | 156.1 | 159.0 | 2.3 | 1.9 | .1 | −.3 | 1.9 |
| Hair, dental, shaving, and miscellaneous personal care products [1][3] | .369 | 103.2 | 104.2 | 2.1 | 1.0 | .2 | .0 | 1.0 |
| Cosmetics, perfume, bath, nail preparations and implements [1] | .336 | 172.6 | 177.5 | 2.5 | 2.8 | −.1 | −.6 | 2.8 |
| Personal care services [1] | .675 | 212.3 | 212.5 | 2.9 | .1 | .5 | .3 | .1 |
| Haircuts and other personal care services [1][3] | .675 | 129.5 | 129.6 | 2.9 | .1 | .5 | .2 | .1 |
| Miscellaneous personal services | 1.172 | 318.2 | 318.7 | 3.9 | .2 | .5 | .2 | .2 |
| Legal services [7] | .298 | 254.5 | 255.7 | 4.5 | .4 | .5 | .5 | .5 |
| Funeral expenses [7] | .187 | 244.6 | 244.9 | 4.9 | .1 | .4 | .5 | .0 |
| Laundry and dry cleaning services [1][3] | .283 | 127.0 | 126.9 | 3.3 | −.1 | .2 | .2 | −.1 |
| Apparel services other than laundry and dry cleaning [1][3] | .033 | 134.1 | 134.4 | 5.1 | .2 | .4 | .4 | .2 |
| Financial services [7] | .185 | 262.8 | 263.0 | 3.5 | .1 | .8 | −.6 | .3 |
| Checking account and other bank services [1][2][3] | — | 126.5 | 126.7 | 2.3 | .2 | 1.3 | −1.0 | .2 |
| Tax return preparation and other accounting fees [2][3] | — | 156.6 | 156.6 | 6.4 | .0 | .3 | .1 | .3 |
| Care of invalids and elderly at home [1][4] | .105 | 103.0 | 103.1 | 3.1 | .1 | .2 | .3 | .1 |
| Miscellaneous personal goods [3] | .195 | 86.7 | 86.9 | .6 | .2 | −.2 | .5 | .6 |
| Stationery, stationery supplies, gift wrap [2] | — | 151.3 | 131.6 | .9 | .2 | .1 | .1 | −.1 |
| Infants' equipment [1][2][4] | — | 97.3 | 97.1 | −2.9 | −.2 | .3 | .0 | −.2 |
| Special aggregate indexes | | | | | | | | |
| Commodities | 40.790 | 161.8 | 162.1 | 1.3 | .2 | −1.4 | −.4 | 2 |
| Commodities less food and beverages | 25.739 | 142.1 | 142.5 | .8 | .3 | −2.3 | −.7 | 1.4 |
| Nondurables less food and beverages | 14.163 | 169.7 | 170.9 | 2.8 | .7 | −3.4 | .9 | 2.9 |
| Nondurables less food, beverages, and apparel | 10.377 | 203.5 | 207.3 | 3.4 | 1.9 | −4.8 | −.9 | 3.5 |
| Durables | 11.576 | 113.5 | 113.3 | −1.4 | −.2 | −.2 | −.5 | −.3 |
| Services | 59.210 | 240.9 | 241.2 | 3.4 | .1 | .1 | .3 | .3 |
| Rent of shelter [6] | 31.884 | 244.7 | 245.0 | 4.3 | .1 | .3 | .4 | .4 |
| Transportation services | 5.707 | 231.5 | 230.8 | 1.3 | −.3 | .0 | −.5 | .0 |
| Other services | 10.669 | 261.1 | 280.9 | 3.2 | −.1 | .2 | .1 | .1 |
| All items less food | 63.058 | 202.3 | 202.6 | 2.6 | .1 | −.6 | .0 | .6 |
| All items less shelter | 67.740 | 190.7 | 191.1 | 1.8 | .2 | −.9 | −.2 | .6 |
| All items less medical care | 93.780 | 194.5 | 194.8 | 2.5 | 0.2 | −0.6 | 0.0 | 0.6 |
| Commodities less food | 26.848 | 144.3 | 144.7 | 1.0 | .3 | −2.2 | −.7 | 1.3 |
| Nondurables less food | 15.272 | 171.7 | 172.7 | 2.7 | .6 | −3.3 | .9 | 2.6 |
| Nondurables less food and apparel | 11.486 | 202.5 | 205.8 | 3.3 | 1.6 | −4.4 | −.8 | 3.2 |
| Nondurables | 29.214 | 183.8 | 184.5 | 2.4 | .4 | −1.7 | .4 | 1.3 |
| Apparel less footwear | 3.028 | 116.5 | 113.3 | .9 | −2.7 | −1.0 | −.3 | .5 |
| Services less rent of shelter [6] | 27.325 | 254.6 | 254.9 | 2.5 | .1 | −.4 | .2 | .4 |
| Services less medical care services | 54.446 | 231.5 | 231.7 | 3.3 | .1 | .0 | .2 | .4 |
| Energy | 8.665 | 180.4 | 185.2 | 2.9 | 2.7 | −7.0 | −.2 | 4.6 |
| All items less energy | 91.315 | 205.3 | 205.1 | 2.5 | −.1 | .1 | .0 | .1 |
| All items less food and energy | 77.373 | 207.6 | 207.3 | 2.6 | −.1 | .1 | .0 | .2 |
| Commodities less food and energy commodities | 22.319 | 140.6 | 139.9 | −.1 | −.5 | −.3 | −.4 | .0 |

TABLE 2-continued

Table 3. Consumer Price Index for all Urban Consumers (CPI-U): U.S. city average, detailed expenditure categories (1982-84 = 100, unless otherwise noted)

| Item and Group | Relative importance, December 2005 | Unadjusted indexes | | Unadjusted percent change to December 2006 from- | | Seasonally adjusted percent change from- | | |
|---|---|---|---|---|---|---|---|---|
| | | November 2006 | December 2006 | December 2005 | November 2006 | September to October | October to November | November to December |
| Energy commodities | 4.530 | 194.6 | 202.4 | 6.1 | 4.0 | −10.7 | −1.5 | 7.7 |
| Services less energy services | 55.055 | 247.5 | 247.5 | 3.7 | .0 | .3 | .2 | .2 |
| Domestically produced farm food [1] | 6.671 | 199.2 | 199.2 | 1.2 | .0 | .6 | −.5 | .0 |
| Utilities and public transportation | 9.508 | 184.7 | 185.2 | .9 | .3 | −1.3 | .1 | .6 |
| Purchasing power of the consumer dollar (1982-84 = $1.00) | — | $ .496 | $ .496 | — | — | — | — | — |
| Purchasing power of the consumer dollar (1967 = $1.00) | — | $ .166 | $ .155 | — | — | — | — | — |

[1] Not seasonally adjusted.
[2] Special index based on a substantially smaller sample.
[3] Indexes on a December 1997 = 100 base.
[4] Indexes on a December 2005 = 100 base.
[5] This index series was calculated using a Laspeyres estimator. All other item stratum index series were calculated using a geometric means estimator.
[6] Indexes on a December 1952 = 100 base.
[7] indexes on a December 1966 = 100 base.
[8] Indexes on a December 1983 = 100 base.
[9] Indexes on a December 1990 = 100 base.
[10] Indexes on a December 2001 = 100 base.
[11] Indexes on a December 1993 = 100 base.
[12] Indexes on a December 1996 = 100 base.
[13] Indexes on a December 1988 = 100 base.
NA Data not adequate for publication.
— Data not available.
NOTE:
Index applies to a month as a whole, not to any specific date.

Thus, although there have been described particular embodiments of the present invention of a System and Method for Matching Customers to Financial Products, Services, and Incentives Based on Bank Account Transaction Activity, it is not intended that such references be construed as limitations upon the scope of this invention except as set forth in the following claims.

What is claimed is:

1. A method for matching a customer having at least one financial transaction account at a financial institution to a financial product, the method comprising:
   (a) measuring a historical flow of cash transactions in at least one of the financial transaction accounts at the financial institution to generate one or more cash transactions datasets for the customer, the historical flow of cash transactions comprising deposits and withdrawals, wherein the one or more cash transactions datasets for the customer are generated by classifying the deposits and withdrawals into the one or more cash transactions datasets comprising fixed deposits, variable deposits, fixed withdrawals, and variable withdrawals;
   (b) using the customer cash transaction datasets to forecast one or more financial substitution factors for the customer; and
   (c) using at least one of the forecasted financial substitution factors to match the customer with the financial product or to an incentive linked to the financial product.

2. The method of claim 1 wherein the step of forecasting the financial substitution factors for the customer comprises determining a cash deposit functional derivative rate and a cash withdrawal functional derivative rate from the corresponding cash transaction datasets of deposits and withdrawals using a stochastic process.

3. The method of claim 2 wherein the step of classifying the deposits into cash transaction datasets of fixed deposits and variable deposits comprises:
   generating a monthly deposit calendar for the customer;
   applying a statistical pattern deposit classification model to the cash deposits, the statistical pattern classification model including a deposit amount range and deposit frequency probability limits associated with fixed deposits;
   classifying cash deposits that fall within the deposit amount range and the deposit frequency probability limits as fixed deposits; and
   classifying cash deposits that fall outside the deposit amount range and the deposit frequency probability limits as variable deposits.

4. The method of claim 2 wherein the step of classifying the withdrawals into cash transaction datasets of fixed withdrawals and variable withdrawals comprises:
   generating a monthly withdrawal calendar for the customer;
   applying a statistical pattern withdrawal classification model to the cash withdrawals, the statistical pattern classification model including a withdrawal amount range and withdrawal frequency probability limits associated with fixed withdrawals;
   classifying cash withdrawals that fall within the withdrawal amount range and the withdrawal frequency probability limits as fixed withdrawals; and
   classifying cash withdrawals that fall outside the withdrawal amount range and the withdrawal frequency probability limits as variable withdrawals.

5. The method of claim 4 wherein the forecasted financial substitution factors for the customer include at least one of an inter-temporal rate of substitution, a risk aversion to cash substitution, a preferences to cash substitution, a propensity to consume cash, and a propensity to save cash.

6. The method of claim 5 wherein the step of forecasting the inter-temporal rate of substitution comprises:
determining an inter-temporal cash withdrawal rate for each of the fixed and variable withdrawal datasets; and
classifying the fixed and variable withdrawal rates into low-to-high intertemporal rates of substitution groups to indicate an amount, a rate limit, and
probability that customer cash withdrawals can be substituted during a monthly withdrawal forecast.

7. The method of claim 6 wherein the step of forecasting the risk aversion to cash substitution comprises:
classifying the fixed and variable withdrawal rates into high-to-low risk aversion groups to indicate a risk amount, a rate limit, and probability that a customer is willing to substitute monthly.

8. The method of claim 6 wherein the step of forecasting the preferences to cash substitution comprises:
classifying the fixed and variable withdrawal rates into low-to-high preference groups to indicate a preference amount, a rate limit, and probability that a customer is willing to substitute monthly.

9. The method of claim 6 wherein the step of forecasting the propensity to consume comprises:
determining customer income;
classifying the fixed and variable withdrawal rates into high-to-low propensity to consume groups to indicate a cash amount and a monthly cash consumption rate as a percentage of customer income.

10. The method of claim 6 wherein the step of forecasting the propensity to save comprises:
determining customer income;
classifying the fixed and variable withdrawal rates into low-to-high propensity to save groups to indicate a cash amount and a monthly cash savings rate as a percentage of customer income.

11. The method of claim 2 wherein the step of further comprising:
storing customer profile data, including household income, in a customer information file;
matching the household income to consumer expenditures percentages contained in consumer expenditure survey data;
using the consumer expenditures percentages in the consumer expenditure survey data and the customer's household income to forecast future household expenditures by the customer; and
using the forecasted future household expenditures to match the customer with the financial product or to an incentive linked to the financial product.

12. The method of claim 11 wherein customer profile data further comprises age, size of household, occupation, education, housing tenure, and earners in household, and the step of forecasting future household expenditures by the customer further comprises adjusting the consumer expenditures percentages based on the customer profile data.

13. The method of claim 11 wherein the step of forecasting future household expenditures by the customer further comprises applying a back-propagation statistical neural model to forecast a consumer price index and using changes in the forecasted consumer price index to adjust the forecasts of future household consumer expenditure survey data.

14. The method of claim 11 further comprising the step of using the cash withdrawal functional derivative rate and statistical pattern classification model to classify each of the cash withdrawal transactions into separate expenditure groups and wherein the forecasts of future household expenditures are applied to each of the expenditure groups.

15. The method of claim 14 wherein the expenditure groups comprise mandatory, lifestyle, leisure, and luxury groups.

16. The method of claim 11 further comprising grouping the fixed deposits into income categories, the income categories including salary, interest, retirement, social security, and third-party transfers.

17. The method of claim 16 further comprising:
determining an actual or estimated household income for the customer;
comparing the amount of fixed deposits to the customer household income to determine a percentage of the customer household income that is being processed by the financial institution; and
using the actual or estimated household income for each income category to match low income percentage groups to household expenditure profiles with a higher income processing percentage to forecast the household income to expenditure potential.

18. A system for matching a customer of a financial institution with a financial product comprising:

a. a system database, the system database including a customer information file and historical cash deposit and withdrawal transaction information associated with an account owned by the customer;

b. a pre-processing stage, the pre-processing stage including
an account ownership household processor functional to extract account ownership information pertaining to the customer from the database,
a personal information classification processor functional to determine an income range for the customer from database, and
an account transaction calendar database comprising transactions calendars generated from the cash deposit and withdrawal transaction information;

c. a scoring and forecasting stage, the scoring and forecasting stage including
a customer/household account transaction activity statistical processor functional to generate and identify cash transaction patterns from the transaction calendars,
an account transaction scoring and forecasting processor functional to classify the cash transaction patterns into groups of household deposit and withdrawal patterns and to score and forecast monthly income and expenditure patterns for the customer,
a reporting processor functional to classify the deposit and withdrawal datasets into income, expenditure and classification profiles into a report database; and d. a reporting stage functional to generate matching reports using data in the system database and the report database.

19. The system of claim 18 further comprising a database of third-party demographic and consumer price index information and wherein the scoring and forecasting stage further comprises:

a household consumer expenditure survey table processor functionally linked to the consumer information file and to the third-party demographic information to classify consumer expenditures into mandatory, lifestyle, leisure, and luxury expenditure groups; and a consumer price index table processor functionally linked to the consumer price index information to generate consumer expenditure survey profiles for a customer household.

20. The system of claim 19 wherein the scoring and forecasting stage further comprises:

a consumer expenditure statistical processor functionally linked to the household consumer expenditure survey table processor to and to the account transaction activity statistical processor; and a consumer expenditure forecast processor functionally linked to the consumer expenditure statistical processor and to the reporting stage.

21. The system of claim 20 wherein the third-party demographic information database includes consumer confidence data and wherein the scoring and forecasting stage further comprises:

a consumer price index statistical processor functionally linked to the consumer price index table processor, to the consumer confidence data, and to the consumer expenditure statistical processor.

22. The system of claim 21 wherein the consumer expenditure forecast processor comprises a back-propagation statistical neural model.

23. The system of claim 18 wherein the account ownership processor, the personal information classification processor, and the customer/household account transaction activity statistical processor are functionally linked to the customer's direct deposit accounts, time deposit accounts, and loan accounts.

24. The system of claim 18 wherein the reporting stage is functional to generate summary and detail reports that show the results of processing in the statistical scoring and forecasting stage for each customer household and specialty reports defined by selecting target cash transaction and consumer expenditure survey dataset variables.

* * * * *